US010168691B2

(12) United States Patent
Zornio et al.

(10) Patent No.: US 10,168,691 B2
(45) Date of Patent: Jan. 1, 2019

(54) DATA PIPELINE FOR PROCESS CONTROL SYSTEM ANALYTICS

(71) Applicant: FISHER-ROSEMOUNT SYSTEMS, INC., Round Rock, TX (US)

(72) Inventors: Peter Zornio, Austin, TX (US); Mark J. Nixon, Round Rock, TX (US); Wilhelm K. Wojsznis, Austin, TX (US); Michael J. Lucas, Leicester (GB); Paul R. Muston, Narborough (GB); Eric D. Rotvold, West St. Paul, MN (US); Terrence L. Blevins, Round Rock, TX (US); Gary K. Law, Georgetown, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 375 days.

(21) Appl. No.: 14/873,721

(22) Filed: Oct. 2, 2015

(65) Prior Publication Data
US 2016/0098037 A1 Apr. 7, 2016

Related U.S. Application Data

(60) Provisional application No. 62/060,408, filed on Oct. 6, 2014.

(51) Int. Cl.
H04L 12/24 (2006.01)
G05B 19/418 (2006.01)
(Continued)

(52) U.S. Cl.
CPC ... G05B 19/41855 (2013.01); G05B 19/0421 (2013.01); G05B 19/4185 (2013.01);
(Continued)

(58) Field of Classification Search
None
See application file for complete search history.

(56) References Cited

U.S. PATENT DOCUMENTS 4,451,047 A 5/1984 Herd et al.
4,593,367 A 6/1986 Slack et al.
(Continued)

FOREIGN PATENT DOCUMENTS

AU 2010257310 A1 7/2012
CN 1409179 A 4/2003
(Continued)

OTHER PUBLICATIONS

"ANSI/ISA-S5.4-1991 American National Standard Instrument Loop Diagrams" by Instrument Society of America, 1986, 22 pages.
(Continued)

Primary Examiner — Isaac T Tecklu
(74) Attorney, Agent, or Firm — Marshall, Gerstein & Borun LLP

(57) ABSTRACT

A data pipeline is used as a fundamental processing element for implementing techniques that automatically or autonomously perform signal processing-based learning in a process plant or monitoring system. Each data pipeline includes a set of communicatively interconnected data processing blocks that perform processing on one or more sources of data in a predetermined order to, for example, clean the data, filter the data, select data for further processing, perform supervised or unsupervised learning on the data, etc. The individual processing blocks or modules within a data pipeline may be stored and executed at different devices in a plant network to perform distributed data processing. Moreover, each data pipeline can be integrated into one or more higher level analytic modules that perform higher level analytics, such as quality prediction, fault detection, etc. on the processed data. The use of data pipelines within a plant
(Continued)

network enables data collected within a plant control or monitoring system to be processed automatically and used in various higher level analytic modules within the plant during ongoing operation of the plant.

68 Claims, 10 Drawing Sheets

(51) Int. Cl.
 *H04L 29/08* (2006.01)
 *H04L 12/26* (2006.01)
 *G05B 19/042* (2006.01)

(52) U.S. Cl.
 CPC ........ *H04L 41/0803* (2013.01); *H04L 43/045* (2013.01); *H04L 67/10* (2013.01); *G05B 2219/25232* (2013.01); *G05B 2219/31094* (2013.01); *G05B 2219/31124* (2013.01); *G05B 2219/31211* (2013.01); *G05B 2219/31324* (2013.01); *G05B 2219/33333* (2013.01); *Y02P 90/18* (2015.11); *Y02P 90/22* (2015.11)

(56) References Cited

U.S. PATENT DOCUMENTS

| | | |
|---|---|---|
| 4,901,221 A | 2/1990 | Kodosky et al. |
| 4,914,568 A | 4/1990 | Kodosky et al. |
| 5,111,531 A | 5/1992 | Grayson et al. |
| 5,164,897 A | 11/1992 | Clark et al. |
| 5,291,587 A | 3/1994 | Kodosky et al. |
| 5,301,301 A | 4/1994 | Kodosky et al. |
| 5,301,336 A | 4/1994 | Kodosky et al. |
| 5,475,851 A | 12/1995 | Kodosky et al. |
| 5,481,740 A | 1/1996 | Kodosky |
| 5,481,741 A | 1/1996 | McKaskle et al. |
| 5,497,500 A | 3/1996 | Rogers et al. |
| 5,544,320 A | 8/1996 | Konrad |
| 5,568,491 A | 10/1996 | Beal et al. |
| 5,598,572 A | 1/1997 | Tanikoshi et al. |
| 5,610,828 A | 3/1997 | Kodosky et al. |
| 5,652,909 A | 7/1997 | Kodosky |
| D384,050 S | 9/1997 | Kodosky |
| D384,051 S | 9/1997 | Kodosky |
| D384,052 S | 9/1997 | Kodosky |
| D387,750 S | 12/1997 | Kodosky |
| 5,732,277 A | 3/1998 | Kodosky et al. |
| 5,734,863 A | 3/1998 | Kodosky et al. |
| 5,737,622 A | 4/1998 | Rogers et al. |
| 5,801,942 A | 9/1998 | Nixon et al. |
| 5,801,946 A | 9/1998 | Nissen et al. |
| 5,821,934 A | 10/1998 | Kodosky et al. |
| 5,828,851 A | 10/1998 | Nixon et al. |
| 5,838,563 A | 11/1998 | Dove et al. |
| 5,856,931 A | 1/1999 | McCasland |
| 5,862,052 A | 1/1999 | Nixon et al. |
| 5,862,054 A | 1/1999 | Li |
| 5,909,368 A | 6/1999 | Nixon et al. |
| 5,917,489 A | 6/1999 | Thurlow et al. |
| 5,940,294 A | 8/1999 | Dove |
| 5,971,747 A | 10/1999 | Lemelson et al. |
| 5,980,078 A | 11/1999 | Krivoshein et al. |
| 5,987,246 A | 11/1999 | Thomsen et al. |
| 5,988,847 A | 11/1999 | McLaughlin et al. |
| 5,990,906 A | 11/1999 | Hudson et al. |
| 5,995,916 A | 11/1999 | Nixon et al. |
| 6,009,422 A | 12/1999 | Ciccarelli |
| 6,032,208 A | 2/2000 | Nixon et al. |
| 6,064,409 A | 5/2000 | Thomsen et al. |
| 6,078,320 A | 6/2000 | Dove et al. |
| 6,098,116 A | 8/2000 | Nixon et al. |
| 6,167,464 A | 12/2000 | Kretschmann |
| 6,173,438 B1 | 1/2001 | Kodosky et al. |
| 6,178,504 B1 | 1/2001 | Fieres et al. |
| 6,195,591 B1 | 2/2001 | Nixon et al. |
| 6,219,628 B1 | 4/2001 | Kodosky et al. |
| 6,266,726 B1 | 7/2001 | Nixon et al. |
| 6,278,374 B1 | 8/2001 | Ganeshan |
| 6,285,966 B1 | 9/2001 | Brown et al. |
| 6,295,513 B1 | 9/2001 | Thackston |
| 6,324,877 B2 | 12/2001 | Neeley |
| 6,347,253 B1 | 2/2002 | Fujita et al. |
| 6,421,570 B1 | 7/2002 | McLaughlin et al. |
| 6,442,515 B1 | 8/2002 | Varma et al. |
| 6,463,352 B1 | 10/2002 | Tadokoro et al. |
| 6,529,780 B1 | 3/2003 | Soergel et al. |
| 6,535,883 B1 | 3/2003 | Lee et al. |
| 6,563,430 B1 | 5/2003 | Kemink et al. |
| 6,584,601 B1 | 6/2003 | Kodosky et al. |
| 6,608,638 B1 | 8/2003 | Kodosky et al. |
| 6,609,036 B1 | 8/2003 | Bickford |
| 6,658,114 B1 | 12/2003 | Farn et al. |
| 6,701,285 B2 | 3/2004 | Salonen |
| 6,715,078 B1 | 3/2004 | Chasko et al. |
| 6,715,139 B1 | 3/2004 | Kodosky et al. |
| 6,763,515 B1 | 7/2004 | Vazquez et al. |
| 6,768,116 B1 | 7/2004 | Berman et al. |
| 6,772,017 B1 | 8/2004 | Dove et al. |
| 6,784,903 B2 | 8/2004 | Kodosky et al. |
| 6,847,850 B2 | 1/2005 | Grumelart |
| 6,868,538 B1 | 3/2005 | Nixon et al. |
| 6,917,839 B2 | 7/2005 | Bickford |
| 6,934,667 B2 | 8/2005 | Kodosky et al. |
| 6,934,668 B2 | 8/2005 | Kodosky et al. |
| 6,954,724 B2 | 10/2005 | Kodosky et al. |
| 6,961,686 B2 | 11/2005 | Kodosky et al. |
| 6,965,886 B2 | 11/2005 | Govrin et al. |
| 6,970,758 B1 | 11/2005 | Shi et al. |
| 6,971,066 B2 | 11/2005 | Schultz et al. |
| 6,983,228 B2 | 1/2006 | Kodosky et al. |
| 6,993,466 B2 | 1/2006 | Kodosky et al. |
| 7,000,190 B2 | 2/2006 | Kudukoli et al. |
| 7,006,881 B1 | 2/2006 | Hoffberg et al. |
| 7,010,470 B2 | 3/2006 | Kodosky et al. |
| 7,062,718 B2 | 6/2006 | Kodosky et al. |
| 7,072,722 B1 | 7/2006 | Colonna et al. |
| 7,123,974 B1 | 10/2006 | Hamilton |
| 7,134,086 B2 | 11/2006 | Kodosky |
| 7,134,090 B2 | 11/2006 | Kodosky et al. |
| 7,143,149 B2 | 11/2006 | Oberg et al. |
| 7,143,289 B2 | 11/2006 | Denning et al. |
| 7,177,786 B2 | 2/2007 | Kodosky et al. |
| 7,185,287 B2 | 2/2007 | Ghercioiu et al. |
| 7,200,838 B2 | 4/2007 | Kodosky et al. |
| 7,210,117 B2 | 4/2007 | Kudukoli et al. |
| 7,213,057 B2 | 5/2007 | Trethewey et al. |
| 7,216,334 B2 | 5/2007 | Kodosky et al. |
| 7,219,306 B2 | 5/2007 | Kodosky et al. |
| 7,222,131 B1 | 5/2007 | Grewal et al. |
| 7,283,914 B2 | 10/2007 | Poorman et al. |
| 7,283,971 B1 | 10/2007 | Levine et al. |
| 7,302,675 B2 | 11/2007 | Rogers et al. |
| 7,314,169 B1 | 1/2008 | Jasper et al. |
| 7,340,737 B2 | 3/2008 | Ghercioiu et al. |
| 7,343,605 B2 | 3/2008 | Langkafel et al. |
| 7,346,404 B2 | 3/2008 | Eryurek et al. |
| 7,367,028 B2 | 4/2008 | Kodosky et al. |
| 7,478,337 B2 | 1/2009 | Kodosky et al. |
| 7,506,304 B2 | 3/2009 | Morrow et al. |
| 7,530,052 B2 | 5/2009 | Morrow et al. |
| 7,530,113 B2 | 5/2009 | Braun |
| 7,536,548 B1 | 5/2009 | Batke et al. |
| RE40,817 E | 6/2009 | Krivoshein et al. |
| 7,541,920 B2 | 6/2009 | Tambascio et al. |
| 7,548,873 B2 | 6/2009 | Veeningen et al. |
| 7,558,711 B2 | 7/2009 | Kodosky et al. |
| 7,565,306 B2 | 7/2009 | Apostolides |
| 7,574,690 B2 | 8/2009 | Shah et al. |
| 7,594,220 B2 | 9/2009 | Kodosky et al. |
| 7,598,856 B1 | 10/2009 | Nick et al. |
| 7,606,681 B2 | 10/2009 | Esmaili et al. |
| 7,616,095 B2 | 11/2009 | Jones et al. |
| 7,617,542 B2 | 11/2009 | Vataja |

(56) References Cited

U.S. PATENT DOCUMENTS

| | | |
|---|---|---|
| 7,627,860 B2 | 12/2009 | Kodosky et al. |
| 7,630,914 B2 | 12/2009 | Veeningen et al. |
| 7,640,007 B2 | 12/2009 | Chen et al. |
| 7,644,052 B1 | 1/2010 | Chang et al. |
| 7,650,264 B2 | 1/2010 | Kodosky et al. |
| 7,653,563 B2 | 1/2010 | Veeningen et al. |
| 7,668,608 B2 | 2/2010 | Nixon et al. |
| 7,676,281 B2 | 3/2010 | Hood et al. |
| 7,680,546 B2 | 3/2010 | Gilbert et al. |
| 7,684,877 B2 | 3/2010 | Weatherhead et al. |
| RE41,228 E | 4/2010 | Kodosky et al. |
| 7,694,273 B2 | 4/2010 | Kodosky et al. |
| 7,707,014 B2 | 4/2010 | Kodosky et al. |
| 7,715,929 B2 | 5/2010 | Skourup et al. |
| 7,716,489 B1 | 5/2010 | Brandt et al. |
| 7,720,727 B2 | 5/2010 | Keyes et al. |
| 7,818,715 B2 | 10/2010 | Kodosky et al. |
| 7,818,716 B2 | 10/2010 | Kodosky et al. |
| 7,827,122 B1 | 11/2010 | Campbell, Jr. et al. |
| 7,831,914 B2 | 11/2010 | Kodosky et al. |
| 7,844,908 B2 | 11/2010 | Kodosky et al. |
| 7,853,431 B2 | 12/2010 | Samardzija et al. |
| 7,865,349 B2 | 1/2011 | Kodosky et al. |
| 7,882,490 B2 | 2/2011 | Kodosky et al. |
| 7,882,491 B2 | 2/2011 | Kodosky et al. |
| 7,925,979 B2 | 4/2011 | Forney et al. |
| 7,930,639 B2 | 4/2011 | Baier et al. |
| 7,934,095 B2 | 4/2011 | Laberteaux et al. |
| 7,937,665 B1 | 5/2011 | Vazquez et al. |
| 7,962,440 B2 | 6/2011 | Baier et al. |
| 7,978,059 B2 | 7/2011 | Petite et al. |
| 7,979,843 B2 | 7/2011 | Kodosky et al. |
| 7,984,423 B2 | 7/2011 | Kodosky et al. |
| 7,987,448 B2 | 7/2011 | Kodosky et al. |
| 8,014,722 B2 | 9/2011 | Abel et al. |
| 8,028,241 B2 | 9/2011 | Kodosky et al. |
| 8,028,242 B2 | 9/2011 | Kodosky et al. |
| 8,055,787 B2 | 11/2011 | Victor et al. |
| 8,060,834 B2 | 11/2011 | Lucas et al. |
| 8,073,967 B2 | 12/2011 | Peterson et al. |
| 8,074,201 B2 | 12/2011 | Ghercioiu et al. |
| 8,099,712 B2 | 1/2012 | Kodosky et al. |
| 8,102,400 B1 | 1/2012 | Cook et al. |
| 8,126,964 B2 | 2/2012 | Pretlove et al. |
| 8,132,225 B2 | 3/2012 | Chand et al. |
| 8,146,053 B2 | 3/2012 | Morrow et al. |
| 8,166,296 B2 | 4/2012 | Buer et al. |
| 8,171,137 B1 | 5/2012 | Parks et al. |
| 8,185,217 B2 | 5/2012 | Thiele |
| 8,185,495 B2 | 5/2012 | Clark et al. |
| 8,185,832 B2 | 5/2012 | Kodosky et al. |
| 8,185,833 B2 | 5/2012 | Kodosky et al. |
| 8,185,871 B2 | 5/2012 | Nixon et al. |
| 8,190,888 B2 | 5/2012 | Batke et al. |
| 8,191,005 B2 | 5/2012 | Baier et al. |
| 8,214,455 B2 | 7/2012 | Baier et al. |
| 8,218,651 B1 | 7/2012 | Eshet et al. |
| 8,219,669 B2 | 7/2012 | Agrusa et al. |
| 8,224,496 B2 | 7/2012 | Musti et al. |
| 8,239,848 B2 | 8/2012 | Ghercioiu et al. |
| 8,266,066 B1 | 9/2012 | Wezter et al. |
| 8,290,762 B2 | 10/2012 | Kodosky et al. |
| 8,307,330 B2 | 11/2012 | Kumar et al. |
| 8,316,313 B2 | 11/2012 | Campney et al. |
| 8,321,663 B2 | 11/2012 | Medvinsky et al. |
| 8,327,130 B2 | 12/2012 | Wilkinson, Jr. et al. |
| 8,350,666 B2 | 1/2013 | Kore |
| 8,359,567 B2 | 1/2013 | Kornerup et al. |
| 8,397,172 B2 | 3/2013 | Kodosky et al. |
| 8,397,205 B2 | 3/2013 | Kornerup et al. |
| 8,413,118 B2 | 4/2013 | Kodosky et al. |
| 8,417,360 B2 | 4/2013 | Sustaeta et al. |
| 8,417,595 B2 | 4/2013 | Keyes et al. |
| 8,418,071 B2 | 4/2013 | Kodosky et al. |
| 8,429,627 B2 | 4/2013 | Jedlicka et al. |
| 8,448,135 B2 | 5/2013 | Kodosky |
| 8,521,332 B2 | 8/2013 | Tiemann et al. |
| 8,532,795 B2 | 9/2013 | Adavi et al. |
| 8,570,922 B2 | 10/2013 | Pratt, Jr. et al. |
| 8,612,870 B2 | 12/2013 | Kodosky et al. |
| 8,624,725 B1 | 1/2014 | MacGregor |
| 8,640,112 B2 | 1/2014 | Yi et al. |
| 8,656,351 B2 | 2/2014 | Kodosky et al. |
| 8,688,780 B2 | 4/2014 | Gordon et al. |
| 8,781,776 B2 | 7/2014 | Onda et al. |
| 8,832,236 B2 | 9/2014 | Hernandez et al. |
| 8,943,469 B2 | 1/2015 | Kumar et al. |
| 8,977,851 B2 | 3/2015 | Neitzel et al. |
| 9,002,973 B2 | 4/2015 | Panther |
| 9,021,021 B2 | 4/2015 | Backholm et al. |
| 9,024,972 B1 | 5/2015 | Bronder et al. |
| 9,038,043 B1 | 5/2015 | Fleetwood et al. |
| 9,047,007 B2 | 6/2015 | Kodosky et al. |
| 9,088,665 B2 | 7/2015 | Boyer et al. |
| 9,098,164 B2 | 8/2015 | Kodosky |
| 9,110,558 B2 | 8/2015 | Kodosky |
| 9,119,166 B1 | 8/2015 | Sheikh |
| 9,122,764 B2 | 9/2015 | Neitzel et al. |
| 9,122,786 B2 | 9/2015 | Cammert et al. |
| 9,134,895 B2 | 9/2015 | Dove et al. |
| 9,229,871 B2 | 1/2016 | Washiro |
| 9,235,395 B2 | 1/2016 | Kodosky et al. |
| 9,338,218 B1 * | 5/2016 | Florissi .................. H04L 67/10 |
| 9,361,320 B1 | 6/2016 | Vijendra et al. |
| 9,397,836 B2 | 7/2016 | Nixon et al. |
| 9,424,398 B1 | 8/2016 | McLeod et al. |
| 9,430,114 B1 | 8/2016 | Dingman et al. |
| 9,459,809 B1 | 10/2016 | Chen et al. |
| 9,532,232 B2 | 12/2016 | Dewey et al. |
| 9,541,905 B2 | 1/2017 | Nixon et al. |
| 9,558,220 B2 | 1/2017 | Nixon et al. |
| 9,652,213 B2 | 5/2017 | MacCleery et al. |
| 9,678,484 B2 | 6/2017 | Nixon et al. |
| 9,697,170 B2 * | 7/2017 | Nixon ................ G05B 19/4185 |
| 9,804,588 B2 | 10/2017 | Blevins et al. |
| 9,892,353 B1 | 2/2018 | Lui et al. |
| 2002/0010694 A1 | 1/2002 | Navab et al. |
| 2002/0035495 A1 | 3/2002 | Spira et al. |
| 2002/0052715 A1 | 5/2002 | Maki |
| 2002/0054130 A1 | 5/2002 | Abbott et al. |
| 2002/0064138 A1 | 5/2002 | Saito et al. |
| 2002/0080174 A1 | 6/2002 | Kodosky et al. |
| 2002/0087419 A1 | 7/2002 | Andersson et al. |
| 2002/0094085 A1 | 7/2002 | Roberts |
| 2002/0120475 A1 | 8/2002 | Morimoto |
| 2002/0128998 A1 | 9/2002 | Kil et al. |
| 2002/0130846 A1 | 9/2002 | Nixon et al. |
| 2002/0138168 A1 | 9/2002 | Salonen |
| 2002/0138320 A1 | 9/2002 | Robertson et al. |
| 2002/0149497 A1 | 10/2002 | Jaggi |
| 2002/0159441 A1 | 10/2002 | Travaly et al. |
| 2002/0169514 A1 | 11/2002 | Eryurek et al. |
| 2003/0020726 A1 | 1/2003 | Charpentier |
| 2003/0023795 A1 | 1/2003 | Packwood et al. |
| 2003/0028495 A1 | 2/2003 | Pallante |
| 2003/0061295 A1 | 3/2003 | Oberg et al. |
| 2003/0083756 A1 | 5/2003 | Hsiung et al. |
| 2003/0084053 A1 | 5/2003 | Govrin et al. |
| 2003/0093309 A1 | 5/2003 | Tanikoshi et al. |
| 2003/0147351 A1 | 8/2003 | Greenlee |
| 2003/0154044 A1 | 8/2003 | Lundstedt et al. |
| 2003/0195934 A1 | 10/2003 | Peterson et al. |
| 2004/0005859 A1 | 1/2004 | Ghercioiu et al. |
| 2004/0012632 A1 | 1/2004 | King et al. |
| 2004/0014479 A1 | 1/2004 | Milman |
| 2004/0075689 A1 | 4/2004 | Schleiss et al. |
| 2004/0093102 A1 | 5/2004 | Liiri et al. |
| 2004/0117233 A1 | 6/2004 | Rapp |
| 2004/0133457 A1 | 7/2004 | Sadiq et al. |
| 2004/0153437 A1 | 8/2004 | Buchan |
| 2004/0153804 A1 | 8/2004 | Blevins et al. |
| 2004/0203874 A1 | 10/2004 | Brandt et al. |
| 2004/0204775 A1 | 10/2004 | Keyes et al. |
| 2004/0210330 A1 | 10/2004 | Birkle |

(56) References Cited

U.S. PATENT DOCUMENTS

| | | |
|---|---|---|
| 2004/0230328 A1 | 11/2004 | Armstrong et al. |
| 2004/0233930 A1 | 11/2004 | Colby |
| 2005/0005259 A1 | 1/2005 | Avery et al. |
| 2005/0060111 A1 | 3/2005 | Ramillon et al. |
| 2005/0062677 A1 | 3/2005 | Nixon et al. |
| 2005/0080799 A1 | 4/2005 | Harnden et al. |
| 2005/0096872 A1 | 5/2005 | Blevins et al. |
| 2005/0130634 A1 | 6/2005 | Godfrey |
| 2005/0164684 A1 | 7/2005 | Chen et al. |
| 2005/0182650 A1 | 8/2005 | Maddox et al. |
| 2005/0187649 A1 | 8/2005 | Funk et al. |
| 2005/0213768 A1 | 9/2005 | Durham et al. |
| 2005/0222691 A1 | 10/2005 | Glas et al. |
| 2005/0222698 A1 | 10/2005 | Eryurek et al. |
| 2005/0264527 A1 | 12/2005 | Lin |
| 2006/0031826 A1 | 2/2006 | Hiramatsu et al. |
| 2006/0064291 A1 | 3/2006 | Pattipatti et al. |
| 2006/0064472 A1 | 3/2006 | Mirho |
| 2006/0069717 A1 | 3/2006 | Mamou et al. |
| 2006/0087402 A1 | 4/2006 | Manning et al. |
| 2006/0168396 A1 | 7/2006 | LaMothe et al. |
| 2006/0200260 A1 | 9/2006 | Hoffberg et al. |
| 2006/0200771 A1 | 9/2006 | Nielsen et al. |
| 2006/0218107 A1 | 9/2006 | Young |
| 2006/0235741 A1 | 10/2006 | Deaton et al. |
| 2006/0241792 A1 | 10/2006 | Pretlove et al. |
| 2006/0288091 A1 | 12/2006 | Oh et al. |
| 2006/0291481 A1 | 12/2006 | Kumar |
| 2006/0294087 A1 | 12/2006 | Mordvinov |
| 2007/0005266 A1 | 1/2007 | Blevins et al. |
| 2007/0014406 A1 | 1/2007 | Scheidt et al. |
| 2007/0038889 A1 | 2/2007 | Wiggins et al. |
| 2007/0067725 A1 | 3/2007 | Cahill et al. |
| 2007/0078696 A1 | 4/2007 | Hardin |
| 2007/0112574 A1 | 5/2007 | Greene |
| 2007/0118516 A1 | 5/2007 | Li et al. |
| 2007/0130310 A1 | 6/2007 | Batke et al. |
| 2007/0132779 A1 | 6/2007 | Gilbert et al. |
| 2007/0139441 A1 | 6/2007 | Lucas et al. |
| 2007/0179645 A1 | 8/2007 | Nixon et al. |
| 2007/0185754 A1 | 8/2007 | Schmidt |
| 2007/0211079 A1 | 9/2007 | Nixon et al. |
| 2007/0250292 A1 | 10/2007 | Alagappan et al. |
| 2007/0265801 A1 | 11/2007 | Foslien et al. |
| 2007/0265866 A1 | 11/2007 | Fehling et al. |
| 2008/0040719 A1 | 2/2008 | Shimizu et al. |
| 2008/0046104 A1 | 2/2008 | Van Camp et al. |
| 2008/0058968 A1 | 3/2008 | Sharma et al. |
| 2008/0065243 A1 | 3/2008 | Fallman et al. |
| 2008/0065705 A1 | 3/2008 | Miller |
| 2008/0065706 A1 | 3/2008 | Miller et al. |
| 2008/0076431 A1 | 3/2008 | Fletcher et al. |
| 2008/0078189 A1 | 4/2008 | Ando |
| 2008/0079596 A1 | 4/2008 | Baier et al. |
| 2008/0082180 A1 | 4/2008 | Blevins et al. |
| 2008/0082181 A1 | 4/2008 | Miller et al. |
| 2008/0082195 A1 | 4/2008 | Samardzija |
| 2008/0097622 A1 | 4/2008 | Forney et al. |
| 2008/0103843 A1 | 5/2008 | Goeppert et al. |
| 2008/0104189 A1 | 5/2008 | Baker et al. |
| 2008/0126352 A1 | 5/2008 | Case |
| 2008/0126665 A1 | 5/2008 | Burr et al. |
| 2008/0143482 A1 | 6/2008 | Shoarinejad et al. |
| 2008/0174766 A1 | 7/2008 | Haaslahti et al. |
| 2008/0182592 A1 | 7/2008 | Cha et al. |
| 2008/0209443 A1 | 8/2008 | Suzuki |
| 2008/0249641 A1 | 10/2008 | Enver et al. |
| 2008/0274766 A1 | 11/2008 | Pratt et al. |
| 2008/0275971 A1 | 11/2008 | Pretlove et al. |
| 2008/0288321 A1 | 11/2008 | Dillon et al. |
| 2008/0297513 A1 | 12/2008 | Greenhill et al. |
| 2008/0301123 A1 | 12/2008 | Schneider et al. |
| 2009/0049073 A1 | 2/2009 | Cho |
| 2009/0065578 A1 | 3/2009 | Peterson et al. |
| 2009/0070337 A1 | 3/2009 | Romem et al. |
| 2009/0070589 A1 | 3/2009 | Nayak et al. |
| 2009/0089233 A1 | 4/2009 | Gach et al. |
| 2009/0089359 A1 | 4/2009 | Siorek et al. |
| 2009/0089709 A1 | 4/2009 | Baier et al. |
| 2009/0094531 A1 | 4/2009 | Danieli et al. |
| 2009/0097502 A1 | 4/2009 | Yamamoto |
| 2009/0112335 A1 | 4/2009 | Mehta et al. |
| 2009/0210386 A1 | 8/2009 | Cahill |
| 2009/0210802 A1 | 8/2009 | Hawkins et al. |
| 2009/0210814 A1 | 8/2009 | Agrusa et al. |
| 2009/0216341 A1 | 8/2009 | Enkerud et al. |
| 2009/0249237 A1 | 10/2009 | Jundt et al. |
| 2009/0284383 A1 | 11/2009 | Wiles et al. |
| 2009/0294174 A1 | 12/2009 | Harmer et al. |
| 2009/0300535 A1 | 12/2009 | Skourup et al. |
| 2009/0319058 A1 | 12/2009 | Rovaglio et al. |
| 2009/0325603 A1 | 12/2009 | Van Os et al. |
| 2009/0327014 A1 | 12/2009 | Labedz et al. |
| 2010/0036779 A1 | 2/2010 | Sadeh-Koniecpol et al. |
| 2010/0069008 A1 | 3/2010 | Oshima et al. |
| 2010/0076642 A1 | 3/2010 | Hoffberg et al. |
| 2010/0082158 A1 | 4/2010 | Lakomiak et al. |
| 2010/0106282 A1 | 4/2010 | Mackelprang et al. |
| 2010/0127821 A1 | 5/2010 | Jones et al. |
| 2010/0127824 A1 | 5/2010 | Moschl et al. |
| 2010/0145476 A1 | 6/2010 | Junk et al. |
| 2010/0169785 A1 | 7/2010 | Jesudason |
| 2010/0185857 A1 | 7/2010 | Neitzel et al. |
| 2010/0190442 A1 | 7/2010 | Citrano, III et al. |
| 2010/0192122 A1* | 7/2010 | Esfahan ............ G05B 19/0426 717/105 |
| 2010/0222899 A1 | 9/2010 | Blevins et al. |
| 2010/0262929 A1 | 10/2010 | Avery |
| 2010/0275135 A1 | 10/2010 | Dunton et al. |
| 2010/0286798 A1 | 11/2010 | Keyes et al. |
| 2010/0290351 A1 | 11/2010 | Toepke et al. |
| 2010/0290359 A1 | 11/2010 | Dewey et al. |
| 2010/0293019 A1 | 11/2010 | Keyes et al. |
| 2010/0293564 A1 | 11/2010 | Gould et al. |
| 2010/0305736 A1 | 12/2010 | Arduini |
| 2010/0318934 A1 | 12/2010 | Blevins et al. |
| 2011/0022193 A1 | 1/2011 | Panaitescu |
| 2011/0046754 A1 | 2/2011 | Bromley et al. |
| 2011/0071869 A1 | 3/2011 | O'Brien et al. |
| 2011/0072338 A1 | 3/2011 | Caldwell |
| 2011/0098918 A1 | 4/2011 | Siliski et al. |
| 2011/0115816 A1 | 5/2011 | Brackney |
| 2011/0130848 A1 | 6/2011 | Tegnell et al. |
| 2011/0140864 A1 | 6/2011 | Bucci |
| 2011/0144777 A1 | 6/2011 | Firkins et al. |
| 2011/0191277 A1 | 8/2011 | Ag ndez Dominguez et al. |
| 2011/0238189 A1 | 9/2011 | Butera et al. |
| 2011/0258138 A1 | 10/2011 | Kulkarni et al. |
| 2011/0276896 A1 | 11/2011 | Zambetti et al. |
| 2011/0276908 A1 | 11/2011 | O'Riordan |
| 2011/0282793 A1 | 11/2011 | Mercuri et al. |
| 2011/0295722 A1 | 12/2011 | Reisman |
| 2012/0004743 A1 | 1/2012 | Anne et al. |
| 2012/0005270 A1 | 1/2012 | Harding et al. |
| 2012/0010758 A1 | 1/2012 | Francino et al. |
| 2012/0011180 A1 | 1/2012 | Kavaklioglu |
| 2012/0011511 A1 | 1/2012 | Horvitz et al. |
| 2012/0029661 A1 | 2/2012 | Jones et al. |
| 2012/0038458 A1 | 2/2012 | Toepke et al. |
| 2012/0040698 A1 | 2/2012 | Ferguson et al. |
| 2012/0078869 A1 | 3/2012 | Bellville et al. |
| 2012/0095574 A1 | 4/2012 | Greenlee |
| 2012/0147862 A1 | 6/2012 | Poojary et al. |
| 2012/0163521 A1 | 6/2012 | Kirrmann et al. |
| 2012/0176491 A1 | 7/2012 | Garin et al. |
| 2012/0203728 A1 | 8/2012 | Levine |
| 2012/0226985 A1 | 9/2012 | Chervets et al. |
| 2012/0230309 A1 | 9/2012 | Junk |
| 2012/0239164 A1 | 9/2012 | Smith et al. |
| 2012/0249588 A1 | 10/2012 | Tison et al. |
| 2012/0271962 A1 | 10/2012 | Ivanov et al. |
| 2012/0290795 A1 | 11/2012 | Dowlatkhah |
| 2012/0331541 A1 | 12/2012 | Hamilton, II et al. |
| 2013/0006696 A1 | 1/2013 | Louie et al. |

(56) References Cited

U.S. PATENT DOCUMENTS

| | | |
|---|---|---|
| 2013/0007223 A1 | 1/2013 | Luby et al. |
| 2013/0013523 A1 | 1/2013 | Herrera Campos |
| 2013/0029686 A1 | 1/2013 | Moshfeghi |
| 2013/0041479 A1 | 2/2013 | Zhang et al. |
| 2013/0086591 A1 | 4/2013 | Haven |
| 2013/0095849 A1 | 4/2013 | Pakzad |
| 2013/0120449 A1 | 5/2013 | Ihara et al. |
| 2013/0127980 A1 | 5/2013 | Haddick et al. |
| 2013/0144404 A1* | 6/2013 | Godwin ............. G05B 19/4185 700/2 |
| 2013/0144405 A1* | 6/2013 | Lo .................... G05B 19/4183 700/2 |
| 2013/0144605 A1 | 6/2013 | Brager et al. |
| 2013/0151563 A1 | 6/2013 | Addepalli et al. |
| 2013/0159200 A1 | 6/2013 | Paul et al. |
| 2013/0169526 A1 | 7/2013 | Gai et al. |
| 2013/0184847 A1 | 7/2013 | Fruh et al. |
| 2013/0197954 A1 | 8/2013 | Yankelevich et al. |
| 2013/0212129 A1 | 8/2013 | Lawson et al. |
| 2013/0214902 A1 | 8/2013 | Pineau et al. |
| 2013/0217417 A1 | 8/2013 | Mohideen et al. |
| 2013/0231947 A1 | 9/2013 | Shusterman |
| 2013/0257627 A1 | 10/2013 | Rafael |
| 2013/0265857 A1 | 10/2013 | Foulds et al. |
| 2013/0318536 A1 | 11/2013 | Fletcher et al. |
| 2014/0006338 A1 | 1/2014 | Watson et al. |
| 2014/0015672 A1 | 1/2014 | Ponce |
| 2014/0039648 A1 | 2/2014 | Boult et al. |
| 2014/0067800 A1 | 3/2014 | Sharma |
| 2014/0079297 A1 | 3/2014 | Tadayon et al. |
| 2014/0089504 A1 | 3/2014 | Scholz et al. |
| 2014/0108985 A1 | 4/2014 | Scott et al. |
| 2014/0122806 A1 | 5/2014 | Lin et al. |
| 2014/0123276 A1 | 5/2014 | Bush et al. |
| 2014/0136652 A1 | 5/2014 | Narayanaswami et al. |
| 2014/0156032 A1 | 6/2014 | Jenkins et al. |
| 2014/0164603 A1 | 6/2014 | Castel et al. |
| 2014/0172961 A1 | 6/2014 | Clemmer et al. |
| 2014/0180671 A1 | 6/2014 | Osipova |
| 2014/0180970 A1 | 6/2014 | Hettenkofer et al. |
| 2014/0189520 A1 | 7/2014 | Crepps et al. |
| 2014/0201244 A1 | 7/2014 | Zhou |
| 2014/0232843 A1 | 8/2014 | Campbell |
| 2014/0250153 A1* | 9/2014 | Nixon ................ G06F 17/30312 707/812 |
| 2014/0267599 A1 | 9/2014 | Drouin et al. |
| 2014/0273847 A1 | 9/2014 | Nixon et al. |
| 2014/0274123 A1 | 9/2014 | Nixon et al. |
| 2014/0277593 A1 | 9/2014 | Nixon et al. |
| 2014/0277594 A1 | 9/2014 | Nixon et al. |
| 2014/0277595 A1 | 9/2014 | Nixon et al. |
| 2014/0277596 A1 | 9/2014 | Nixon et al. |
| 2014/0277604 A1* | 9/2014 | Nixon ................ G05B 19/4185 700/47 |
| 2014/0277605 A1 | 9/2014 | Nixon et al. |
| 2014/0277607 A1 | 9/2014 | Nixon et al. |
| 2014/0277615 A1 | 9/2014 | Nixon et al. |
| 2014/0277616 A1 | 9/2014 | Nixon et al. |
| 2014/0277617 A1 | 9/2014 | Nixon et al. |
| 2014/0277618 A1 | 9/2014 | Nixon et al. |
| 2014/0277656 A1 | 9/2014 | Nixon et al. |
| 2014/0278312 A1 | 9/2014 | Nixon et al. |
| 2014/0280497 A1 | 9/2014 | Nixon et al. |
| 2014/0280678 A1 | 9/2014 | Nixon et al. |
| 2014/0282015 A1 | 9/2014 | Nixon et al. |
| 2014/0282227 A1 | 9/2014 | Nixon et al. |
| 2014/0282257 A1 | 9/2014 | Nixon et al. |
| 2014/0297225 A1 | 10/2014 | Petroski et al. |
| 2014/0316579 A1 | 10/2014 | Taylor et al. |
| 2014/0358256 A1 | 12/2014 | Billi et al. |
| 2014/0359552 A1 | 12/2014 | Misra et al. |
| 2014/0372378 A1 | 12/2014 | Long et al. |
| 2014/0372561 A1 | 12/2014 | Hisano |
| 2014/0379296 A1 | 12/2014 | Nathan et al. |
| 2015/0024710 A1 | 1/2015 | Becker et al. |
| 2015/0067163 A1 | 3/2015 | Bahnsen et al. |
| 2015/0106578 A1 | 4/2015 | Warfield et al. |
| 2015/0172872 A1 | 6/2015 | Alsehly et al. |
| 2015/0177718 A1 | 6/2015 | Vartiainen et al. |
| 2015/0220080 A1 | 8/2015 | Nixon et al. |
| 2015/0222731 A1 | 8/2015 | Shinohara et al. |
| 2015/0246852 A1 | 9/2015 | Chen et al. |
| 2015/0261215 A1 | 9/2015 | Blevins et al. |
| 2015/0278397 A1 | 10/2015 | Hendrickson et al. |
| 2015/0312721 A1 | 10/2015 | Singh et al. |
| 2015/0332188 A1 | 11/2015 | Yankelevich et al. |
| 2016/0098021 A1 | 4/2016 | Zornio et al. |
| 2016/0098388 A1 | 4/2016 | Blevins et al. |
| 2016/0098647 A1 | 4/2016 | Nixon et al. |
| 2016/0132046 A1 | 5/2016 | Beoughter et al. |
| 2016/0261482 A1 | 9/2016 | Mixer et al. |
| 2016/0327942 A1 | 11/2016 | Nixon et al. |
| 2017/0102678 A1 | 4/2017 | Nixon et al. |
| 2017/0102693 A1 | 4/2017 | Kidd et al. |
| 2017/0102694 A1 | 4/2017 | Enver et al. |
| 2017/0102696 A1 | 4/2017 | Bell et al. |
| 2017/0103103 A1 | 4/2017 | Nixon et al. |
| 2017/0115648 A1 | 4/2017 | Nixon et al. |
| 2017/0154395 A1 | 6/2017 | Podgurny et al. |
| 2017/0199843 A1 | 7/2017 | Nixon et al. |
| 2017/0235298 A1 | 8/2017 | Nixon et al. |
| 2017/0236067 A1 | 8/2017 | Tjiong |
| 2018/0151037 A1 | 5/2018 | Morgenthau et al. |

FOREIGN PATENT DOCUMENTS

| | | |
|---|---|---|
| CN | 1409232 A | 4/2003 |
| CN | 1537258 A | 10/2004 |
| CN | 1589423 A | 3/2005 |
| CN | 1757002 A | 4/2006 |
| CN | 1804744 A | 7/2006 |
| CN | 1805040 A | 7/2006 |
| CN | 1826565 A | 8/2006 |
| CN | 1980194 A | 6/2007 |
| CN | 101097136 A | 1/2008 |
| CN | 101387882 A | 3/2009 |
| CN | 101449259 A | 6/2009 |
| CN | 201374004 Y | 12/2009 |
| CN | 101788820 A | 7/2010 |
| CN | 101828195 A | 9/2010 |
| CN | 101867566 A | 10/2010 |
| CN | 102063097 A | 5/2011 |
| CN | 102169182 A | 8/2011 |
| CN | 102175174 A | 9/2011 |
| CN | 102184489 A | 9/2011 |
| CN | 102200993 A | 9/2011 |
| CN | 102213959 A | 10/2011 |
| CN | 102243315 A | 11/2011 |
| CN | 102278987 A | 12/2011 |
| CN | 202101268 U | 1/2012 |
| CN | 102349031 A | 2/2012 |
| CN | 102375453 A | 3/2012 |
| CN | 102378989 A | 3/2012 |
| CN | 102402215 A | 4/2012 |
| CN | 102436205 A | 5/2012 |
| CN | 102494630 A | 6/2012 |
| CN | 102494683 A | 6/2012 |
| CN | 102637027 A | 8/2012 |
| CN | 102640156 A | 8/2012 |
| CN | 102707689 A | 10/2012 |
| CN | 102710861 A | 10/2012 |
| CN | 102867237 A | 1/2013 |
| CN | 103106188 A | 5/2013 |
| CN | 103403686 A | 11/2013 |
| CN | 103576638 A | 2/2014 |
| CN | 104035392 A | 9/2014 |
| CN | 104049575 A | 9/2014 |
| DE | 19882113 T1 | 1/2000 |
| DE | 19882117 T1 | 1/2000 |
| EP | 0 308 390 A1 | 3/1989 |
| EP | 0 335 957 A1 | 10/1989 |
| EP | 1 344 291 A1 | 9/2003 |
| EP | 1 414 215 A2 | 4/2004 |
| EP | 1 564 647 A2 | 8/2005 |

(56) References Cited

FOREIGN PATENT DOCUMENTS

| | | |
|---|---|---|
| EP | 1 912 376 A1 | 4/2008 |
| EP | 2 003 813 A1 | 12/2008 |
| EP | 2 112 614 A1 | 10/2009 |
| EP | 2 469 475 A1 | 6/2012 |
| EP | 1 344 291 B1 | 8/2012 |
| EP | 2 685 329 A1 | 1/2014 |
| EP | 2 746 884 A1 | 6/2014 |
| EP | 2 801 939 A1 | 11/2014 |
| FR | 2 966 625 A1 | 4/2012 |
| GB | 2 336 977 B | 11/1999 |
| GB | 2 336 923 B | 6/2002 |
| GB | 2 403 028 A | 12/2004 |
| GB | 2 453 426 A | 4/2009 |
| GB | 2 512 984 A | 10/2014 |
| GB | 2 512 997 A | 10/2014 |
| GB | 2 532 849 A | 6/2016 |
| GB | 2 534 628 A | 8/2016 |
| GB | 2 537 457 A | 10/2016 |
| JP | 64-017105 A | 1/1989 |
| JP | 01-291303 A | 11/1989 |
| JP | 05-073131 A | 3/1993 |
| JP | 05-142033 A | 6/1993 |
| JP | 05-187973 A | 7/1993 |
| JP | 06-052145 A | 2/1994 |
| JP | 08-234951 | 9/1996 |
| JP | 09-330861 A | 12/1997 |
| JP | 10-116113 A | 5/1998 |
| JP | 11-327628 A | 11/1999 |
| JP | 2000-214914 A | 8/2000 |
| JP | 2001-512593 A | 8/2001 |
| JP | 2001-265821 A | 9/2001 |
| JP | 2002-010489 A | 1/2002 |
| JP | 2002-024423 A | 1/2002 |
| JP | 2002-99325 A | 4/2002 |
| JP | 2003-295944 A | 10/2003 |
| JP | 2004-171127 A | 6/2004 |
| JP | 2004-199624 A | 7/2004 |
| JP | 2004-227561 A | 8/2004 |
| JP | 2005-216137 A | 8/2005 |
| JP | 2005-332093 A | 12/2005 |
| JP | 2006-172462 A | 6/2006 |
| JP | 2006-221376 A | 8/2006 |
| JP | 2006-527426 A | 11/2006 |
| JP | 2007-137563 A | 6/2007 |
| JP | 2007-148938 A | 6/2007 |
| JP | 2007-207065 A | 8/2007 |
| JP | 2007-242000 A | 9/2007 |
| JP | 2007-286798 A | 11/2007 |
| JP | 2007-536631 A | 12/2007 |
| JP | 2007-536648 A | 12/2007 |
| JP | 2008-065821 A | 3/2008 |
| JP | 2008-158971 A | 7/2008 |
| JP | 2008-305419 A | 12/2008 |
| JP | 2009-064451 A | 3/2009 |
| JP | 2009-140380 A | 6/2009 |
| JP | 2009-211522 A | 9/2009 |
| JP | 2009-251777 A | 10/2009 |
| JP | 2010-527486 A | 8/2010 |
| JP | 2011-022920 A | 2/2011 |
| JP | 2011-034564 A | 2/2011 |
| JP | 2011-204237 A | 10/2011 |
| JP | 2011-204238 A | 10/2011 |
| JP | 2012-048762 A | 3/2012 |
| JP | 2012-069118 A | 4/2012 |
| JP | 2012-084162 A | 4/2012 |
| JP | 4-934482 B2 | 5/2012 |
| JP | 2012-215547 A | 11/2012 |
| JP | 2012-527059 A | 11/2012 |
| JP | 2014-116027 A | 6/2014 |
| WO | WO-02/50971 | 6/2002 |
| WO | WO-03/073688 A1 | 9/2003 |
| WO | WO-2003/073688 A1 | 9/2003 |
| WO | WO-2005/083533 A1 | 9/2005 |
| WO | WO-2005/109123 A1 | 11/2005 |
| WO | WO-2008/042786 A2 | 4/2008 |
| WO | WO-2009/021900 A1 | 2/2009 |
| WO | WO-2009/046095 A1 | 4/2009 |
| WO | WO-2011/120625 A1 | 10/2011 |
| WO | WO-2012/016012 A2 | 2/2012 |
| WO | WO-2012/022381 A1 | 2/2012 |
| WO | WO-2012/096877 A1 | 7/2012 |
| WO | WO-2014/005073 A1 | 1/2014 |
| WO | WO-2014/145801 A2 | 9/2014 |
| WO | WO-2015/138706 A1 | 9/2015 |
| WO | WO-2016/057365 A1 | 4/2016 |

OTHER PUBLICATIONS

"Control Loop Foundation—Batch and Continuous Processes", by Terrence Blevins and Mark Nixon, *International Society of Automation*, 2011, Chapter 7.

"IoT and Big Data Combine Forces," (2013). Retrieved from the Internet at: <URL:http://wiki.advantech.com/images/7/73/iot2013_whitepaper.pdf>.

Bryner, "Smart Manufacturing: The Next Revolution," Chemical Engineering Process (2012). Retrieved from the Internet at: <URL:http://www.aiche.org/sites/default/files/cep/20121004a.pdf>.

Building Smarter Manufacturing with the Internet of Things (IoT), (2014). Retrieved from the Internet at: <URL:http://www.cisco.com/web/solutions/trends/iot/iot_in_manufacturing_january.pdf>.

Communication Relating to the Results of the Partial International Search, dated Jul. 11, 2014.

Examination Report for Application No. GB1017192.4, dated May 28, 2014.

Examination Report for Application No. GB1017192.4, dated Sep. 5, 2013.

First Office Action for Chinese Application No. 201010589029.X, dated Dec. 10, 2013.

International Search Report and Written Opinion for Application No. PCT/US2014/030627, dated Sep. 11, 2014.

International Search Report and Written Opinion for Application No. PCT/US2015/020148, dated Jun. 18, 2015.

Notice of Reasons for Rejection for Japanese Application No. 2010-229513, dated Jul. 29, 2014.

Search Report for Application No. GB1017192.4, dated Feb. 15, 2011.

Search Report for Application No. GB1402311.3, dated Aug. 6, 2014.

Search Report for Application No. GB1403251.0, dated Aug. 8, 2014.

Search Report for Application No. GB1403407.8, dated Aug. 8, 2014.

Search Report for Application No. GB1403408.6, dated Aug. 8, 2014.

Search Report for Application No. GB1403471.4, dated Sep. 9, 2014.

Search Report for Application No. GB1403472.2, dated Aug. 22, 2014.

Search Report for Application No. GB1403474.8, dated Aug. 26, 2014.

Search Report for Application No. GB1403475.5, dated Sep. 3, 2014.

Search Report for Application No. GB1403476.3, dated Aug. 27, 2014.

Search Report for Application No. GB1403477.1, dated Aug. 28, 2014.

Search Report for Application No. GB1403478.9, dated Aug. 21, 2014.

Search Report for Application No. GB1403480.5, dated Aug. 28, 2014.

Search Report for Application No. GB1403615.6, dated Aug. 18, 2014.

Search Report for Application No. GB1403616.4, dated Sep. 1, 2014.

Smalley, "GE Invests in Project to Embed Predictive Analytics in Industrial Internet," (2013). Retrieved from the Internet at: <URL:http://data-informed.com/ge-invents-in-project-to-embed-predictive-analytics-in-industrial-internet/>.

(56) References Cited

OTHER PUBLICATIONS

U.S. Appl. No. 13/784,041, filed Mar. 4, 2013.
U.S. Appl. No. 14/028,785, filed Sep. 17, 2013.
U.S. Appl. No. 14/028,897, filed Sep. 17, 2013.
U.S. Appl. No. 14/028,913, filed Sep. 17, 2013.
U.S. Appl. No. 14/028,921, filed Sep. 17, 2013.
U.S. Appl. No. 14/028,923, filed Sep. 17, 2013.
U.S. Appl. No. 14/028,964, filed Sep. 17, 2013.
U.S. Appl. No. 14/174,413, filed Feb. 6, 2014, "Collecting and Delivering Data to a Big Data Machine in a Process Control System".
U.S. Appl. No. 14/212,411, filed Mar. 14, 2014, "Determining Associations and Alignments of Process Elements and Measurements in a Process".
U.S. Appl. No. 14/212,493, filed Mar. 14, 2014, "Distributed Big Data in a Process Control System".
U.S. Appl. No. 14/506,863, filed Oct. 6, 2014, "Streaming Data for Analytics in Process Control Systems".
U.S. Appl. No. 14/507,252, filed Oct. 6, 2014, "Automatic Signal Processing-Based Learning in a Process Plant".
U.S. Appl. No. 62/060,408, filed Oct. 6, 2014, "Data Pipeline for Process Control System Analytics".
Woo, "Intel Drops a Big Data Shocker", downloaded from the Internet at: <http://forbes.com/sites/bwoo/2013/02/27/intel-drops-a-big-data-shocker/?partner=ya> dated Feb. 27, 2013.
International Search Report and Written Opinion for Application No. PCT/US2015,053931, dated Jan. 26, 2016.
Krumeich et al., "Big Data Analytics for Predictive Manufacturing Control—A Case Study from Process Industry," IEEE International Congress on Big Data, pp. 530-537 (2014).
Search Report for Application No. GB1513617.9, dated Jan. 21, 2016.
Bassat et al., "Workflow Management Combined with Diagnostic and Repair Expert System Tools for Maintenance Operations," IEEE, pp. 367-375 (1993).
Search Report for Application No. GB1501042.4, dated Feb. 2, 2016.
Search Report for Application No. GB1517034.3, dated May 26, 2016.
Search Report for Application No. GB1517038.4, dated Mar. 22, 2016.
Examination Report for Application No. EP 14724871.0, dated Aug. 17, 2016.
Hu et al., "Toward Scalable Systems for Big Data Analytics: A Technology Tutorial," IEEE, 2:652-687 (2014).
Lee et al., "Recent Advances and Trends in Predictive Manufacturing Systems in Big Data Environment," Manufacturing Letters, 1(1):38-41 (2013).
Mahdavi et al., "Development of a Simulation-Based Decision Support System for Controlling Stochastic Flexible Job Shop Manufacturing Systems," Simulation Modeling Practice and Theory, 18:768-786 (2010).
Mezmaz et al., "A Parallel Bi-Objective Hybrid Metaheuristic for Energy-Aware Scheduling for Cloud Computing Systems," Journal of Parallel and Distributed Computing, Elsevier (2011).
Notification of First Office Action for Chinese Application No. 201480014734.3, dated Apr. 19, 2017.
Razik et al., "The Remote Surveillance Device in Monitoring and Diagnosis of Induction Motor by Using a PDA," IEEE (2007).
Search Report for Application No. GB1617019.3, dated Feb. 27, 2017.
Siltanen et al., "Augmented Reality for Plant Lifecycle Management," IEEE (2007).
Xu, "From Cloud Computing to Cloud Manufacturing," Robotics and Computer-Integrated Manufacturing 28:75-86 (2012).
Aouada et al., "Source Detection and Separation in Power Plant Process Monitoring: Application of the Bootstrap," IEEE International Conference on Acoustics Speech and Signal Processing Proceedings (2006).
Bruzzone et al., "Different Modeling and Simulation Approaches Applied to Industrial Process Plants," Proceedings of the Emerging M&S Applications in Industry & Academia/Modeling and Humanities Symposium (2013).
First Office Action for Chinese Application No. 201410097675.2, dated May 10, 2017.
International Preliminary Report on Patentability for Application No. PCT/US2015/053931, dated Apr. 11, 2017.
Notification of First Office Action for Chinese Application No. 201410097875.8, dated Jul. 7, 2017.
Sailer et al., "Attestation-Based Policy Enforcement for Remote Access," Proceedings of the 11th ACM Conference on Computer and Communications Security (2004).
Search Report for Application No. GB1617020.1, dated Apr. 13, 2017.
Search Report for Application No. GB1617021.9, dated Apr. 5, 2017.
Search Report for Application No. GB1617022.7, dated Apr. 18, 2017.
Search Report for Application No. GB1617023.5, dated Apr. 7, 2017.
Search Report for Application No. GB16702014.0, dated Aug. 3, 2017.
Sunindyo et al., "An Event-Based Empirical Process Analysis Framework," ESEM (2010).
Adrian et al., "Model Predictive Control of Integrated Unit Operations Control of a Divided Wall Column," Chemical Engineering and Processing: Process Information, 43(3):347-355 (2004).
Daniel et al., "Conceptual Design of Reactive Dividing Wall Columns," Symposium Series No. 152, pp. 364-372 (2006).
Dejanovic et al., "Conceptual Design and Comparison of Four-Products Dividing Wall Columns for Separation of a Multicomponent Aromatics Mixture," Distillation Absorption, pp. 85-90 (2010).
Dongargaonkar et al., "PLC Based Ignition System," Conference Records of the 1999 IEEE Industry Application Conference, 1380-1387 (1999).
Hiller et al., "Multi Objective Optimisation for an Economical Dividing Wall Column Design," Distillation Absorption, pp. 67-72 (2010).
International Preliminary Report on Patentability for Application No. PCT/US2014/030627, dated Sep. 15, 2015.
International Preliminary Report on Patentability for Application No. PCT/US2015/020148, dated Sep. 14, 2016.
Kiss et al., "A control Perspective on Process Intensification in Dividing-Wall Columns," Chemical Engineering and Processing: Process Intensification, 50:281-292 (2011).
Pendergast et al., "Consider Dividing Wall Columns," Chemical Processing (2008). Retrieved from the Internet at: URL:http://www.chemicalprocessing.com/articles/2008/245/?show=all.
Sander et al., "Methyl Acetate Hydrolysis in a Reactive Divided Wall Column," Symposium Series No. 152, pp. 353-363 (2006).
Schultz et al., "Reduce Costs with Dividing-Wall Columns," Reactions and Separations, pp. 64-71 (2002).
Shah et al., "Multicomponent Distillation Configurations with Large Energy Savings," Distillation Absorption, pp. 61-66 (2010).
Thotla et al., "Cyclohexanol Production from Cyclohexene in a Reactive Divided Wall Column: A Feasibility Study," Distillation Absorption, pp. 319-324 (2010).
Tututi-Avila et al., "Analysis of Multi-Loop Control Structures of Dividing-Wall Distillation Columns Using a Fundamental Model," Processes, 2:180-199 (2014).
U.S. Office Action for U.S. Appl. No. 13/784,041 dated Apr. 6, 2015.
U.S. Office Action for U.S. Appl. No. 13/784,041, dated Feb. 26, 2016.
U.S. Office Action for U.S. Appl. No. 13/784,041, dated Oct. 15, 2015.
Extended European Search Report for Application No. 17157505.3, dated Jun. 30, 2017.
First Office Action for Chinese Application No. 201410080524.6, dated Sep. 13, 2017.
First Office Action for Chinese Application No. 201410088828.7, dated Aug. 1, 2017.

(56) References Cited

OTHER PUBLICATIONS

First Office Action for Chinese Application No. 201410097623.5, dated Sep. 26, 2017.
First Office Action for Chinese Application No. 201410097873.9, dated Aug. 9, 2017.
First Office Action for Chinese Application No. 201410097874.3, dated Aug. 18, 2017.
First Office Action for Chinese Application No. 201410097921.4, dated Oct. 10, 2017.
First Office Action for Chinese Application No. 201410097922.9, dated Aug. 18, 2017.
First Office Action for Chinese Application No. 201410097923.3, dated Aug. 28, 2017.
First Office Action for Chinese Application No. 201410098326.2, dated Jul. 27, 2017.
First Office Action for Chinese Application No. 201410098327.7, dated Jul. 26, 2017.
First Office Action for Chinese Application No. 201410098982.2, dated Aug. 9, 2017.
First Office Action for Chinese Application No. 201410099103.8, dated Aug. 9, 2017.
Notice of Reasons for Rejection for Japanese Application No. 2014-051599, dated Nov. 28, 2017.
Notification of First Office Action for Chinese Application No. 201410099068.X, dated Sep. 15, 2017.
Final Rejection for Japanese Application No. 2014-048410, dated May 29, 2018.
First Office Action for Chinese Application No. 201410097872.4, dated Aug. 23, 2017.
First Office Action for Chinese Application No. 201510049715.0, dated May 4, 2018.
Notice of Reasons for Rejection for Japanese Application No. 2014-048412, dated Feb. 27, 2018.
Notice of Reasons for Rejection for Japanese Application No. 2014-049915, dated Mar. 13, 2018.
Notice of Reasons for Rejection for Japanese Application No. 2014-049916, dated Feb. 27, 2018.
Notice of Reasons for Rejection for Japanese Application No. 2014-049917, dated Mar. 6, 2018.
Notice of Reasons for Rejection for Japanese Application No. 2014-049918, dated Apr. 10, 2018.
Notice of Reasons for Rejection for Japanese Application No. 2014-049920, dated Feb. 20, 2018.
Notice of Reasons for Rejection for Japanese Application No. 2014-051595, dated Jan. 16, 2018.
Notice of Reasons for Rejection for Japanese Application No. 2014-051596, dated Jan. 16, 2018.
Notice of Reasons for Rejection for Japanese Application No. 2014-051598, dated Mar. 13, 2018.
Notice of Reasons for Rejection for Japanese Application No. 2016-503431, dated Apr. 3, 2018.
Second Office Action for Chinese Application No. 201410088828.7, dated Apr. 27, 2018.
Second Office Action for Chinese Application No. 201410097675.2, dated Feb. 11, 2018.
Second Office Action for Chinese Application No. 201410097873.9, dated May 15, 2018.
Second Office Action for Chinese Application No. 201410097875.8, dated Jun. 6, 2018.
Second Office Action for Chinese Application No. 201410097922.9, dated Jan. 9, 2018.
Second Office Action for Chinese Application No. 201410098327.7, dated Feb. 27, 2018.
Notice of Reasons for Rejection for Japanese Application No. 2014-041785, dated Dec. 5, 2017.
Notice of Reasons for Rejection for Japanese Application No. 2014-041785, dated Nov. 30, 2017.
Notice of Reasons for Rejection for Japanese Application No. 2014-048410, dated Dec. 29, 2017.
Notice of Reasons for Rejection for Japanese Application No. 2014-048411, dated Dec. 5, 2017.
Notice of Reasons for Rejection for Japanese Application No. 2014-049918, dated Dec. 12, 2017.
Notice of Reasons for Rejection for Japanese Application No. 2014-049919, dated Nov. 29, 2017.
Notice of Reasons for Rejection for Japanese Application No. 2014-051114, dated Dec. 28, 2017.
Notice of Reasons for Rejection for Japanese Application No. 2014-051596, dated Jan. 9, 2018.
Notice of Reasons for Rejection for Japanese Application No. 2014-051597, dated Jan. 9, 2018.

\* cited by examiner

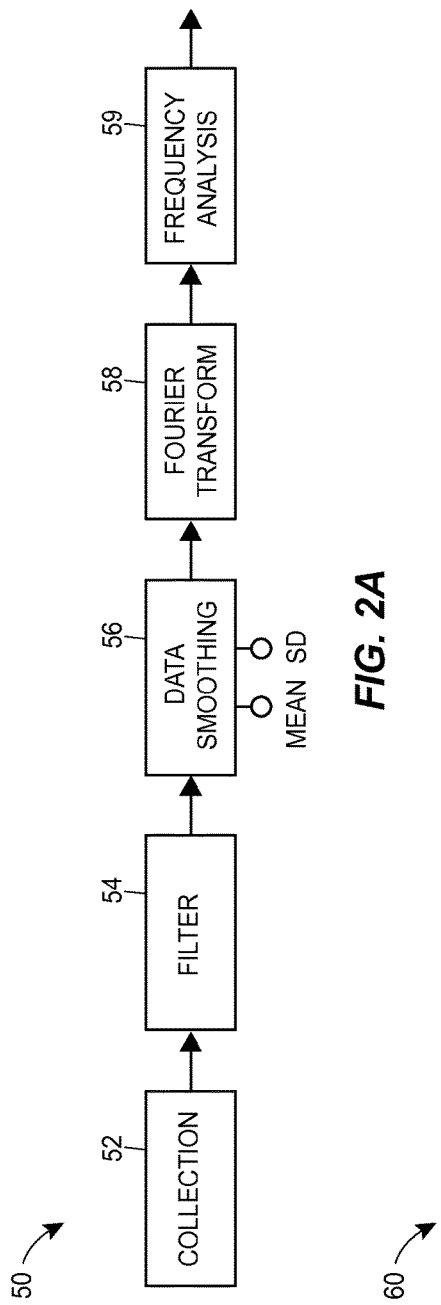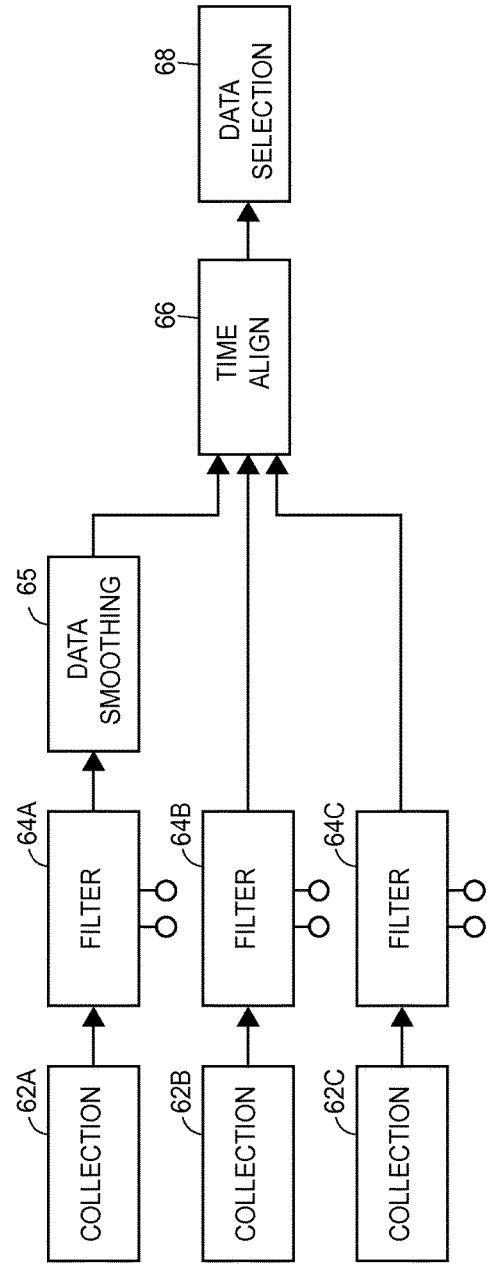

DATA PIPELINE FOR PROCESS CONTROL SYSTEM ANALYTICS

CROSS REFERENCE TO RELATED APPLICATIONS

This is a regular filed application that claims priority to and the benefit of the filing date of U.S. Provisional Patent Application Ser. No. 62/060,408, entitled "Data Pipeline for Process Control System Analytics" which was filed on filed Oct. 6, 2014, the entire disclosure of which is hereby expressly incorporated by reference herein.

The present application is also related to U.S. patent application Ser. No. 13/784,041, entitled "BIG DATA IN PROCESS CONTROL SYSTEMS" and filed Mar. 3, 2013; U.S. patent application Ser. No. 14/028,785, entitled "METHOD AND APPARATUS FOR CONTROLLING A PROCESS PLANT WITH LOCATION AWARE MOBILE CONTROL DEVICES" and filed on Sep. 17, 2013; U.S. patent application Ser. No. 14/174,413, entitled "COLLECTING AND DELIVERING DATA TO A BIG DATA MACHINE IN A PROCESS CONTROL SYSTEM" and filed Feb. 6, 2014; U.S. patent application Ser. No. 14/212,493, entitled "DISTRIBUTED BIG DATA IN A PROCESS CONTROL SYSTEM" and filed Mar. 14, 2014; U.S. patent application Ser. No. 14/212,411, entitled "DETERMINING ASSOCIATIONS AND ALIGNMENTS OF PROCESS ELEMENTS AND MEASUREMENTS IN A PROCESS" and filed Mar. 14, 2014; and U.S. patent application Ser. No. 14/216,823, entitled "DATA MODELING STUDIO" and filed Mar. 17, 2014 which claims priority to and the benefit of the filing date of U.S. Provisional Patent Application Ser. No. 61/798,820, entitled "DATA MODELING STUDIO" which was filed on Mar. 15, 2013, the entire disclosures of each of which are hereby expressly incorporated by reference herein.

Additionally, the present application is related to U.S. patent application Ser. No. 14/507,188, entitled "REGIONAL BIG DATA IN PROCESS CONTROL SYSTEMS" and filed concurrently herewith; U.S. patent application Ser. No. 14/507,252, entitled "AUTOMATIC SIGNAL PROCESSING-BASED LEARNING IN A PROCESS PLANT" and filed concurrently herewith; and U.S. patent application Ser. No. 14/506,863, entitled "STREAMING DATA FOR ANALYTICS IN PROCESS CONTROL SYSTEMS" and filed concurrently herewith, the entire disclosures of each of which are hereby expressly incorporated by reference herein.

TECHNICAL FIELD

This patent relates generally to control and monitoring systems such as those used in process plants, and more particularly, to installing and using a data pipeline to process data in a distributed manner in monitoring and control systems.

BACKGROUND

Distributed process control systems, like those used in chemical, petroleum, industrial or other process plants to manufacture, refine, transform, generate, or produce physical materials or products typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process and/or environmental parameters such as temperature or pressure, etc. to control one or more process executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system. For example, the controllers and the field devices control at least a portion of a process being controlled by the process plant or system.

Information from the field devices and the controller is usually made available over a data highway or communication network to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include wired communication paths, wireless communication paths, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

In a process plant or process control system or other monitoring system, when evidence of an abnormal condition or fault occurs (e.g., when an alarm is generated, or when a process measurement or actuator is found to have excessive variation), an operator, instrument technician or process engineer typically uses an analytics tool in combination with his or her knowledge of the process being controlled by the system and its flow path through the system to attempt to determine upstream measurements and process variables that may have contributed to the production of the evidence of the abnormal condition or fault. For example, an operator may feed a historical log of data that has been captured over time from the output of a process control device (e.g., a field device, a controller, etc.) into the DeltaV™ batch analytics product or continuous data analytics tool to attempt to determine the contributions of various process variables and/or measurements to an abnormal or fault condition. Typically, a user decides which historical data logs to feed into the analytics tool and identifies candidate upstream factors (e.g., measurements, process variables, etc.) based on his or her knowledge of the process. Subsequently, these data analytics tools utilize, for example, principal component analysis (PCA) to determine which of the candidate upstream factors impact downstream predicted quality parameters. Thus, the accuracy and effectiveness of the output provided by the analytics tool is based on or limited to the user's knowledge, and as such may not provide complete or correct insight into the sources of the abnormal condition or fault.

Additionally, the architecture of currently known process control plants and process control systems is strongly influenced by limited controller and device memory, communications bandwidth and controller and device processor capability. For example, in currently known process control system architectures, the use of dynamic and static non-volatile memory in the controller is usually minimized or, at the least, managed carefully. As a result, during system configuration (e.g., a priori), a user typically must choose which data in the controller is to be archived or saved, the frequency at which it will be saved, and whether or not compression is used, and the controller is accordingly configured with this limited set of data rules. Consequently, data which could be useful in troubleshooting and process analysis is often not archived, and if it is collected, the useful information may have been lost due to data compression.

The limitations of currently known process plants and process control systems discussed above and other limitations may undesirably manifest themselves in the operation and optimization of process plants or process control systems, for instance, during plant operations, trouble shooting, and/or predictive modeling. For example, such limitations force cumbersome and lengthy work flows that must be performed in order to obtain historical data for troubleshooting, manually feeding the data into stand-alone, off-line signal processing tools, and manually supervising the analysis of the output of the signal processing tools to generate updated models. Even then, the troubleshooting results and models may be incomplete or not fully representative of the actual system, as the inputs to their generation rely on a particular operator's experience and knowledge.

"Big data" generally refers to a collection of one or more data sets that are so large or complex that traditional database management tools and/or data processing applications (e.g., relational databases and desktop statistic packages) are not able to manage the data sets within a tolerable amount of time. Typically, applications that use big data are transactional and end-user directed or focused. For example, web search engines, social media applications, marketing applications and retail applications may use and manipulate big data. Big data may be supported by a distributed database which allows the parallel processing capability of modern multi-process, multi-core servers to be fully utilized.

SUMMARY

A system and method for providing distributed signal processing-based data processing and analysis to determine, for example, potential sources of faults, abnormal operations, and/or variations in the behavior of signals generated by controlling a process in a process plant includes forming and installing one or more data pipelines within various interconnected devices of the process plant or process control system, wherein the data pipelines automatically collect and process data in predetermined manners to perform partial or complete data analysis. The data pipelines may be used to implement signal processing-based learning which may be, for example, a type of big data based learning. Generally speaking, the systems and methods that use the data pipelines may automatically perform data processing in real time or on data being collected real-time in a process plant, or on data that is stored in a database, such as a big data machine. In some cases, some of the signal processing performed using the data pipeline architecture is integrated into the process plant, and is performed close to the source of the one or more signals in real-time as the data is generated by the signal source or sources. The data on which signal processing is performed by the data pipeline architecture may be, for example, indicative of a value over time of an output signal of a process control device, a process variable, a measurement of a physical parameter such as temperature, pressure, flow rate, etc., a balance of energy, a balance of mass, a performance parameter, an output of an analytics function, and/or any other value that is generated based on the process being controlled in the process plant. Still further, the data pipeline architecture may process other types of data than process control data, such as monitoring data (produced by a monitoring system that does not perform control), device data indicative of device operational parameters, maintenance data used by maintenance personnel to service, repair and replace devices within a network, communication data, etc.

Moreover, the data pipeline architecture may be used in a system that performs big data based learning in, for example, a process plant network, and the data processing pipeline may include multiple data processing modules communicatively connected together to perform preconfigured processing operations on data in a specific order to produce processed data. The data processing pipeline may perform data processing operations including, for example, data collection, data selection and cleaning, data alignment, sensitivity analysis, causality analysis, supervised learning, and/or unsupervised learning. These separate modules or blocks may be located in the same or in different devices within the plant network and may be communicatively connected together through one or more different communication networks within the plant network.

The data pipeline or pipelines may be generated in a data modeling studio or configuration system in which a user selects various data processing modules to be applied to particular process data, and connects the modules together to form a data pipeline having multiple processing modules connected together in a particular order. The user may test the data pipeline on stored historical data, such as data stored in a big data appliance, and after testing is complete, may download the data pipeline to various processors, nodes or devices of a plant network to implement the data processing in real time or on-real time data as that data is collected or generated by the plant devices. Moreover, the data modeling studio configuration system may enable the user to specify the node, device or other location of each of the data processing pipeline elements when downloaded to the plant network.

In one embodiment, a data pipeline runs or extends through various (e.g., two or more) communication networks within or associated with a process plant including a process control network and a further communication network. More particularly, a plant communication system for use within a process plant environment that implements a process includes a process control network including a multiplicity of process control devices disposed within the process plant to control the process and a process control communication network communicatively coupled to the multiplicity of process control devices, wherein one or more of the multiplicity of process control devices collects or generates process control data. The system also includes a further plant communication network including a plurality of processing devices communicatively coupled together by a further plant communication network link, wherein at least one of the plurality of processing devices on the further plant communication network is communicatively connected to the process control communication network. In this system, a distributed data pipeline is disposed within the plant communication system and the further plant communication network and the distributed data pipeline includes a series of data processing modules communicatively connected together in a particular communicative order to perform processing on process control data in the particular communicative order such that the data pipeline includes one or more upstream data processing modules coupled to a set of downstream data processing modules. Each of the set of downstream data processing modules within the data pipeline processes data received from one or more upstream data processing modules within the data pipeline, and at least one of the one or more upstream data processing modules of the data pipeline is disposed in one of the multiplicity of process control devices connected to the process control communication network and at least one of the downstream data processing modules of the data pipeline is disposed in one of the plurality of processing devices on the further plant communication network.

The system may further include a database communicatively coupled to one of the downstream data processing modules of the data pipeline for storing the data generated by the one of the downstream data processing modules of the data pipeline and making the stored data available to other applications via the further plant communication network. If desired, one of the upstream data processing modules is disposed in the process control network and collects raw process control data for processing by the data pipeline, and a database is communicatively coupled to the process control communication network for independently storing the collected raw process control data. The database may be disposed in one of the processing devices coupled to the further plant communication network, which may be a big data communication network. The further plant communication network may a plurality of different communication networks coupled together, including a first plant based communication network and a second cloud based communication network. In this case, the data pipeline may include at least one different data processing module stored in a processing device within each of the plurality of different communication networks. The different communication networks may include a wireless and/or a wired communication network, and the process control communication network may include a plurality of different control communication networks communicatively coupled together.

If desired, the data processing modules may be or include any of a data collection module that obtains data from a data source within the process control network, a data cleaning module that cleans data obtained from the data source within the process control network, a data alignment module that time aligns data from multiple data sources within the process control network, a sensitivity data analysis module that determines the sensitivity of data to a particular event within the plant, a causality analysis module that determines a causal relationship between data from a data source and an event within the plant, a learning module that performs supervised or unsupervised learning on process data, or a data presentation module that presents data generated within the data pipeline to a user.

Still further, the plant communication system may be constructed such that the data pipeline includes one or more data collection modules that collect process data from the process control network, one or more intermediate data processing modules that process the data collected by one or more of the data collection modules or another intermediate data processing module, and one or more end-use data processing modules that store output data generated by the one or more intermediate data processing modules or the one or more end-use data processing modules in a manner that can be accessed by one or more other applications. Still further, one or more of the data processing modules of the data pipeline may be intermittently connected within the data pipeline, either to other data processing modules within the data pipeline or to applications subscribing to data from the data pipeline. For example, one or more intermittently connected data processing modules may be data display modules that display data produced within the data pipeline to a user, these modules may be disposed in a handheld device that is intermittently connected to the further plant communication network, etc.

Additionally, the output data of a data pipeline may be made to be simultaneously accessible to two or more other applications. Still further, the data pipeline modules may execute at any desired execution rate, which rate may be different for different modules within the data pipeline. Likewise, any of the data pipeline modules may execute at a rate faster than, slower than or equal to the execution rate of a process controller that is controlling the process from which process data is being collected and analyzed within the data pipeline. Here, one of the multiplicity of process control devices is a process controller that executes one or more control routines at a controller execution rate, and the process control data collected by the one or more upstream data processing modules of the data pipeline disposed in one of the multiplicity of process control devices may be collected at a rate greater than the controller execution rate. Additionally, any number (e.g., two or more) of the data processing modules within the data pipeline may process collected data at a rate greater than the controller execution rate.

In another embodiment, a data pipeline is disposed in one or more communication networks of a process plant that processes data at a rate faster than the controller execution rate of the process control system of the process plant. In particular, a plant control and communication system for controlling a process within a plant includes a multiplicity of process control devices disposed within the plant to control the process including a process controller that executes to control the process at an execution rate. The plant control and communication system also includes a plurality of data processing devices disposed within the plant and on or more communication networks that communicatively couple the multiplicity of process control devices and the plurality of data processing devices. Here, one or more data sources is disposed within the plant and these data sources are distributed among the multiplicity of process control devices to collect raw data from the process control devices within the plant at a collection data rate greater than the execution rate of the controller. Still further, a database is communicatively coupled to the one or more communication networks for storing the collected raw data from the one or more data sources at the collection data rate and a data pipeline is disposed in the one or more of the plurality of processing devices within the plant, the data pipeline including a series of data processing modules communicatively connected together in a particular communication order, wherein at least one of the data processing modules of the data pipeline performs a data processing operation on raw data from one of the one or more data sources, and at least another one of the data processing modules performs data processing on data received from one of the data processing modules within the data pipeline. Here, at least two of the data processing modules operate at a rate faster than the execution rate of the process controller.

In this system, the at least two of the data processing modules may operate at a rate faster than the execution rate of the process controller by communicating data between the two data processing modules at a rate faster than the execution rate of the process controller and/or by performing processing on data at a rate faster than the execution rate of the process controller.

In another embodiment, multiple distributed data pipelines are disposed in a process plant to process data within the plant and to feed processed data to higher level analytic applications. In one example, a process plant communication system for use within a process plant environment that implements a process includes a process control network having a multiplicity of process control devices disposed within the plant to control the process and a process control communication network communicatively coupled between the multiplicity of process control devices, wherein one or more of the multiplicity of process control devices collects or generates process control data. Moreover, a further plant communication network is disposed in the plant and includes a plurality of processing devices communicatively coupled together by a further plant communication network link, wherein at least one of the plurality of processing devices on the further plant communication network is communicatively connected to the process control communication network. A plurality of distributed data pipelines is disposed in the system, each data pipeline including a series of different data processing modules communicatively connected together to perform processing on process control data in a particular sequence, wherein each data pipeline includes one or more data collection modules that collect process data from the process control network, one or more intermediate data processing modules that process the data collected by one or more of the data collection modules or another intermediate data processing module, and one or more ending data processing modules that produce data pipeline output data using data generated by the one or more intermediate data processing modules. Here, at least two data processing modules of each data pipeline are located in different devices within the process control communication network and the further plant communication network. The system further includes a set of higher level analytic applications that is communicatively connected within the further plant communication network, wherein each of the set of higher level analytic applications subscribes to data generated by the ending data processing module of one or more of the distributed data pipelines.

If desired, one or more of the set of higher level analytic applications may be intermittently connected to one or more of the distributed data pipelines and the data processing modules of one of the distributed data pipelines may process data and communicate data within the one of the distributed data pipelines during on-line operation of the process. If desired, one or more of the higher level analytic applications may subscribe to data (output data or end-use data) from two or more of the distributed data pipelines, and one or more of the higher level analytic applications may be disposed in a handheld device that is connected to the further plant network via a wireless communication connection.

In another embodiment, a method of processing data in a plant may be used in a plant having a process control network including a multiplicity of process control devices disposed within the plant to control a process and a process control communication network communicatively coupled between the multiplicity of process control devices, wherein one or more of the multiplicity of process control devices collects or generates process control data, and the plant control network includes a further plant network including a plurality of processing devices communicatively coupled together by a further plant communication network link. The method may include storing a distributed data pipeline within the process control network and in the further plant network, wherein storing the distributed data pipeline includes storing a series of data processing modules that are configured to be communicatively connected together in a particular order to perform processing on process control data in various different ones of the process control devices and processing devices. The method may also include collecting data at one or more of the data processing modules of the data pipeline during on-line operation of the process control network and processing the collected process data in the data processing modules of the distributed data pipeline during on-line operation of the process control network. Still further, the method may include storing the processed data developed by the data processing modules of the distributed data pipeline in a computer memory device and using the data developed by the data processing modules of the distributed data pipeline in a further application executed on a further processing device.

If desired, storing the processed data developed by the data processing modules of the distributed data pipeline in a computer memory device may include storing the processed data in a big data machine. Moreover, storing the distributed data pipeline within the process control network and in the further plant network may include storing at least one of the data processing modules within one of the multiplicity of process control devices and storing another one of the data processing modules in one of the processing devices of the further plant network. In addition, storing the distributed data pipeline within the process control network and in the further plant network may include storing at least one of the data process modules in a device within a first plant sub-network of the further plant network and storing another one of the data process modules in a second plant sub-network of the further plant network. Here, the first plant sub-network may be, for example, a big data network in the plant and the second plant sub-network may be, for example, a cloud based network.

Again, if desired, collecting data at one or more of the data processing modules of the data pipeline during on-line operation of the process control network may include collecting data at a rate faster than an exaction rate of a process controller used within the process control network to perform on-line process control.

If desired, the data pipeline may include one or more data collection modules that collect data from the process control network, one or more intermediate data processing modules that process the data collected by one or more of the data collection modules or another intermediate data processing module, and one or more end-use data processing modules that store output data generated by the one or more intermediate data processing modules or the end-use data processing modules in a manner that can be accessed by one or more other applications. For example, one of the data processing modules of the data pipeline may be intermittently connected within the data pipeline and/or the intermittently connected data processing module may be disposed in a handheld device that is intermittently connected to the further plant communication network.

In another embodiment, a method of configuring a data processing pipeline is used within a process plant having a process control network with a multiplicity of process control devices that operate to control the process and having a process communication network having a multiplicity of processing devices communicatively coupled together. The configuration method includes storing a set of data processing modules within different ones of the multiplicity of process control devices and the processing devices, communicatively interconnecting the data processing modules in a fixed manner to create a set of three or more data processing modules communicatively connected in series, and configuring the set of three or more data processing modules connected in series to perform specific types of data processing on data collected in the plant. The step of configuring may include configuring one or more of the series of data processing modules within process control devices within the process control network as data collection modules to collect raw process data, configuring one or more of the series of data processing modules as intermediate process modules to communicate with one or more data collection modules and to process the raw process data collected by the data collection modules to create intermediate process data, and configuring one or more of the series of data processing modules as end-use process modules to communicate with one or more of the intermediate data processing modules to process the intermediate process data to generate end-use process data. Additionally, the configuration method may include configuring one or more of the end-use data process modules to provide the end-use process data to one or more subscribing applications communicatively connected to the process communication network.

If desired, the method of configuring a data processing pipeline may include configuring the one or more of the series of data processing modules stored within process control devices within the process control network as data collection modules by configuring the one or more of the series of data collection modules to collect the raw process data at a rate faster than a controller execution rate of a process controller that performs process control within the process control network. Still further, configuring one or more of the series of data processing modules as intermediate data process modules may include configuring the one or more intermediate data process modules to process the raw process data at a rate faster than the execution rate of the process controller. Also, configuring one or more of the series of data processing modules as end-use process modules may include configuring the one or more of the end-use process modules to process the intermediate process data at a rate faster than the execution rate of the process controller.

The method of configuring a data processing pipeline within a process plant may include storing a set of data processing modules within different ones of the multiplicity of process control devices and the processing devices by storing some of the data processing modules in the process control network devices and others of the data processing modules in the process communication network devices. The method of configuring a data processing pipeline within a process plant may also include storing a set of data processing modules within different ones of the multiplicity of process control devices and the processing devices by storing different data processing modules to perform processing on process data in a particular sequence, wherein the stored set of data processing modules includes one or more upstream data collection modules that collect process data from the process control network, one or more intermediate process modules communicatively connected downstream from the one or more data collection modules or one or more other intermediate process modules that process the data collected by one or more of the data collection modules or another intermediate process module, and one or more end-use process modules communicatively coupled downstream from the one or more intermediate process modules that produce the end-use data using the intermediate data from the one or more intermediate process modules.

Likewise, configuring one or more of the series of data processing modules to process the process data to generate intermediate process data may include configuring the one or more intermediate data processing modules to receive data from two or more upstream data processing modules and to combine the data from the two or more upstream data processing modules to create the intermediate process data and may include configuring the one or more intermediate process modules to provide the intermediate process data to two or more downstream data processing modules. Configuring one or more of the end-use process modules to process the intermediate process data to generate end-use process data may include configuring the one or more end-use process modules to provide a stream of end-use data to multiple different applications and/or to provide end-use data to one or more intermittently connected applications. Configuring the set of three or more data processing modules connected in series to perform specific types of data processing on data collected in the plant may also include configuring two of the data processing modules to be intermittently communicatively connected together.

As an example, the method of configuring a data processing pipeline within a process plant may include storing the set of data processing modules within different ones of the multiplicity of process control devices and the processing devices by storing different ones of the communicatively coupled data processing modules in different communication networks including in the process control network and the process communication network. This storing step may also include any or all of storing one of the data processing modules of the data pipeline in a process control field device, storing one of the data processing modules in a process controller, storing one of the data processing modules in a regional big data analytics machine, storing one of the data processing modules in a cloud based data analytical machine, and/or storing one of the data processing modules in a handheld device.

BRIEF DESCRIPTION OF THE DRAWINGS

FIGS. 2A-2C are block diagrams of various different example data pipelines which may be created and installed in the plant network of FIG. 1.

DETAILED DESCRIPTION

Figure 1:
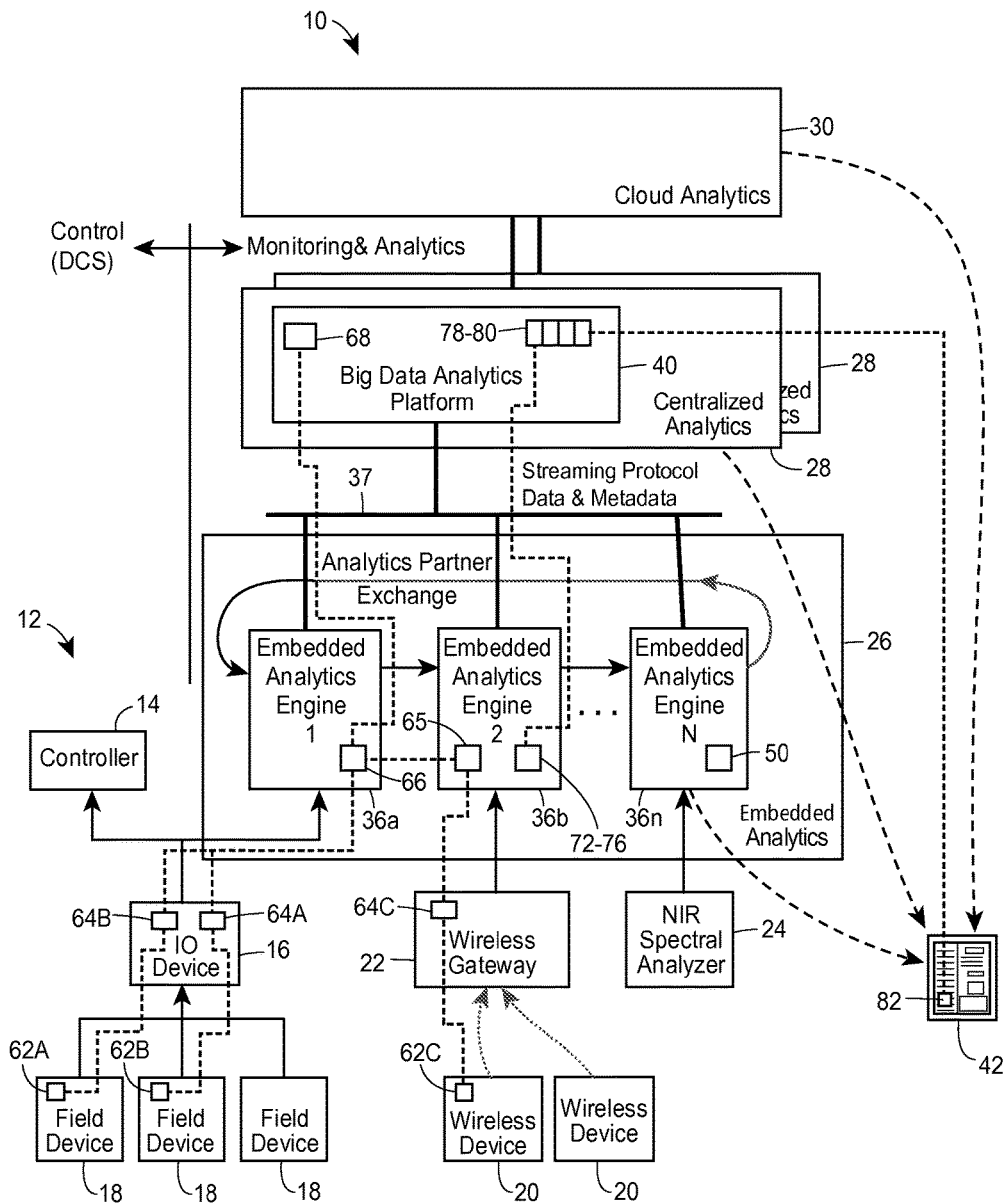
FIG. 1 is a block diagram of a plant network including process control devices, monitoring devices and big data appliance devices, in which data pipelines may be created and installed.

Techniques, systems, and methods for automatically or autonomously performing signal processing-based learning in a process plant or process control system include the creation and use of one or more data pipelines as foundational structures upon which the signal processing-based learning is performed in real time or in an on-line plant network. Generally, these techniques, systems and methods enable signal processing to be automatically or autonomously performed on or applied to data (e.g., signals) that are generated as a result of the operation of a control system or a monitoring system within a process plant, as well as being based on maintenance activities or maintenance data, monitoring data, device data, business or planning data, etc. Typically, the data or the signals on which the data pipelines operate are indicative of a parameter value that varies over time based on the control, maintenance, monitoring, etc. of the process. Thus, as used herein, the term "signal" generally refers to a time series of a parameter value, e.g., a time series of an output of a controller, a time series of a disturbance variable, a time series process variable measurement, a time series of a monitored or measured variable, etc. In contrast with known process control signal processing techniques in which a user obtains a historical signal feed from a process plant a posteriori and provides the historical signal feed into an off-line, separate signal processor, the techniques, systems, and methods described herein used data pipelines to enable one or more signal processing functions to be integrated into the process plant, maintenance system, monitoring, system or process control system so that signal processing is performed autonomously (e.g., as a background process) in real-time as the signal(s) is/are generated by one or more signal sources in real-time. Thus, using the techniques, systems, and methods disclosed herein, signal processing is incorporated into or integrated into operating, on-line process plants or systems, e.g., by positioning or locating various signal processing functions near to various signal sources within the process plant or monitoring system and enabling the results of these signal processing activities to be used by other analytic modules or higher analytic applications within the plant. Indeed, in some embodiments, one or more signal processing functions may be integral or integrated with a signal source while, in other cases, the signal processing functions may be located in more centralized devices. In any event, the integrated or incorporated signal processing functions may be configured to autonomously and automatically execute on the real-time signals generated by signal sources as a result of the real-time operations of the on-line process plant or monitoring system.

It is noted that the techniques, systems and methods discussed herein may be applied to single signal, to multiple signals respectively, and/or to multiple signals as a group or as a whole. However, for ease of discussion herein and not for limitation purposes, the singular term "signal" is utilized.

The use of one or more data pipeline structures to perform one or more signal processing functions (e.g., the application of the one or more signal processing functions to a real-time signal) may provide results that indicate one or more characteristics of a signal, that indicate other information about a signal or a group of signals, etc. In still another case, the use of data pipelines may be implemented to perform data mining and data learning in addition to data processing or signal conditioning. For example, one or more dominant frequencies or harmonics that are present in the signal may be determined by the application of the one or more signal processing functions within a data pipeline. In some process plants or process control systems, the characteristic(s) of the signal as determined by data processing performed by a data pipeline are provided to one or more analytics functions that also operate automatically or autonomously during the real-time operations of the process plant. The analytics function(s) may determine one or more sources of the characteristic(s) of the signal, e.g., based on an element alignment map or similar resource that indicates or identifies elements (e.g., process elements) that are upstream, in the process, of the signal source. In these or other cases, data learning may be performed using a data pipeline to identify other types of knowledge about the process plant, the control system, the monitoring or monitored system, etc.

Generally speaking, data pipelines are used as elemental structures in a distributed processing system implemented within a plant to clean, filter, process, and perform learning and analytics on data from various sources in a plant or other monitoring system. In particular, one or more data pipelines may be established to define specific processing to be performed on one or more streams of data received from various sources, such as from control system resources, maintenance system resources, field devices, controllers, monitoring systems, lab analyses, etc. Each data pipeline is made up of multiple different processing blocks or data processing modules which operate on certain signals or data (e.g., a stream of data) provided thereto and produce one or more data streams that are then provided to a downstream block or module within the data pipeline. Generally speaking, the initial inputs to the data pipeline will be one or more sets of raw data, such as control signals, process variable measurement signals (e.g., pressure, temperature, flow, etc. data), monitoring signals, device data, maintenance data, etc. Moreover, each block within a data pipeline will process the data input thereto (e.g., received from one or more other data processing modules in the data pipeline) in some manner to, for example, clean the data, combine the data, fill in missing data, perform filtering on the data, perform learning or analytics on the data, etc. As the data flows through the various different data processing modules of the data pipeline, the data pipeline creates new data (which may be intermediate data or end-use data) which may be exposed and be made available to other data consumers, including other data processing modules within a data pipeline, other data pipelines, other analytic modules such as higher level analytic applications. Moreover, the outputs of a data pipeline (referred to herein as end-use data) may represent or provide analytic results that may be used to, for example, set alarms, perform better maintenance or control, provide graphs and charts to a user to illustrate some operation of the plant or monitoring system, or any other knowledge gleaned from the data, as processed within the data pipeline. Still further, various different modules or blocks of a data pipeline may be implemented in different devices within a plant network or other network and data may flow between the different blocks of a data pipeline in any desired manner and at any desired speed or rate. Generally speaking, data processing modules within a data pipeline may take the form of (1) data collection modules that collect data of some sort from the plant or process, such as raw process data, controller data, I/O data, maintenance data, etc., (2) intermediate process modules which are communicatively connected to (that is, downstream of) one or more data collection modules or other intermediate process modules, and which operate to analyze (e.g., combine, process, filter, etc.) collected data or other data provided thereto from other intermediate process modules to produce intermediate data, and (3) end-use process modules which may be communicatively connected to (i.e., downstream of) one or more data collection modules or intermediate process modules and which use the data from these other modules to create processed data (end-use data) that is provided to one or more data consumers, such as user interfaces, higher level analytic applications, databases, etc. If desired, the data pipelines may operate to generate end-use data in real time during operation of the process and may provide end-use data to data consumers constantly, periodically, or intermittently. That is, end-use applications may connect to and remain connected to a data pipeline to receive end-use data from a data pipeline in a consistent or constant basis, or may periodically or intermittently connect to a data pipeline to receive end-use data when these applications or users need that data. Still further, data within the data pipeline may be collected and processed at any desired rate, such as faster than the execution rate of one or more process controllers that are controlling the process. In this case, the data pipelines within the process plant operate independently of process controllers (even though data pipelines may use or collect data generated by the process controllers).

Thus, as will be understood, data processing and knowledge learning techniques may be automatically or autonomously implemented within a plant network with the use of one or more data pipelines which, through their operation, implement specific actions on data that is collected, generated or measured within the plant to thereby enable perform specific types of higher level data processing and learning. Each data pipeline defines a series of operations or functions to be performed on a particular set of data or sets of data in a particular (e.g., fixed) order to thereby perform some overall processing that leads to knowledge about the plant or learning within the plant. In other words, each data pipeline implements a series of predetermined data processing functions in a particular, predefined order, to perform or implement one or more data models and/or to implement data learning within the plant. Typically, although not necessarily, the process plants in which at least portions of the data pipelines are utilized include a process control big data network and process control big data network nodes or devices. For example, at least some of the systems, methods, and techniques disclosed herein may be implemented in a process plant that supports localized, regional, and/or centralized big data, such as described in aforementioned U.S. application Ser. No. 13/784,041, in aforementioned U.S. patent application Ser. No. 14/174,413, in aforementioned U.S. application Ser. No. 14/212,493, and/or in aforementioned U.S. application Ser. No. 14/507,188, entitled "REGIONAL BIG DATA IN PROCESS CONTROL SYSTEMS." As such, a process plant that performs automatic or autonomous signal processing-based learning using data pipelines may include one or more big data devices, at least some of which includes a respective distributed or embedded big data appliance to operate on big data generated by a big data provider node.

In one example system, individual data pipelines may be wrapped in analytics modules which may be tagged, distributed, and used for generating predictions, specialized visualizations, alarms and alerts within a plant control or monitoring setting. That is, analytics modules may combine or use one or more data pipelines to perform analytics on plant data using the outputs of or the exposed data produced by the data pipelines. The outputs of the analytics blocks may then be used to perform predictions, monitor for faults, and provide recommendations on-line in real-time (for example, to provide operators and maintenance workers with recommendations throughout their shifts as things evolve within the plant). As will be understood, the data pipelines may be used to collect, store, process and combine time-series, asset, machine health data, monitored data, etc. in any desired manner to produce any desired or useful output.

As an example, a data pipeline architecture may be used in a plant network such as the plant network 10 illustrated in FIG. 1. The plant network 10 of FIG. 1 is illustrated as including a control system 12 having a controller 14 coupled via an input/output device 16 to various field devices 18, which may be valves, sensors, transmitters, or any other types of devices that measure process, device or plant parameters and/or that perform some physical control action within a plant. While the field devices 18 are illustrated in FIG. 1 as being wired field devices, they can be wireless devices as well or instead and may be configured in any desired manner to perform control of plant assets, systems, fluid flows, etc. Still further, the plant network 10 includes monitoring devices or other field devices or measurement devices 20 which are illustrated as being wireless devices connected within the plant network 10 via a wireless gateway device 22. The devices 20 can be any type of devices, such as maintenance devices, monitoring devices, sensors, etc. Moreover, the devices 20 may be wireless or wired devices and may communicate within the plant network 10 using any desired communication protocol and/or communications network. Still further, FIG. 1 illustrates a data processing device in the form of a spectral analyzer 24 coupled to the plant network 10. Here, the spectral analyzer 24 may periodically perform analysis on samples of the plant, or other data provided thereto, to provide or generate information or data about some aspect of the plant operation. Of course, the spectral analyzer 24 is but an example of a testing or analysis device that can be used in the plant network 10 to provide information or data about the operation of the plant, control system, monitored system, etc. Moreover, it will be understood that any other types of data providers can be coupled to the plant network 10, including devices that provide off-line lab measurements or analyses, other types of analyzers, such as signal analyzers of any type.

As illustrated in FIG. 1, the plant network 10 also includes various levels of analytic structure including one or more embedded analytics layers 26, also referred to herein as regional big data nodes, centralized analytic layers 28, and cloud based analytic layers 30. Each of the regional, centralized and cloud based analytic layers 26, 28, 30, include one or more analytic engines or signal processing engines that may be executed on one or more processors, computers, servers, etc. at these layers in the plant network 10. As illustrated in FIG. 1, the regional embedded analytics layers or blocks 26 may include one or more analytic engines 36a-36n which may be embedded within devices in the plant 10 closer (in a logical or communicatively connected manner) to the control system 12 and monitoring system devices (e.g., 20, 22, 24, etc.) While the analytic engines 36a-36n may be implemented in controllers, field devices, gateway devices, etc., these engines may also or instead be implemented in stand-alone processing devices that, for example, implement big data machines. The analytic engines 36a-36n may be connected together via a streaming protocol bus 37 and may be connected to various ones of the control devices 14, 16, 18, of the control system 12, to the monitoring devices 20, 24 or to other devices within the system, such as the spectrum analyzer 24 via various different buses or communication networks which may use the same or different communication protocols. In some cases, the embedded analytic engines 36a-36n may be embedded within the control and monitoring devices or other devices, or may be stand-alone devices or chips within devices that perform data analytics.

As illustrated in FIG. 1, the embedded analytics engines 36a-36n are connected together and are connected to analytics platforms 40 in one or more of the centralized analytics layers or blocks 28 via an analytics bus 37. The analytics platforms 40 in the centralized layers or centralized big data nodes 28 may be a big data platform having a big data appliance as will described in more detail herein. The analytics engines 36a-36n and the big data platforms 40 may store the data from the devices in the control, monitoring and analytics machines at the lower levels of the plant network 10 of FIG. 1. Still further, the big data appliances of the centralized layers 28 may be connected to data analytics within the cloud based analytic block 30. While not illustrated in FIG. 1, the cloud based analytic block 30 may include any number of analytic devices and big data devices that perform data analytics on the data provided thereto or available thereto via the other levels or blocks of FIG. 1.

Still further, as illustrated in FIG. 1, one or more handheld devices 42 may connect wirelessly to any of the analytic machines, for example, any of the devices in the analytic blocks 26, 28 and 30, to perform data analytics. Thus, for example, one or more handheld devices 42 may interface with the analytic engines 36a-36n, with the big data appliances 40 and/or with servers or other machines in the cloud analytics block 30 to perform data analytics using data pipelines. While not explicitly illustrated in FIG. 1, the handheld devices 42 may connect to other devices to acquire data, such as to the field devices 18, monitoring devices 20, controllers 14, I/O devices 16, gateways 22, data processing devices 24, etc.

As will be understood, the lower tiers of FIG. 1 illustrate that data is collected from several data sources (I/O devices, I/O buses, wireless and wired field devices, near-infrared spectroscopy devices, and equipment monitoring systems, for example). Although a portion of the data may be sent to traditional controllers 14, the bulk of the data is streamed to the embedded analytics engines 36a-36n in the regional big data nodes (i.e., the embedded analytics layers 26) of the network 10. The embedded analytics engines 36a-36n cache the data and begin processing locally in real-time, and the embedded analytics engines 36a-36n may include both learning and runtime execution capability. Because there are many types of analytics, fault detection, and recommendation systems possible, the analytics engines 36a-36n may be capable of executing a wide range of algorithms. As part of this capability, the analytics engines 36a-36n may include specialized signal processing and learning chips (TI signal processing and IBM neuro-learning chips, for example). Such a combination of hardware and software may be utilized to perform predictions, fault detection, and provide recommendations. As part of this system, the embedded analytics could begin identifying leading indicators for the equipment they are monitoring and then work with other embedded analytics engines to identify the parameters that have the greatest impact on those leading indicators. Once trained, the embedded analytics modules 36a-36n could then be downloaded where they would then be used to monitor the process, assets, and equipment. A unique feature is that the analytics engines 36a-36n can continuously learn in a manner defined by a data pipeline, and such learning could be cached for consideration at a later date at any of the big data devices or nodes.

Still further, as illustrated in FIG. 1, the data analytics can be executed or run in the handheld devices 42. In fact, with the development of new chipsets with built-in analytics capabilities, the handheld units 42 may be one of the best places to actually run analytics. With this factor in mind, the handheld devices 42 may pull data from the lower lever devices such as controllers 14, field devices 18, monitoring devices 20, and from higher level devices, such as embedded analytics engines 36a-36n, centralized big data servers 40, and the cloud layer 30, to perform specialized processing. In such a case, specialized applets could be developed for specific equipment, devices, processes, companies, etc. and these applets could be executed on the handheld devices 42.

As noted above, the strategies sent to the embedded analytics engines 36a-36n, for example, may include one or more analytics blocks chained together into a data pipeline. For example a first block in the data pipeline may be used to filter certain data (e.g., controller data, field device data, measurement data, monitoring data, device data, etc.), a second block in the data pipeline may be used to address missing data within the filtered set of data (e.g., find the missing data, fill in the data based on interpolation or other techniques, etc.), a third block in the data pipeline may be used to time align the data from the second block, a fourth block in the data pipeline may be used to select parameters from an array or matrix of the aligned data, a fifth block in the data pipeline may be used to perform fault detection from the selected parameters, and a final block in the data pipeline may be used to perform predictions on the fault detection data. Each data pipeline may be hosted by a module that includes alarms/alerts and that may manually adjustable alarm limits, for example.

Of course, each data pipeline could include various different or various different types of data processing blocks that may be used to perform processing on data collected within the plant 10. For example a block or module within a data pipeline could include or perform 1) data cleaning (to remove noise and inconsistent data), 2) data integration (where multiple data sources may be combined), 3) data selection (where data relevant to an analysis task are retrieved from the database), 4) data transformation (where data are transformed and consolidated into forms usable by downstream algorithms or blocks), 5) data mining (an essential process where intelligent methods are applied to extract patterns within data), 6) pattern evaluation (to identify the truly interesting patterns representing knowledge based on interestingness measures), etc. Additionally, knowledge presentation and predictions may be generated by one or more data pipelines or blocks within data pipelines. In some cases, for example data pipelines may include visualization techniques to present findings and may include on-line models that may be used to provide predictions in control or monitoring. Moreover, in some cases the predictions may also be tied back into control strategies, thereby closing the control loop based on data pipeline analyses.

Figure 2C:
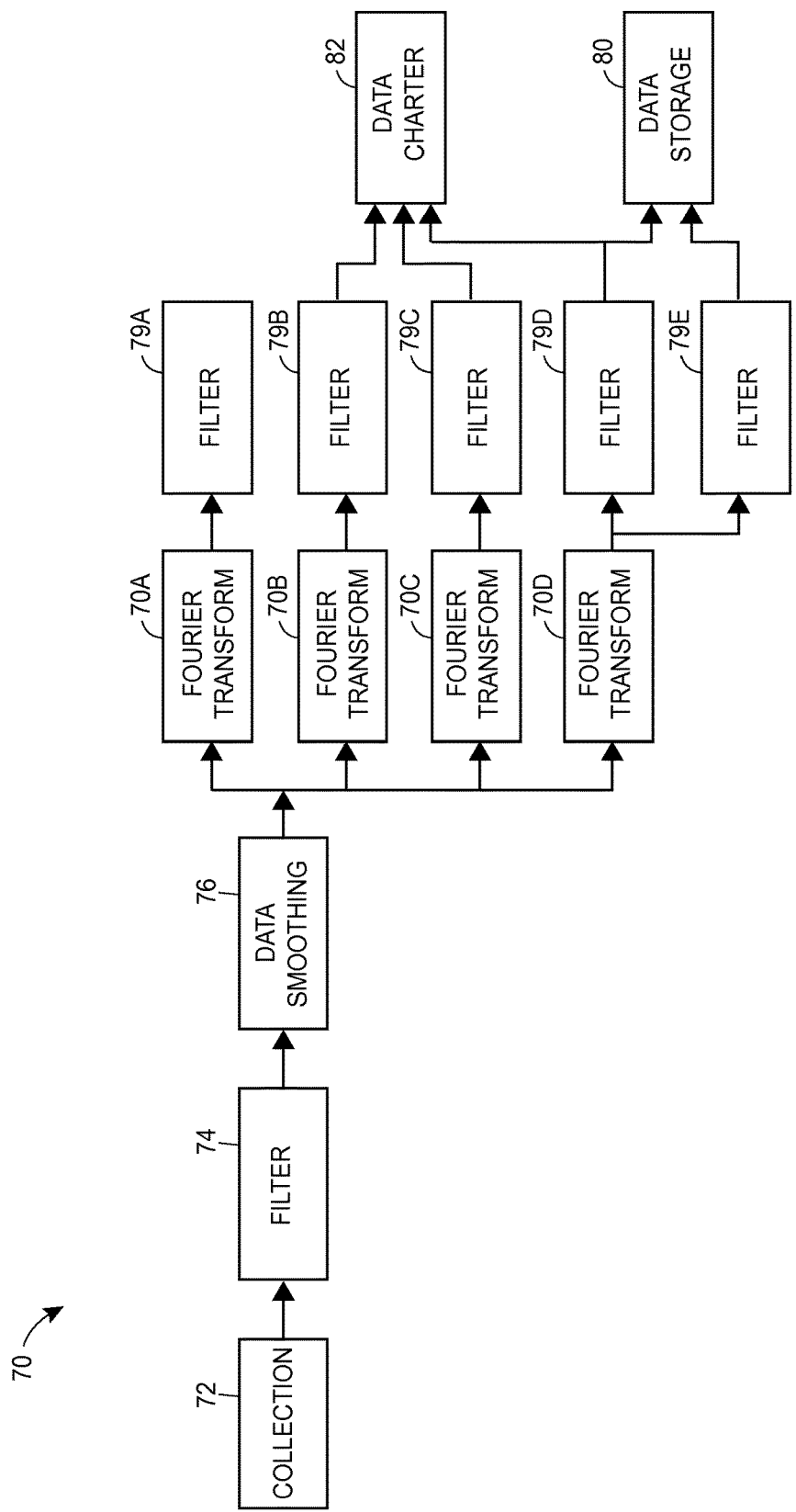

As an example only, FIGS. 2A-2C illustrate various different data pipelines that could be implemented in a plant network 10 such as that of FIG. 1. In particular, FIG. 2A illustrates a data pipeline 50 having five data analytics blocks communicatively coupled together (as illustrated by the arrows) to perform different data processing tasks on a single stream of data. In the example data pipeline 50 of FIG. 2A, a first data processing block 52 collects process data of a particular type (e.g., monitoring or valve data), a second block 54 filters the data collected by the block 52, a third data processing block 56 performs data smoothing by filling in missing data or processing the filtered data to eliminate outliers, etc. The block 56 is illustrated as providing or making certain calculated data visible or exposed for use by other blocks (as part of different data pipelines or analytic modules which may connect to or obtain the exposed data). In the case of the block 56, the average (mean) and standard deviation (SD) of the filtered and smoothed data is provided as exposed parameters. In any event, a fourth block 58 of the data pipeline 50 performs a Fourier transform on the filtered and smoothed data from the block 56 and may provide a frequency representation of the data at the output thereof. A block 59 in the data pipeline 50 then performs an analysis of the frequency data at the output of the block 58 to determine one or more dominant frequencies of the signal. The dominant frequency data may be the ultimate output of the data pipeline 50 and may be stored in a database or exposed for other analytic blocks to use.

In a similar manner, FIG. 2B illustrates a data pipeline 60 having various data processing blocks that converge data streams within the data pipeline 60. In this example, the data pipeline 60 has three data collection blocks 62A-62C which are connected to receive different data streams from various different devices or data sources, filter blocks 64A-64C which filter the data streams from the blocks 62A-62C and a data processing block 65 which may process data from one of the filter blocks 64A to remove outliers. A block 66 then time aligns the data from the blocks 64B and 64C and 65 to produce a matrix of time aligned data while a block 68 selects data within the matrix of data produced by the block 66 to perform further processing. The filter blocks 64A, 64B and 64C are illustrated as exposing parameters about the filtered data, such as any statistical measure of the filtered or incoming data, the filter coefficients, etc. Of course, other data could be calculated and exposed by these or any others of the blocks in the data pipeline 60 of FIG. 2B.

Still further, FIG. 2C illustrates a data pipeline 70 that includes blocks that operate on diverging data streams. In this case, a first data processing block 72 (e.g., a data collection module) collects process data of a particular type (e.g., monitoring or valve data), a second block 74 (e.g., an intermediate process module) filters the data collected by the block 72, and a third data processing block 76 (e.g., another intermediate process module) smoothes the filtered data by filling in missing data or processing the filtered data to eliminate outliers, etc. Thereafter, blocks 78A-78D (also intermediate process modules) perform Fourier transforms on the filtered and smoothed data from the block 76 at different sampling rates and blocks 79A-79E filter the data from the Fourier transform blocks 78A-78D. In this case, the blocks 79D and 79E may filter the same data from the block 78D using different filtering coefficients (e.g., pass ranges), to produce different sets of filtered data. In any event, the data from the blocks 79A-79E may be stored in a database by a block 80 (which may be an end-use process module) for use in other analytics, may be presented to a user as a graph or chart by a block 82 (which may be an end-use process module), etc.

As will be understood, each of the blocks in the various data pipelines of FIGS. 2A-2C may be stored and executed in different or in the same devices, processors, etc. within the plant network 10 of FIG. 1. As an example, the data pipeline 60 of FIG. 2B is illustrated in FIG. 1 as having the various data processing blocks thereof disposed in different devices within the plant network 10. In this case, the data collection blocks 62A-62C are disposed in various ones of the field devices 18 and 20 of FIG. 1, with the filtering blocks 64A-64C being stored and executed in various ones of the I/O devices 16 and gateway devices 22. The smoother block 65 is stored and executed in one of the analytic engines 36b while the time aligning block 66 is stored and executed in another one of the analytic engines 36a. The selection block 68 is stored and executed in the big data analytics platform 40. Of course, each of the separate blocks of the data pipeline 60 are communicatively connected over the different communication networks coupled between the devices in which these blocks are executed, and the blocks of the data pipeline 60 are configured to communicate with one another (as defined by the data pipeline 60) using appropriate communications for that network or via inter-network communications. Thus, a particular data pipeline may be distributed out among devices that use different communication networks and protocols and still operate seamlessly. Of course, the data exposed or output by any of the blocks of the data pipeline 60 may be provided to or accessed by any of the other devices or applications in the plant network 10, including those in the handheld devices 42, the cloud 30, etc.

As a further example, the entire data pipeline 50 of FIG. 2A is illustrated as being disposed in and executed in the analytics engine 36n. In another example, the first three blocks of the data pipeline 70 of FIG. 2C are illustrated as being executed in the analytics engine 36b while most of the rest of the data processing blocks of the data pipeline 70 of FIG. 2C are illustrated as being executed in the big data platform 40 with the charting block 80 being illustrated as being run in a handheld device 42.

Of course, the configuration and locations of the various blocks of the data pipelines of FIG. 2C are exemplary only and any particular block or module of a data pipeline may be stored and executed in any suitable device within the plant network 10 based on, for example, the processing power of the device, the data storage capability of the device, the proximity of the device to a data source, etc. Moreover, different data processing modules of the same data pipeline may be stored in different networks, such as in a process control network (e.g., any of those associated with the field devices 18 and/or 20 and the controller 14 of FIG. 1) and/or a plant communication network, such as any of the communication networks 26, 28, 30 or FIG. 1. The point is that, once created and installed in the various devices in the plant network 10, a data pipeline operates on the data provided thereto to produce new data which can be stored or provided to any of various analytic modules routines, other data pipelines, etc. which may use this data to run models, perform higher level analytics, present data to a user, etc. In some cases, the data pipelines may themselves be analytic modules that are generally distributed in the plant 10 to process data streams in known or predetermined manners to make new data or new types of data available for use or processing by other analytic modules or for consumption by a user. Of course, if desired, data pipelines may be used to implement an entire analytic module (from start to finish) or may be incorporated into or used as a portion of an analytic module. As a result, a particular data pipeline, once installed in a plant, may be used by more than one analytic module to perform different types of analytics on the same data or using the same data.

Moreover, it will be understood that the data pipelines of FIGS. 2A-2C are merely examples and that any other types of data pipelines defining any set of processing blocks communicatively coupled together in any particular order may be designed and used. Still further, data pipelines may have converging or diverging streams or both, and may be much more complicated than the simple data pipelines illustrated in FIGS. 2A-2C, with any number of diverging and/or converging branches, any number of modules connected in any manner, etc.

As will be appreciated, the use of data pipelines as fundamental data processing architectural concept in monitoring and analytics systems enables the efficient processing of data in real-time or in a time frame used by analytic modules. Such a data pipeline includes a set of algorithms that have been arranged in a specific order and configured in order to develop models that may be used by other analytic modules. The resultant models may be downloaded and used in a runtime environment to perform predictions, fault detection, and recommendations. Modules that may be included in the data pipeline include, for example, data selection and/or data cleaning modules, data alignment modules, sensitivity analysis modules, causality analysis modules, supervised learning modules and unsupervised learning modules.

Moreover, data pipelines or any of the processing modules within any of the data pipelines can execute data collection and processing at any desired communication and data processing rates. As an example, data pipelines or the processing modules thereof may collect raw process data at a data rate faster than, the same as, or slower than the execution rate of a process controller disposed within a process control network in which the raw process data is generated. Generally speaking, it is typically desirable to collect raw process data at a data rate faster than the execution of a process controller that may use such data to perform process control activities within a plant. Moreover, to process such data in real-time, it is typically desirable to configure at least some of the data processing modules in a data pipeline to operate at an execution rate faster than the execution rate of the process controller and possibly to send data between different processing modules of a data pipeline at rates faster than the execution rate of the process controller. This higher data rate enables a data pipeline to process and analyze raw data at a data rate faster than the controller execution rate, which typically enables better or more complete process analytics.

Figure 3:
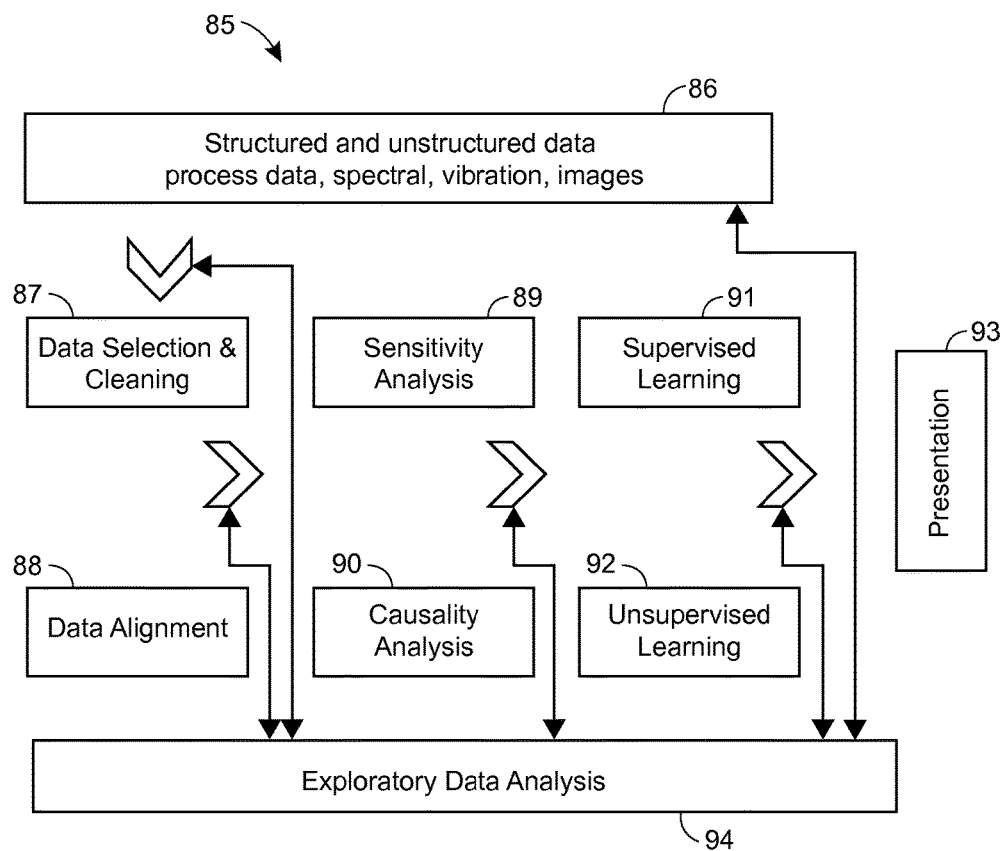
FIG. 3 is a block diagram illustrating a set of data processing functions that can be combined in various manners to create one or more data pipelines in a plant network.

In a more general sense, FIG. 3 depicts a block diagram 85 of various types of data processing blocks or functions that can be connected together to form a data pipeline within a plant network. In particular, a block 86 represents one or more sources of data within the plant including structured and unstructured data, such as process data, spectral data, vibration data, image data, etc. The data sources represented by the block 86 can be any data source, such as a source of measured or raw data, processed data, control data, monitoring data, maintenance data, device data, data produced by other data pipelines or other analytics modules, etc. This data can be available from an on-line source, from a database or historian or from an external source (e.g., the internet, a source external to the plant network, etc.)

The diagram 85 also includes blocks representing various types of processing that can be performed by one or more data processing blocks in a data pipeline, including a data selection and cleaning block 87, a data alignment block 88, a sensitivity analysis block 89, a causality analysis block 90, a supervised learning block 91, and an unsupervised learning block 92. The blocks 87-92 include the main types of data processing functions that can or will be performed in a data pipeline, and each data pipeline will typically include one or more processing blocks of the types represented by the blocks 87-92 communicatively connected together in some manner. As illustrated by the arrows in FIG. 3, the blocks 87-92 in a data pipeline will obtain data from the block 86 (e.g., some specified source of data) and may be connected together in any order or manner to perform various data processing functions.

Still further, as illustrated by a presentation block 93 and an exploratory analysis block 94 in FIG. 3, the data pipelines created from a combination of one or more of the blocks 87-92 can provide outputs or processed data to various users in the plant network. The presentation block 93, for example, provides some type of presentation of the data produced by the data pipeline. Such a presentation may be, for example, a graph, a chart, a view box, an animation, etc., that provides some representation, illustration, depiction or other viewing of the data produced by one or more blocks of the data pipeline (e.g., from a causality block 90, a sensitivity block 89, a supervised or unsupervised learning block 91, 92, etc.) Likewise, the exploratory analysis block 94 can provide a user with an interface into a data pipeline to make changes, add new or change data sources, debug the data pipeline, etc., all in an effort to create new or more useful data pipelines, to try new data processing or new sources of data in the data pipeline, etc.

Of course, there are many types of algorithms or techniques that may be used to perform data processing in any of the blocks 87-92, and only a few examples of these techniques will be discussed below. In particular, the data selection and cleaning functions of the block 87 may be implemented using various techniques. For example, these blocks may select or specify the parameters or data to clean and the time period of data to clean or use using any desired techniques. These selections may be absolute or fixed as specified by the block creator or may be determined based on some ongoing criterion or calculation. For example, the data selection may start automatically when a specified parameter shows high variability (either on-line or in the historical data stored in a database). A data selection block 87 may explore the period of time when variability is high for a parameter of concern and may extend this period, based on the process response time, for example, to the past and to the future if such data is available. In another case, a data selection block 87 may review variability of downstream and upstream parameters within a defined period of time, and may select parameters which exceed minimal variation (assuming upstream/downstream parameters are predefined at the configuration or otherwise). If an upstream/downstream path within a plant is not defined, the data selection block 87 may select parameters for the process unit, develop a principle component analysis (PCA) with the data over the selected period of time, may calculate an oscillation significance index (OSI) for all parameters, and may then select parameters based on this index value. Of course, many other manners of selecting data may be used.

In another case, a data selection and cleaning block 87 may detect missing or bad data and perform data correction or exclusion on this data. For example, a block 87 may give a bad status data value the last known good value for that variable (e.g., on-line). In another case, a block 87 may fill in missing data using interpolation techniques. For example, if the slope of the data trend of the last good portion of data (before the missing data) is about the same as the slope of the portion of data after the period of missing data, the missing parameter values may be filled in according the slope. This rule may be applied up to a length of data equal to the process response time or if process response time is unknown up to a predetermined number of samples (e.g. 10). If the slopes of data prior to and after the missing data are not the same, the variable mean value of the data may be applied to generated the missing data values. Likewise, if a significant number of values of data are missing, e.g., two times more than the available data, or if several variables are bad in the same time period, the period of time when data is bad can be cut from the data set. Any known procedure for excluding or separating data for multi-state models or for performing data slicing may be used. In this case, the data slicing may be performed after defining parameter delays relative to the leading variable. For unsupervised learning, a simple data cut may be applied. Still further, if more than 20 percent of the values over a selected period are bad, the variable may be excluded from the modeling/learning altogether, unless this variable is a key variable which definitely needs to be in the analysis.

In still another case, the block 87 may perform outlier removal by applying, for example, a 3σ (standard deviation rule), or applying a Hammel analysis, (i.e., a median absolute deviation rule), or applying a model based rule (e.g., AR/ARIMA) or applying Kalman based outlier detection rules, to name but a few.

Still further, a data selection and cleaning block 87 may perform data filtering. For example, a block 87 may apply filtering only when a specific application requires the filtering or may provide a selection of the any desired or known filtering techniques, such as Savitzky-Golay filtering, exponential filtering, averaging filtering, optional wavelet filtering, etc.

In a similar manner, a block 88 may perform data alignment using any desired techniques. For example, data alignment may be performed by selecting a downstream quality parameter for a supervised learning or a process downstream leading parameter with a significant variation for unsupervised learning. The data alignment may apply a cross-correlation algorithm for each upstream parameter one by one to define a time delay for upstream parameters or may apply PCA techniques for each upstream parameter for defining time delay. The block 88 may develop a new file of aligned data based on the time delays and, when the quality parameter is determined in a lab, may use only the first value after a change.

In still a further case, a block 89 may perform sensitivity analysis using, for example, a time aligned file (such as produced a block 88) and develop a partial least squares (PLS) model. The block 89 may define gain for every model input experimentally using step changes on every input sequentially (to determine sensitivities of variables to changes in other variables). The block 89 may exclude inputs with smaller than minimal gain from the model configuration and may optionally apply PCA and develop OSIs (oscillation significance indexes) for input parameters.

Likewise, a block 90 may perform causality analysis using non-aligned and/or aligned files and may develop PCA models from these files. The block 90 may also define OSI indexes for input parameters (significance indexes), and may exclude inputs with smaller than required minimal index value from the model configuration.

Still further, a block 91 may perform supervised learning using any desired non-linear models, such as neural network models, or linear models such as PLS or MLR models. A block 92 may perform unsupervised learning by applying analytic modeling, such as PCA and SVD modeling, by performing data clustering, K-means, k-NN, decision trees, bagging, boosting, random forest, conditional Bayesian probability analyses, etc. Of course, these are just a few examples of the types of processing that can occur or that can be implemented in each of the blocks 87-92 in a data pipeline and many other types of data processing can be applied as well or instead.

Figure 4:
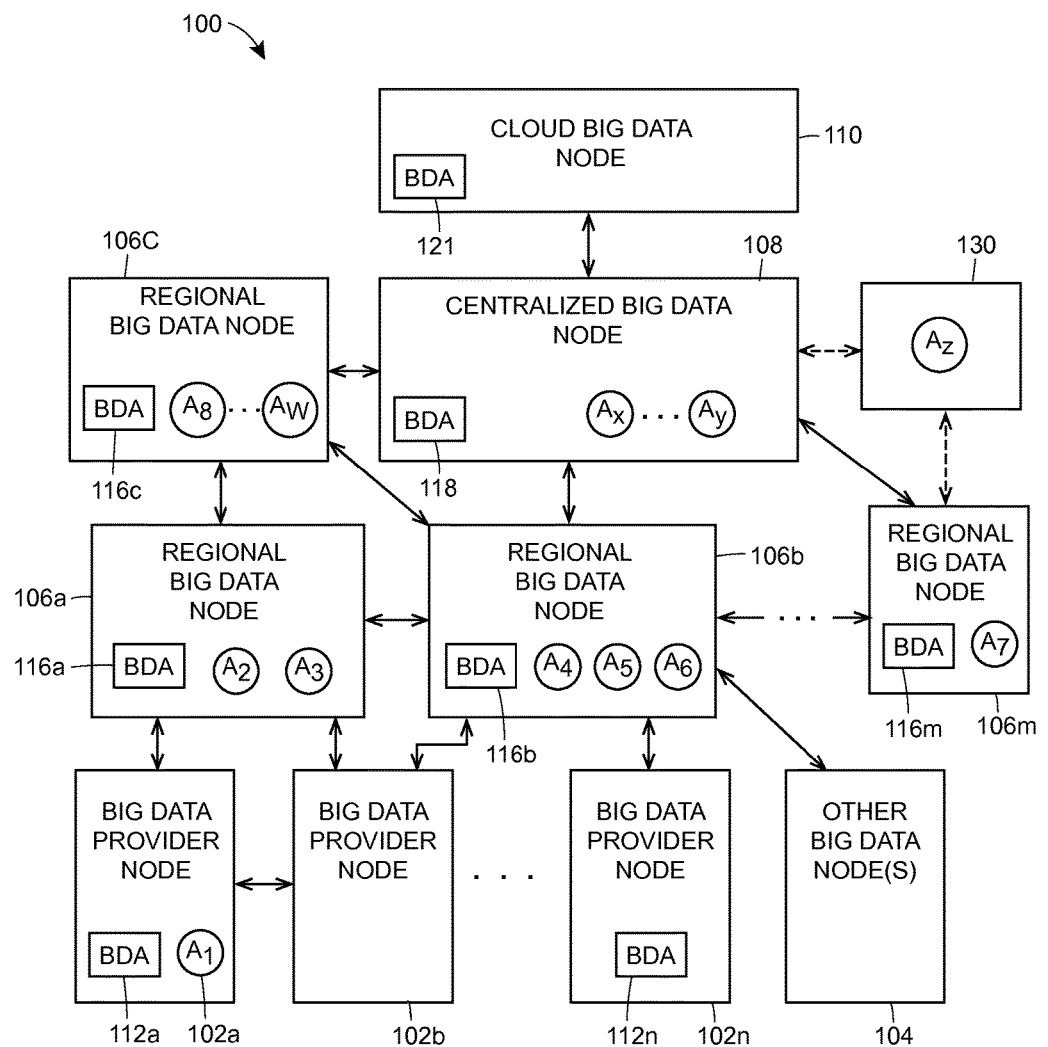
FIG. 4 is a block diagram of an example big data network for a process plant or process control and monitoring system which may support automatic or autonomous signal processing-based learning using data pipelines.

As a further example of the use of data pipelines, FIG. 4 depicts a simplified block diagram of an example big data network 100 for a process plant or process control system that controls one or more processes and that supports process control big data and, in particular, that operates using one or more data pipelines to implement one or more instances of the automatic or autonomous signal processing-based learning. The process control big data network 100 includes one or more process control big data nodes 102-110, each of which collects, observes, generates, stores, analyzes, accesses, transmits, receives, and/or operates on process control big data. The terms "process control big data," "process big data," and "big data," as used interchangeably herein, generally refer to all (or almost all) data that is generated, received, and/or observed by devices included in and associated with the process control system or plant. In some cases, all data that is generated by, created by, received at, or otherwise observed by all devices included in and associated with the process plant is collected and stored as big data within the process control big data network 100.

The example process control big data network 100 includes one or more different types of process control big data nodes or devices 102-110, each of which collects, observes, generates, stores, analyzes, accesses, transmits, receives, and/or operates on process control big data generated from or based on the control of the one or more processes by the process plant or process control system. Each process control big data node or device 102-110 is connected to a process control system big data network backbone (not shown), and may use the backbone to communicate with one or more other process control big data nodes. Accordingly, the process control big data network 100 comprises the process control system big data network backbone and the process control big data nodes 102-110 that are communicatively connected thereto. In an example, the process control big data network 100 includes a plurality of networked computing devices or switches that are configured to route packets to/from various other devices, switches or nodes of the network 100 via the backbone. As will be described in more detail, one or more data pipelines may be implemented within the various devices, nodes, etc. of the big data network 100 to perform data processing and supervised or unsupervised learning on data generated within, collected within or otherwise available at the various nodes 102-110 of the big data network 100.

The process control big data network backbone may include any number of wired communication links and any number of wireless communication links that support one or more suitable routing protocols, e.g., protocols included in the Internet Protocol (IP) suite (e.g., UDP (User Datagram Protocol), TCP (Transmission Control Protocol), Ethernet, etc.), or other suitable routing protocols. The backbone may support a streaming protocol such as the Stream Control Transmission Protocol (SCTP) and/or another suitable streaming protocol to stream (e.g., transport) data between process control big data nodes. For example, aforementioned U.S. application Ser. No. 14/506,863 entitled "STREAMING DATA FOR ANALYTICS IN PROCESS CONTROL SYSTEMS" describes examples of streaming protocols and techniques for process control big data, any one or more of which may be utilized by the process control big data network backbone in the network 100. Typically, each node included in the process data big data network 100 may support at least an application layer (and, for some nodes, additional layers) of the routing protocol(s) supported by the backbone. In some cases, each process control big data node 102-110 is uniquely identified within the process control system big data network 100, e.g., by a unique network address.

At least a portion of the process control system big data network 100 may be an ad-hoc network. As such, at least some of the nodes 102-110 (and/or one or more other nodes, such as a user interface device 130) may connect to the network backbone (or to another node of the network 100) in an ad-hoc manner.

As FIG. 4 is a simplified diagram that depicts communicative connections between various big data nodes 102-110 in the process control big data network 100, the process control network backbone is not explicitly illustrated in FIG. 4. However, an example of such a backbone which may be utilized with any or all of the techniques described herein is described in aforementioned U.S. patent application Ser. No. 13/784,041. Of course, any or all of the techniques described herein are not limited to being utilized with the backbone described in U.S. patent application Ser. No. 13/784,041, but may be utilized with any suitable communication network backbone.

Turning now to the different types of process control big data nodes or devices 102-110, generally, a process control big data node of the network 100 may be a "big data provider" and/or may include a "big data appliance," as is discussed below.

The terms "big data provider," "big data provider node," or "provider node," as used interchangeably herein, generally refer to a process control big data node that collects, generates, observes, and/or forwards process control related big data using the process control big data network 100. The process control big data that is generated, collected, observed, and/or forwarded by provider nodes may include data that has been directly utilized in or generated from controlling or monitoring a process within the plant, e.g., first-order real-time and configuration data that is generated or used by process control devices such as controllers, input/output (I/O) devices, and field devices such as transmitters, sensors, etc. Additionally or alternatively, process control big data provider nodes may generate, collect, observe, and/or forward data related to delivering and routing such first-order process control data and other data within the process plant, e.g., data related to network control of the big data network 100 and/or of other communication networks in the plant, data indicative of bandwidth, network access attempts, diagnostic data, monitoring data, etc. Further, some process control big data provider nodes may generate, collect, observe, and/or forward data indicative of results, learning, and/or information that has been learned within the process control big data network 100 by analyzing process control data, monitoring data, maintenance data, etc. that it has collected. Typically, such analytics results, learning, and/or learned information are generated from automatic, autonomous analytics performed by one or more process control big data nodes using one or more data pipelines as described herein.

In some cases, a big data provider node may include multi-core hardware (e.g., multi-core processors) for transmitting and receiving big data in real-time (e.g., streamed) and, in some embodiments, for caching the real-time big data in preparation for streaming or other delivery over the process control big data network 100. A big data provider node may, in some embodiments, also include high-density memory for the caching of the real-time big data. Examples of real-time data that may be transmitted, received, streamed, cached, collected, and/or otherwise observed by big data provider nodes may include process control data such as measurement data, configuration data, batch data, event data, monitoring data, maintenance data (such as that collected by or generated by maintenance devices, algorithms, procedures, etc.) and/or continuous data. For instance, real-time data corresponding to configurations, batch recipes, setpoints, outputs, rates, control actions, diagnostics, alarms, events and/or changes thereto may be collected. Other examples of real-time data may include process models, statistics, status data, and network and plant management data. In some embodiments, a big data provider node does not cache at least some of the real-time big data that it observes, but instead streams the un-cached data to one or more other big data nodes as the data is observed, received, or generated at the node. Examples of big data provider nodes which may be utilized with any or all of the techniques described herein may be found in aforementioned U.S. patent application Ser. Nos. 13/784,041, 14/174,413, and 14/212,493. Of course, any or all of the techniques described herein may be alternatively or additionally utilized with big data provider nodes other than those described in U.S. application Ser. Nos. 13/784,041, 14/174,413, and 14/212,493.

The terms "big data appliance," "big data appliance node," or "appliance node," as used interchangeably herein, generally refer to a process control big data node that receives, stores, retrieves, and analyzes process control big data. As such, a process control big data appliance (or "BDA") generally operates on big data that has been generated or provided by one or more process control big data provider nodes. In some cases, a big data appliance is included in a big data provider node, or is integrally co-resident with a big data provider within a same node or device. In such cases, the big data appliance is referred to as an "embedded big data appliance," as the appliance is embedded in the provider node or device and operates on the big data that has been received, collected, or generated by the co-resident big data provider. In an example, an embedded big data appliance analyzes big data that has been locally generated and/or provided by the big data provider node on which the embedded big data appliance resides to discover or learn knowledge. This learned knowledge may be stored at the embedded big data appliance, operated on locally by the embedded big data appliance, and/or provided as big data to other big data nodes. Any or all of the techniques described herein may be utilized in conjunction with embedded big data appliances such as described in aforementioned U.S. patent application Ser. No. 14/212,493 and/or in U.S. patent application Ser. No. 14/507,188, entitled "REGIONAL BIG DATA IN PROCESS CONTROL SYSTEMS", for example, although other suitable embedded big data appliances may be additionally or alternatively utilized. Further, it is noted that in embodiments in which a big data provider node includes an embedded big data appliance, the cache of the big data provider node may be reduced in size or omitted, as the embedded big data appliance provides local data storage capabilities.

In some cases, a big data appliance may be a stand-alone big data node of the process control big data network 100. That is, in these cases, a big data appliance is not embedded in or co-resident with a big data provider node. Thus, a process control big data node that includes a big data appliance may not necessarily itself be a provider of big data.

Figure 5:
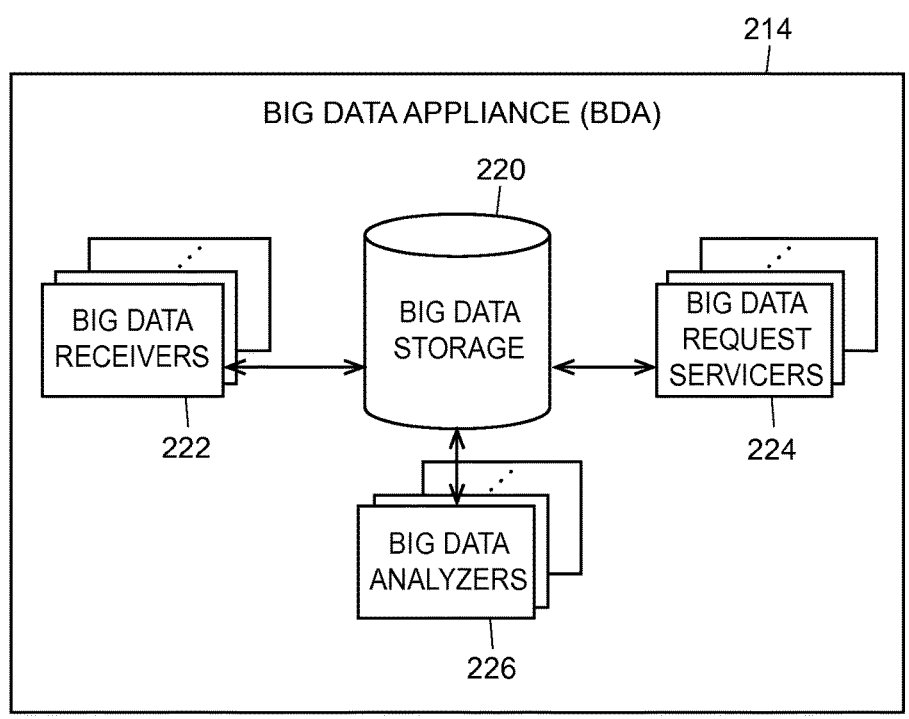
FIG. 5 is a block diagram of an example big data appliance of FIG. 4.

FIG. 5 depicts a simplified block diagram of an example big data appliance 214, instances of which may be included in any of the nodes 102-110 of the process control big data network 100 of FIG. 4 or similar nodes of FIG. 1. The example big data appliance 214 includes a big data storage area 220 for historizing or storing received big data, one or more big data appliance receivers 222, and one or more big data appliance request servicers 224. Each of the big data appliance receivers 222 is configured to receive big data packets (which may be streamed from another node and/or may be generated by a big data provider node on which the appliance 214 resides), process the data packets to retrieve the substantive data and timestamp carried therein, and store the substantive data and timestamp in the big data storage area 220 of the appliance 214, e.g., as time-series data and optionally also as metadata. For example, a data point may be tagged and stored as metadata. The big data storage area 220 may comprise multiple local and/or remote physical data drives or storage entities, such as RAID (Redundant Array of Independent Disks) storage, solid-state storage, cloud storage, high-density data storage, and/or any other suitable data storage technology that is suitable for data bank or data center storage, and that has the appearance of a single or unitary logical data storage area or entity to other nodes. Further, each of the big data appliance request servicers 224 is configured to access time-series data and/or metadata stored in the big data appliance storage area 220, e.g., per the request of a requesting entity or application.

In some instances, a big data appliance 214 includes one or more big data analyzers 226 to perform respective data analytics and/or learning on at least parts of the stored big data, typically in an automatic and/or autonomous manner without using any user input to initiate and/or perform the learning analysis. The big data analyzers 226 may individually and/or collectively perform large scale data analysis on the stored data (e.g., data mining, data discovery, etc.) using one or more data pipelines to discover, detect, or learn new information or knowledge. For example, data mining generally involves the process of examining large quantities of data to extract new or previously unknown interesting data or patterns such as unusual records or multiple groups of data records. The big data analyzers 226 may additionally or alternatively perform large scale data analysis on the stored data (e.g., machine learning analysis, data modeling, pattern recognition, predictive analysis, correlation analysis, etc.) to predict, calculate, or identify implicit relationships or inferences within the stored data. In some cases, multiple big data analyzers 226 (and/or multiple instances of at least one big data analyzer 226) operate in parallel and/or cooperatively to analyze the data stored in the big data storage area 220 of the appliance 214. An example of cooperative data analytics which may be utilized with any or all of the techniques described herein is found in aforementioned U.S. patent application Ser. No. 14/507,188 entitled "REGIONAL BIG DATA IN PROCESS CONTROL SYSTEMS," although any suitable cooperative data analytics technique or techniques may be utilized with any or all aspects of the present disclosure.

Typically, each of the big data appliance receivers 222, the big data appliance request servicers 224, and the big data analyzers 226 comprise respective computer-executable instructions stored on one or more non-transitory, tangible memories or data storage devices, and are executable by one or more processor to perform one or more their respective big data functions. In some cases, the big data analyzers 226 are not included in the big data appliance 214, but instead are in communicative connection with the big data appliance 214. For example, the big data appliance 214, including the storage area 220, receivers 222 and servicers 224 may be implemented by a first set of computer-executable instructions, and the big data analyzers 226 may be implemented by a second set of computer-executable instructions (which may or may not be stored on the same non-transitory, tangible memories or data storage devices as the first set of computer-executable instructions). Descriptions of various types of example big data appliances and their components which may be utilized with any or all of the techniques described herein may be found in aforementioned U.S. patent application Ser. Nos. 13/784,041, 14/174,413, and 14/212,493, although it is understood that any or all of the techniques described herein may be utilized with other suitable big data appliances.

Returning again to FIG. 4, the process control big data network 100 may include process control big data provider nodes 102-110 that operate at various levels, tiers, or orders with respect to first-order or primary process related data that is directly generated, routed, and/or used by process control devices such as controllers, I/O devices, field devices, etc. At the lowest order, tier, or level, "local" big data provider nodes or devices 102a-102n that operate nearest to the process to collect, generate, observe, and/or forward primary process big data related to the input, operation, and output of process devices and equipment in the process plant. As such, "local big data provider nodes or devices" 102a-102n typically are nodes and/or devices that generate, route, and/or receive primary process control data or monitoring data (from a process monitoring system) to enable the one or more processes to be controlled or monitored in real-time in the process plant. Examples of local big data provider nodes 102a-102n include devices whose primary function is directed to generating and/or operating on process control data to control a process, e.g., wired and wireless field devices, controllers, and I/O devices. These process control devices may be communicatively connected to each other and/or to one or more process control communications networks in a distributed manner. For instance, one or more field devices are communicatively connected to one or more I/O devices, which in turn are communicatively connected to one or more controllers, which in turn are communicatively coupled to one or more process control communication networks (e.g., HART®, WirelessHART®, process control big data, FOUNDATION® Fieldbus, etc.).

Other examples of local big data provider nodes 102a-102n include devices whose primary function is to provide access to or routing of primary process data through one or more communications networks of the process control system (which may include the process control big data network 100 and/or other communication networks). Examples of such types of local big data provider nodes 102a-102n include access points, routers, interfaces to wired control busses, gateways to wireless communications networks, gateways to external networks or systems, and other such routing and networking devices. Still other examples of local big data provider nodes 102a-102n include devices, such as historian devices, that are configured to temporarily store big data throughout the process control system, e.g., as an overflow cache, way-station, or routing queue.

In some cases, a local big data provider node includes a respective local big data appliance, as illustrated in FIG. 4 by the nodes 102a, 102n that respectively include the embedded big data appliances 112a, 112n. Each local, embedded big data appliance 112a, 112n receives and stores respective local big data provided by its respective provider 102a, . . . , 102n. Further, in some local big data provider nodes, such as in the node 102a, one or more analytics functions, routines, operations, or processes (represented by the encircled $A_1$) may be performed on at least some of the local big data stored in the appliance 112a. The analytics $A_1$ may be performed by one or more of the big data analyzers 226 of FIG. 5 and the analytics $A_1$ may be performed or implemented with one or more data pipelines. The learned information, learnings, and/or the results of the one or more analytics $A_1$ may also be stored in the local big data appliance 112a, and at least some of the learned information or results may be provided to another big data node 106a.

Some local provider nodes, e.g., as illustrated by the node 102n, include a respective local, embedded big data appliance 112n for local big data collection and historization, however, the resident appliance 112n performs minimal or no analytics. As such, the node 102n merely streams (or otherwise transmits, e.g., upon request or at suitable times) locally stored big data to another node 106b, e.g. for analytical processing or for further forwarding. Some local big data nodes, e.g., the node 102b, do not include any big data appliance at all. Such nodes 102b may stream, in real-time or with the aid of a cache, locally observed big data to one or more other big data nodes 102a, 106b.

Various types of real-time data, such as process-related data, plant-related data, and other types of data, may be cached, collected, stored, transmitted, and/or streamed as big data by the big data provider nodes or devices 102a-102n. Examples of process-related data include continuous, batch, measurement, and event data that are generated while a process is being controlled in the process plant (and, in some cases, are indicative of an effect of a real-time execution of the process). Further, process-related data may include process definitions, arrangement or set-up data such as configuration data and/or batch recipe data, data corresponding to the configuration, execution and results of process diagnostics, etc.

Plant-related data, such as data related to the process plant but that may not be generated by applications that directly configure, control, or diagnose a process in the process plant, may also cached, collected, stored, transmitted, and/or streamed by the big data provider nodes 102a-102n as big data. Examples of plant-related data include vibration data, steam trap data, data indicative of a value of a parameter corresponding to plant safety (e.g., corrosion data, gas detection data, etc.), data indicative of an event corresponding to plant safety, data corresponding to the health of machines, plant equipment and/or devices, data corresponding to the configuration, execution and results of equipment, machine, and/or device diagnostics, and data that is useful for diagnostics and prognostics.

Further, other types of data including data highway traffic and network management data related to the process control big data network backbone and of various communications networks of the process plant, user-related data such as data related to user traffic, login attempts, queries and instructions, text data (e.g., logs, operating procedures, manuals, etc.), spatial data (e.g., location-based data), and multimedia data (e.g., closed circuit TV, video clips, etc.) may be cached, collected, stored, transmitted, and/or streamed by the big data provider nodes 102a-102n as big data. Data pipelines as disclosed herein may operate on or use any of this data.

In some embodiments, dynamic measurement and control data may be automatically cached, collected, stored, transmitted, and/or streamed by the big data provider nodes 102a-102n as big data. Examples of dynamic measurement and control data include data specifying changes in a process operation, data specifying changes in operating parameters such as setpoints, records of process and hardware alarms and events such as downloads or communication failures, etc. In addition, static data such as controller configurations, batch recipes, alarms and events may be automatically collected by default when a change is detected or when a controller or other entity is initially added to the big data network 100. Of course, data pipelines as disclosed herein may operate on or use any of this data.

Moreover, in some scenarios, at least some static metadata that describes or identifies dynamic control and measurement data is captured in the big data provider nodes 102a-102n when a change in the metadata is detected. For example, if a change is made in the controller configuration that impacts the measurement and control data in modules or units that must be sent by the controller, then an update of the associated metadata is automatically captured by the big data provider nodes 102a-102n. Additionally or alternatively, parameters associated with the special modules used for buffering data from external systems or sources (e.g., weather forecasts, public events, company decisions, etc.), surveillance data, and/or other types of monitoring data may be automatically captured by the big data provider nodes 102a-102n. Data pipelines as disclosed herein may operate on or use any of this data.

In some situations, added parameters created by end users are automatically captured in the big data provider nodes 102a-102n. For example, an end user may create a special calculation in a module or may add a parameter to a unit that needs to be collected, or the end user may want to collect a standard controller diagnostic parameter that is not communicated by default. Parameters that the end user optionally configures may be communicated in the same manner as the default parameters.

Referring again to the network 100 of FIG. 4, at one or more levels or tiers above the local big data nodes 102a-102n, the process control big data network 100 may include one or more regional big data nodes 106a-106m. To implement regional big data, the process plant or process control system may be viewed as having a plurality of different areas or regions which may be delineated according to any desired manner such as geographical, physical, functional, logical, etc. In an illustrative but non-limiting example, a process plant may have a first region that receives raw materials and produces a first intermediate product, a second region that receives other raw materials and produces a second intermediate product, and a third region that receives the first and second intermediate products to produce an output product. Each of these three different example regions may be serviced by a respective "regional" big data node 106a, 106b, 106m to operate on big data produced by its respective region. Accordingly, a "regional big data node" provides big data support and services for data that is generated and/or provided by a respective grouping or region of local big data provider nodes 102 and, in some cases, by other big data provider nodes 104. Other big data provider nodes 104 may include, for example, big data nodes that are external to the region of the plant (e.g., a portable diagnostics device or an off-line simulator), user interface devices 130, or data sources that are external to the process plant altogether (e.g., a computing device of a materials supplier, a feed providing a weather forecast, etc.). As will be understood, the regional big data nodes 106a-106m may correspond to any of the regional layers or blocks 26 of FIG. 1.

As illustrated in FIG. 4, a respective grouping or region serviced by a regional big data node 106a-106m may comprise one or more big data provider nodes 102a-102n and/or other big data nodes 104 that are related according to some geographical, physical, functional, logical, or other desired manner. For example, the regional big data node 106a services a region including the local big data provider nodes 102a and 102b, and the regional big data node 106b services a region including the local big data nodes 102b and 102n, as well as another big data node 104. The particular nodes 102, 104 included in a particular region may stream or deliver data to their respective regional big data node 106 for purposes of regional big data storage, access, and/or analysis. Further, any of the big data provider nodes 102a-102n and/or the other big data nodes 104 may communicate with a particular regional big data node 106a-106m to request regionally available services and/or to access regional big data and metadata stored therein, whether such requesting nodes are included in the particular region of the particular regional big data node 106a-106m or not. Moreover, each data pipeline as described herein may be implemented within a specific regional big data node 106a-106m or across various regional big data nodes 106a-106m.

Accordingly, each regional big data node 106a-106m includes a respective regional big data appliance 116a-116m via which big data is received, stored as regional big data, and accessed or requested. Further, each regional big data node 106a-106m typically includes one or more analytics functions, routines, operations, or processes (e.g., $A_2$-$A_w$) that may individually and/or cooperatively operate on at least some of the regional big data. For example, the regional big data appliance 116b may receive local big data from local provider nodes 102b, 102n that are configured to cooperatively control the flow of a liquid through a portion or region of the process plant, and the node 106b may perform an analytics process $A_4$ on at least some of the received data to determine an average transport delay of the liquid within the portion or region of the process plant. The analytics process $A_4$ may, for example, tie into and use data produced or developed by one or more data pipelines or may instead be implemented partially or whole by one or more data pipelines. The results of the analytics $A_4$ may then be stored or historized as additional regional big data within the regional big data appliance 116b. In an embodiment, each of the analytics $A_2$-$A_w$ are performed by one or more big data analyzers 226 of FIG. 5 that are resident on their respective big data node and these analytics may be implemented using one or more data pipelines downloaded into and implemented or executed at the various devices of the bid data nodes 106a-106m.

In some situations, the regional big data nodes or devices 106a-106m communicate received or generated big data, learned knowledge or information, and/or analytics results with another regional big data node 106a-106m, e.g., as peers. In some cases, data pipelines may be implemented across multiple peer nodes. To illustrate by continuing with the above example, the regional big data node 116a receives learned information that has been generated by the analytics analysis $A_4$ performed by the regional big data node 106b. Subsequently, the regional big data node 106a may then perform one or more respective regional analytics $A_2$, $A_3$ on at least part of the peer-provided learned information from the node 106b in conjunction with the local big data received from the local big data nodes 102a, 102b within its own region. These analytics may be implemented using the same or different data pipelines as each other and/or as the analytics $A_4$. The analytics $A_2$, $A_3$ may, in turn, using still further data pipelines, generate additional regional big data for historization at the regional big data appliance 116a and/or for provision to other big data nodes 106b, 106c, 108. As such, as a regional big data node 106a-106m may originate regional big data in some scenarios (e.g., based on the results or learning of any resident analytics that were performed thereby), a regional big data node 106a-106m may also operate as a regional big data provider node.

Grouping of the big data provider nodes 102a-102n under respective regional big data nodes may be carried out according to any desired manner such as geographical, physical, functional, logical, etc. For example, in an illustrative but non-limiting scenario, a process in the process plant may produce a particular product based on two intermediate products. As such, the local big data provider node 102a may represent a first control loop that produces the first intermediate product, and the local big data provider node 102b may represent a second control loop that produces the second intermediate product. Thus, all process control data that is generated, collected, received or otherwise observed by the two control loops 102a, 102b may be transmitted to the regional big data node 106a for historization, storage and analysis.

In a similar manner, the regional big data node 106b may receive and analyze data from its respective group of big data provider nodes. For example, the regional big data node 106b may be responsible for analyzing the big data corresponding to the production of another product that is based on intermediate products from each of the big data provider nodes 102b, 102n in conjunction with big data provided by other sources 104.

At the regional big data node 106a, the received big data may be analyzed (e.g., by using one or more analytics functions or processes $A_2$, $A_3$) to create or generate learned knowledge that describe meaningful relationships, patterns, correlations, trends, etc., across time and/or across at least some of the various data sets. For example, a certain combination of events in the two control loops 102a, 102b may lead to poor product quality when the particular product is eventually produced. To determine the root causes of the poor product quality, the regional big data node 106a analyzes data generated by the combination of events at or shortly after their occurrence (e.g., when the data corresponding to the events' occurrences is received at the regional big data node 106a) and may do so using one or more data pipelines created for this purpose and executed in the various devices in the node 106a. The regional big data node 106a may generate learned knowledge that predicts the poor product quality based on the occurrence of these events, and/or may automatically adjust or change one or more parameters in real-time to mitigate the effects of the combination of events if and when they occur in the future. For instance, the regional big data node 106a may determine a revised setpoint or revised parameter values to better regulate and manage the two control loops 102a, 102b.

Generally, each regional big data node 106a-106m (or its respective big data appliance 116a-116m) analyzes data from its respective group or region of big data provider nodes to determine meaningful patterns, correlations, trends, etc. and may use one or more data pipelines to perform these analytics. The learned patterns, correlations, trends, etc. are then stored in the respective regional big data appliances 116a-116m as learned knowledge. As used herein, the term "learned knowledge" or "learnings" generally refers to data, services, functions, routines, and/or applications that are generated as a result of one or more analyses being performed on big data. Further, each regional big data node 106a-106m (or its respective big data appliance 116a-116m) may determine or define a new service, function, routine, or application (and/or modify an existing service, function, routine, or application) based on the initially learned knowledge, which, in turn, is stored as further learned knowledge.

Regional big data nodes 106a-106m may be utilized for layered or leveled learning. For example, one or more regional big data nodes may transmit their learned knowledge and/or stored data to an upstream big data node that oversees multiple regions. As illustrated in FIG. 4, a regional big data node 106c receives learned knowledge and/or data from the regional big data nodes 106a and 106b, and the node 106c historizes the received big data in its respective embedded appliance 116c. The regional big data node 106c may perform further analysis or learning on at least some of the received learned knowledge and/or data (e.g., by using one or more of the analytics functions $A_8$-$A_w$) to generate additional learned knowledge (e.g., data patterns, trends, correlations, etc., services, functions, routines, and/or applications), which may be, in turn, stored as additional regional big data within the embedded appliance 116c and/or provided to other big data nodes 106a, 106b, 108. Of course, data pipelines may be used to implement any of the analytic functions $A_8$-$A_w$, or any combination of analytic functions $A_1$-$A_w$.

In some cases, layered or leveled learning is carried out on a bottom-up basis using data pipelines. In an illustrative but non-limiting example, a regional big data node 106a analyzes data received from its respective group of local big data provider nodes 102a, 102b to determine if its "region" is operating correctly. Knowledge that the regional big data node 106a learns from its analysis may result in the regional big data node 106a generating a new diagnostic parameter (e.g., a learned parameter). The regional big data node 106a may transmit the generated diagnostic parameter as defined by a data pipeline to an upstream big data node 106c for storage, usage, and/or access. The regional big data node 106a may independently initiate the sharing of the new diagnostic parameter with the upstream regional big data node 106c (e.g., automatically as generated or on a periodic basis) using the same or a different data pipeline, or the regional big data node 106a may cause the new diagnostic parameter to be transmitted when the upstream regional big data node 106c requests the regional big data node 106a to share one or more types of new learned knowledge.

Of course, layered or leveled learning using data pipelines may be carried out on a top-down basis. To illustrate by continuing with the above example, the upstream regional big data node 106c may analyze the received diagnostic routine and determine that the diagnostic routine is useful or applicable to other regional big data nodes (e.g., the regional big data node 106b). Accordingly, the upstream regional big data node 106c may distribute the diagnostic parameter to the regional big data node 106b using one or more other data pipelines so that the regional big data node 106b and/or any of the local provider nodes 102a, 102n, 104 included in its region is able to utilize the diagnostic parameter for its respective diagnostic purposes. The upstream regional big data node 106c may independently initiate the sharing of the new diagnostic parameter with the regional big data node 106b, or the upstream regional big data node 106c may cause the new diagnostic parameter to be transmitted upon a request made by the regional big data node 106b. Alternatively or additionally, the upstream regional big data node 106c may generate a general diagnostic parameter by aggregating and analyzing learned knowledge received from all regional big data nodes that it is overseeing or connected to. In this scenario, the upstream regional big data node 106c distributes the general diagnostic parameter to any or all of its regional big data nodes, e.g., automatically as generated or on a periodic basis, upon request of a particular regional big data node, when the upstream regional big data node 106c receives data from a regional big data node that indicates the general diagnostic may be of use, or for some other reason (such as defined by a different data pipeline). Subsequently, and in a similar manner, each regional big data node downstream of the regional big data node 106c may distribute the general diagnostic routine to any number of the local big data providers in its respective region.

In still other cases, regional big data nodes, e.g., the nodes 106a and 106b, may share learned knowledge with each other, e.g., in a peer-to-peer manner, using one or more data pipelines. For example, the regional big data node 106a transmits a new or learned analytics routine or parameter directly to the regional big data node 106b so that the regional big data node 106b may utilize the new analytics routine for its own purposes.

It is noted that in FIG. 4, only one upstream regional big data node 106c is depicted. However, the techniques and concepts discussed with respect to FIG. 4 may be applied to any number of upstream regional big data nodes supporting multiple layers or levels of big data historization, storage and learning.

Further, as both regional big data appliances and localized big data appliances service different respective big data nodes and/or different respective groups or regions of the process plant, but do not service the entire process plant or more than one region thereof, both regional big data appliances and localized big data appliances are generally and categorically referred to herein as "distributed big data appliances." Generally, distributed big data appliances communicate big data with multiple other big data appliances. For example, a local big data appliance included in a particular big data provider node may communicate learned knowledge and/or big data to other localized big data appliances included in other big data provider nodes, to one or more regional big data appliances, and/or to a centralized big data appliance (which is described in more detail below). Similarly, a regional big data appliance may receive big data from one or more localized big data appliances and/or big data provider nodes. The regional big data appliance may communicate learned knowledge and/or big data to other regional big data appliances, and/or to a centralized big data appliance.

As mentioned above, in some configurations of the process control big data network 100, at least some of the regional big data nodes or devices 106a-106m, local big data nodes or devices 102a-102n, and/or other big data nodes or devices 104 communicate respective big data, analytics results, and/or learned information to a centralized big data node 108, and again may do so according to one or more predefined data pipelines. A "centralized big data node" (which corresponds to the layer 28 of FIG. 1), typically services multiple regions of the process plant, and in some situations, services a majority or an entirety of the process plant. As such, the centralized big data node 108 includes one or more centralized, embedded big data appliances 118 to receive, store, and provide access to process plant big data. For example, the centralized big data appliance 118 may provide comprehensive, long-term historization of most or all of the big data generated by the process plant, and/or the centralized big data appliance 118 may publish big data for process plant-wide availability to other big data nodes, or even to computing devices within or external to the process plant that are not process control big data nodes.

In some configurations, a single centralized big data node 108 or appliance 118 may not service an entire process control system or plant, but may service more than one region of the process control system or plant. For example, different centralized big data nodes 108 or appliances 118 may be used within a single plant or system to partition different types or areas of big data for security and access purposes. In some configurations, a single centralized big data node 108 or appliance 118 services the entire process plant.

In the process plant, one or more of the regional big data nodes 106a-106m may cause some or all of its generated or received learned knowledge and/or data to be streamed or otherwise delivered to the centralized big data node 108. For example, one or more of the regional big data nodes 106a-106m transmits at least some of its respectively stored learned knowledge and/or data to the centralized big data node 108. In some embodiments, one or more of the regional big data nodes 106a-106m pushes at least some of its respectively stored learned knowledge and/or data to the centralized big data node 108 at periodic intervals in a manner defined by one or more appropriate data pipelines. In some embodiments, one or more of the regional big data nodes 106a-106m provides at least a portion of its respectively stored learned knowledge and/or data in response to a request from the centralized big data node 108. In this case, data pipeline blocks may be set up to automatically publish or send data to the next (upstream) block in the pipeline or to request data from a previous (downstream) block in the data pipeline.

The centralized big data node 108 and/or its embedded appliance 118 may be configured to further analyze any or all of the received learned knowledge and/or data received from the regional big data nodes 106a-106m, e.g., by utilizing one or more analytics functions $A_x$-$A_y$. In an embodiment, each of the analytics $A_x$-$A_y$ are performed by one or more big data analyzers 226 of FIG. 5 that are resident on the respective big data node. The one or more analytics functions $A_x$-$A_y$ may operate as defined by one or more data pipelines on the received learned knowledge and/or data to generate additional knowledge and determine relationships between various entities and providers internal and external to the process plant. The additional knowledge and determined relationships may be stored and otherwise utilized as additional centralized big data at the embedded appliance 118, for example. In some cases, the centralized big data node 108 or appliance 118 utilizes the generated knowledge and relationships to control one or more processes of the plant accordingly.

Indeed, any node 102-106 of the big data network 100 may stream or otherwise provide big data to a centralized big data appliance 118, e.g., for historization or long-term storage. For example, a local big data provider node 102 may stream its big data directly to the centralized big data node 108. Similarly, any node 102-106 of the big data network may request services provided by the embedded centralized appliance 118, and/or may request access to data and metadata stored therein. Further, in embodiments in which multiple centralized big data nodes 108 or appliances 118 service a single process plant, the multiple centralized big data nodes 108 or appliances 118 may communicate in a peer-to-peer manner, similar to that described for the regional big data nodes 106a-106m.

Also similar to the regional big data node 106a-106m, a centralized big data node 108 may itself be a producer or provider of big data in some situations, such as when analytics performed by the centralized big data node 108 (e.g., one or more the analytics functions $A_x$-$A_y$) result in additional discovered or learned information that is stored at the centralized big data appliance 118 and made accessible to other big data nodes 102-106. However, typically, the majority of the volume of big data handled and serviced by a centralized big data appliance 118 is received from other big data nodes 102-106. A description of an example centralized big data node 108 and an example centralized big data appliance 118 which may be utilized with any or all of the techniques described herein may be found in aforementioned U.S. patent application Ser. No. 13/784,041. However, it is understood that any or all of the techniques described herein may be alternatively or additionally utilized with centralized big data appliances other than those described in U.S. patent application Ser. No. 13/784,041.

In some configurations, a centralized big data node 108 communicates data and learned information to a remote big data node (e.g., a big data node that is remote with respect to the process plant) for big data historization, storage, access, and/or analysis. Such a big data node, referred to herein as a "cloud big data node 110," may provide services to multiple different process plants or process control systems 10. For example, a company that operates multiple different oil refineries may provide a cloud big data node 110 and a cloud big data appliance 121 to service big data related to all of its oil refineries. Data pipelines as described herein may be implemented partially or completely in the cloud big data node 110. For instance, via the cloud big data node 110 and the resident cloud big data appliance 121, a centralized big data node of a particular refinery may obtain published big data generated by the process control big data network 100 of the process plant, and may utilize the obtained, published big data for operations at the particular refinery using the same data pipeline. In some embodiments, any of the big data nodes 102-106 may directly stream or provide data to the cloud big data node 110 according to one or more data pipelines. Similarly, any of the big data nodes 102-106 may request services provided by the embedded appliance 121 of the cloud big data node 110, and/or access data and metadata stored therein according to one or more data pipelines. Although not illustrated in FIG. 4, a cloud big data node 110 may include one or more respective analytics routines, functions, or processes therein, e.g., as may be provided by big data analyzers 226 of FIG. 5 and that may be implemented according to one or more data pipelines as described herein.

Further, it is noted that not all types of big data nodes are included in all process plants. For example, a highest level of big data processing at a particular process plant may be at the regional level, and as such the particular process plant may not include any centralized big data nodes 108, and may not be connected to a cloud big data node 110. Generally, though, to facilitate or support process control big data, a process plant includes at least one local big data provider node 102 and at least one big data appliance 112, 116, 118.

Additionally, in some embodiments, a process plant includes one or more legacy process control devices (not shown) that do not inherently include any big data support. In these embodiments, a gateway node in the plant or an adjunct device directly coupled to a legacy device may convert or translate data messages between a protocol utilized by the legacy device and the protocol utilized by the process control big data network backbone, thereby communicatively connecting the legacy device and the process control big data network 100. Data pipelines may pass through these nodes, however, to perform communications between the various data processing blocks of the data pipeline.

Moreover, typically, big data nodes or devices 102-110 do not have an integral user interface, although some of the big data nodes or devices 102-110 may have the capability to be in communicative connection with one or more user interface devices 130, e.g., by communicating over a wired or wireless communication link, or by plugging a user interface device 130 into a port of the big data nodes or devices 102-110. In FIG. 4, the user interface device 130 is depicted a big data node that is wirelessly connected to the process control big data network 100.

The user interface device 130 is a device (e.g., a mobile or stationary computing device, a workstation, a handheld device, a surface computing device, a tablet, etc.) that includes one or more integrated user interfaces via which a user or operator may interact with the device and the process control system or process plant to perform activities related to the process plant (e.g., configure, view, monitor, test, diagnose, order, plan, schedule, annotate, and/or other activities). Integrated user interfaces may include a screen, a keyboard, keypad, mouse, buttons, touch screen, touch pad, biometric interface, speakers and microphones, cameras, and/or any other user interface technology. The user interface devices 130 may include a direct wired and/or wireless connection to the process control system big data network backbone, or may include an indirect connection to the backbone, e.g., via an access point or a gateway. The user interface devices 130 may be implemented as wireless handheld devices such as the devices 42 of FIG. 1 and may be connected to one or more data pipelines to receive end-use data from the one or more data pipelines. Moreover, these devices or end-use devices may be intermittently connected to a data pipeline or may remain connected to a data pipeline for long periods of time.

In some embodiments, a user interface device 130 may have one or more built-in analytic capabilities (denoted in FIG. 4 by the encircled $A_z$). In other words, a user interface device 130 may communicate with any number of big data nodes and/or big data appliances to download and/or receive data and perform local analysis $A_z$ on the downloaded/received data to discover or learn knowledge and may do so a part of a data pipeline or by connecting to a data pipeline. Indeed, in some configurations, a user interface device 130 may itself be a big data provider node, and may itself provide at least some of the results of its analysis $A_z$ as big data to one or more other local, regional, centralized, or cloud big data nodes 102-110. Examples of the usage of user interface devices in process control big data networks (which may be utilized with any or all of the techniques described herein) may be found, for example, in aforementioned U.S. patent application Ser. No. 14/028,785. Of course, however, other techniques of utilizing user interface devices with process control big data network 100 may be alternatively or additionally employed in conjunction with any or all of the techniques described herein.

Figure 6:
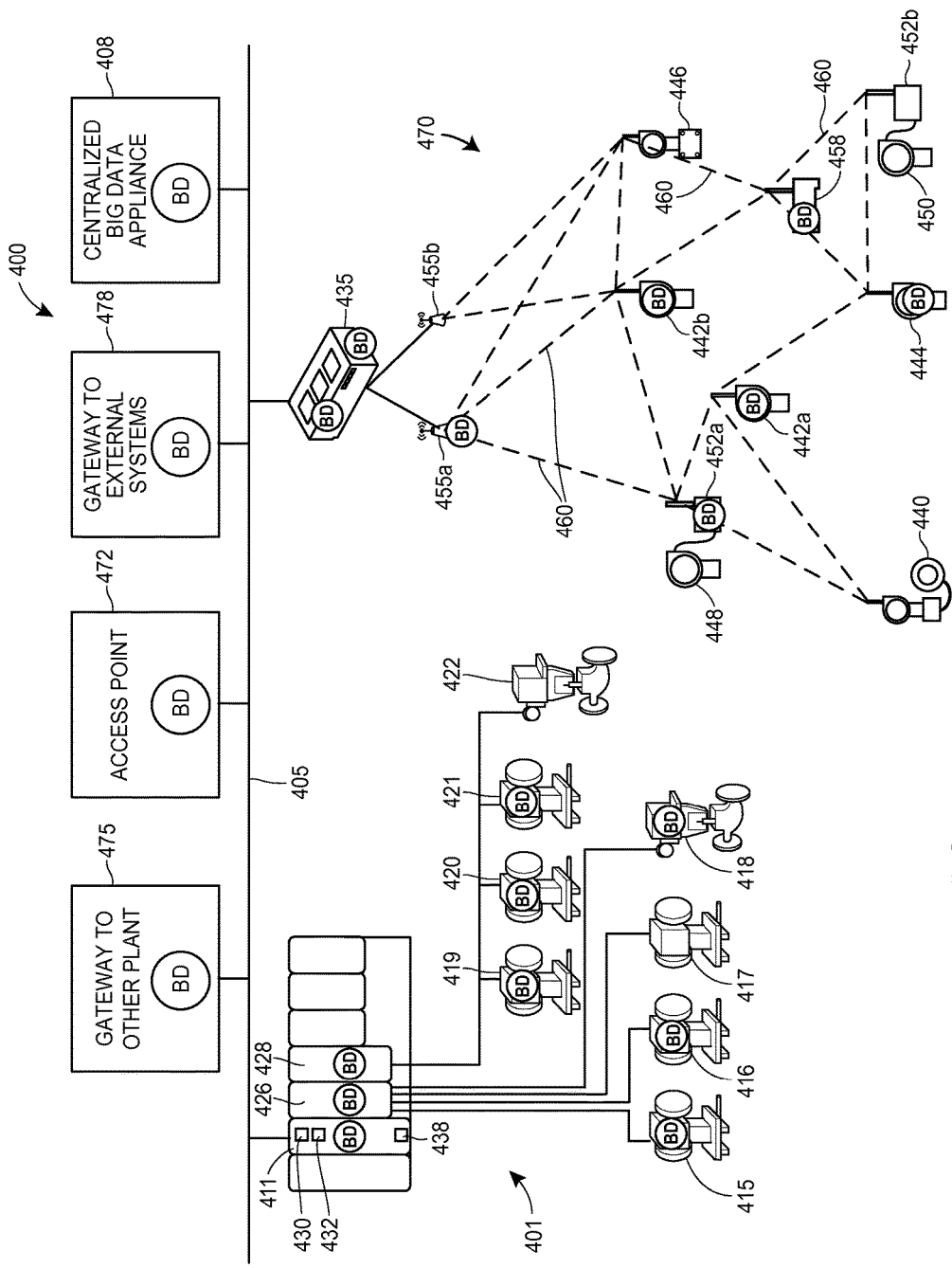
FIG. 6 illustrates a further block diagram of an example process plant or process control system in which automatic or autonomous signal processing-based learning based on data pipelines may be performed.

FIG. 6 depicts a block diagram of another example plant network 400 including various devices associated with a process plant or process control system 401 in which the automatic signal processing-based learning techniques, methods, systems and apparatuses using one or more data pipelines as disclosed herein may be implemented and included. For example, at least a portion of the automatic signal processing-based learning system may be implemented in the process plant network 400 using one or more data pipelines. At least a portion of the process plant network 400 may be supported by a process control big data network, such as the process control big data network 100 of FIG. 4. However, while the process plant network 400 is described below with respect to features illustrated in FIGS. 1, 4 and 5, for ease of discussion and not for limitation purposes, it is understood that the process plant network 400 of FIG. 6 may utilize a process control big data network other than that described in FIGS. 1, 4 and 5 or the process plant network 400 may omit any process control big data network, nodes, and/or devices.

In FIG. 6, process control big data nodes or devices are indicated by a "BD" reference that signifies that the node is a process control big data provider node, a big data appliance, or both. For example, nodes or devices indicated by a "BD" reference in FIG. 6 may be referring to FIG. 4, a local big data provider node and/or appliance 102a-102n, 112a-112n, a regional big data provider node and/or appliance 106a-106m, 116a-116m, a centralized big data provider node 108 and/or appliance 118, or another type of big data node 104, or may refer to similar nodes in FIG. 1.

In FIG. 6, the process control big data nodes BD are nodes of the process control big data network 400. If desired, the process control big data network 400 may be the process control big data network 100 of FIG. 4, and the nodes BD may be the nodes 102-108 of the network 100. In FIG. 6, the nodes BD are communicatively connected over the network 400 via a process control system big data network backbone 405. The backbone 405 includes a plurality of networked computing devices or switches that are configured to route packets to/from various process control big data nodes BD. The plurality of networked computing devices of the backbone 405 may be interconnected by any number of wireless and/or wired links, and the big data network backbone 405 may support one or more suitable routing protocols, such as a process control big data streaming protocol, as previously discussed with respect to the network 100.

As illustrated in FIG. 6, the process control big data network 400 includes a centralized big data appliance 408 and multiple other big data provider nodes 411, 415, 416, 418, 419, 420, 421, 426, 428,435, 442a, 442b, 444, 452a, 455a, 458, 472, 475, 478. One of the example big data provider nodes is a big data process controller device 411 that locally collects, analyzes and stores big data of the process control network or plant 40. The controller 411 is communicatively connected to wired field devices 415-422 via input/output (I/O) cards 426 and 428, and is communicatively connected to wireless field devices 440-446 via a wireless gateway 435 and the process control big data network backbone 405. In another embodiment, though, the controller 411 may be communicatively connected to the wireless gateway 435 using a communications network other than the big data backbone 405, such as by using a process control communications network that includes any number of wired and/or wireless communication links, by using a public or internet based communication network, using a local area network, etc. In FIG. 6, the controller 411 is a big data provider node BD of the process control system big data network 400, and is directly connected to the process control big data network backbone 405.

The controller 411, which may be, by way of example, the DeltaV™ controller sold by Emerson Process Management, may operate to implement a batch process or a continuous process using at least some of the field devices 415-422 and 440-446. In addition to being communicatively connected to the process control big data network backbone 405, the controller 411 may also be communicatively connected to at least some of the field devices 415-422 and 440-446 using any desired hardware, software, and/or communications links or networks associated with, for example, standard 4-20 mA devices, I/O cards 426, 428, and/or any smart communication protocol such as the FOUNDATION® Fieldbus protocol, the HART® protocol, the WirelessHART® protocol, etc. The controller 411 may be communicatively connected with at least some of the field devices 415-422 and 440-446 using the process control big data network backbone 405. In FIG. 6, the controller 411, the field devices 415-422 and the I/O cards 426, 428 are illustrated as being wired devices, and the field devices 440-446 are illustrated as being wireless field devices. Of course, the wired field devices 415-422 and wireless field devices 440-446 could conform to any other desired standard(s) or protocols, such as any wired or wireless protocols, including any standards or protocols developed in the future.

The process controller device 411 includes a processor 430 that implements or oversees one or more process control routines (e.g., that are stored in a memory 432), which may include control loops. The processor 430 is configured to communicate with the field devices 415-422 and with other process control big data nodes BD that are communicatively connected to the backbone 405. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system 40 may take any form, including software, firmware, hardware, etc. Control routines may be implemented in any desired software format, such as using object oriented programming, ladder logic, sequential function charts, function block diagrams, or using any other software programming language or design paradigm. The control routines may be stored in any desired type of memory, such as random access memory (RAM), or read only memory (ROM). Likewise, the control routines may be hard-coded into, for example, one or more EPROMs, EEPROMs, application specific integrated circuits (ASICs), or any other hardware or firmware elements. Thus, the controller 411 may be configured to implement a control strategy or control routine in any desired manner.

In some embodiments, the controller 411 implements a control strategy using what are commonly referred to as function blocks, wherein each function block is an object or other part (e.g., a subroutine) of an overall control routine and operates in conjunction with other function blocks (via communications called links) to implement process control loops within the process control system 401. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 401. Of course, hybrid and other types of function blocks exist. Function blocks may be stored in and executed by the controller 411, which is typically the case when these function blocks are used for, or are associated with standard 4-20 ma devices and some types of smart field devices such as HART devices, or may be stored in and implemented by the field devices themselves, which can be the case with Fieldbus devices. The controller 411 may include one or more control routines 438 that may implement one or more control loops. Each control loop is typically referred to as a control module, and may be performed by executing one or more of the function blocks.

The wired devices 411-422 illustrated in FIG. 6 include big data wired process control devices 415, 416, and 418-421 and the I/O cards 426, 428. FIG. 6 also illustrates wired legacy devices 417 and 422, which may operate in conjunction with the wired big data devices 415, 418-421, 426, 428 within the process plant. The wired field devices 415-422 may be any types of devices, such as sensors, valves, transmitters, positioners, etc., while the I/O cards 426 and 428 may be any types of I/O devices conforming to any desired communication or controller protocol. In FIG. 6, the field devices 415-418 are standard 4-20 mA devices or HART devices that communicate over analog lines or combined analog and digital lines to the I/O card 426, while the field devices 419-422 are smart devices, such as FOUNDATION® Fieldbus field devices, that communicate over a digital bus to the I/O card 428 using a Fieldbus communications protocol. In some embodiments, though, at least some of the big data wired field devices 415, 416 and 418-421 and/or at least some of the big data I/O cards 426, 428 additionally or alternatively communicate with the controller 411 using the big data network backbone 405.

The network 400 is also illustrated as including a monitoring system (which may or may not be part of the process control system 401). The monitoring system includes wireless field devices 440-446 illustrated in FIG. 6 and these also include examples of wireless big data nodes or devices BD (e.g., devices 442a, 442b, 444). FIG. 6 also includes an example of a legacy wireless device (e.g., device 446). The wireless field devices 440-446 communicate in a wireless network 470 using a wireless protocol, such as the WirelessHART protocol. Such wireless field devices 440-446 may directly communicate with one or more other big data devices or nodes BD of the process control big data network 400 that are also configured to communicate wirelessly (using a wireless streaming protocol, for example). To communicate with one or more other big data nodes that are not configured to communicate wirelessly, the wireless field devices 440-446 may utilize a wireless gateway 435 connected to the backbone 405 or to another process control communications network. Any number of wireless field devices that support big data may be utilized in the process plant 40.

The wireless gateway 435, as illustrated in FIG. 6, is another example of a big data node BD included in the process control plant or system 40, and provides access to/from the various wireless devices 440-458 of a wireless communications network 470. In particular, the wireless gateway 435 provides communicative coupling between the wireless devices 440-458, the wired devices 411-428, and/or other nodes or devices of the process control big data network 400 (including the controller 411 of FIG. 6). For example, the wireless gateway 435 may provide communicative coupling by using the big data network backbone 405 and/or by using one or more other communications networks of the process plant 40.

The wireless gateway 435 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks. In other cases, the wireless gateway 435 may translate commands between wired and wireless protocols that do not share any protocol layers. In addition to protocol and command conversion, the wireless gateway 435 may provide synchronized clocking used by time slots and superframes (sets of communication time slots spaced equally in time) of a scheduling scheme associated with the wireless protocol implemented in the wireless network 470. Furthermore, the wireless gateway 435 may provide network management and administrative functions for the wireless network 470, such as resource management, performance adjustments, network fault mitigation, monitoring traffic, security, and the like.

Similar to the wired field devices 415-422, the wireless devices 440-446 of the wireless network 470 may perform monitoring function and/or physical control functions within the process plant 40, e.g., opening or closing valves or take measurements of process parameters. The wireless field devices 440-446, however, are configured to communicate using the wireless protocol of the network 470. As such, the wireless field devices 440-446, the wireless gateway 435, and other wireless nodes 452-458 of the wireless network 470 are producers and consumers of wireless communication packets.

In some scenarios, the wireless network 470 may include non-wireless devices, which may or may not be big data devices. For example, a field device 448 of FIG. 6 may be a legacy 4-20 mA device and a field device 450 may be a traditional wired HART device. To communicate within the network 470, the field devices 448 and 450 may be connected to the wireless communications network 470 via a wireless adaptor (WA) 452a or 452b. In FIG. 6, the wireless adaptor 452b is shown as being a legacy wireless adaptor that communicates using the wireless protocol, and the wireless adaptor 452a is shown as supporting big data and thus is communicatively connected to the big data network backbone 405. Additionally, the wireless adaptors 452a, 452b may support other communication protocols such as Foundation® Fieldbus, PROFIBUS, DeviceNet, etc. Furthermore, the wireless network 470 may include one or more network access points 455a, 455b, which may be separate physical devices in wired communication with the wireless gateway 435 or may be provided with the wireless gateway 435 as an integral device. In FIG. 6, the network access point 455a is illustrated as being a big data device BD, while the network access point 455b is a legacy access point. The wireless network 470 may also include one or more routers 458 to forward packets from one wireless device to another wireless device within the wireless communications network 470, each of which may or may not support distributed big data in the process control system 40. The wireless devices 440-446 and 452-458 may communicate with each other and with the wireless gateway 435 over wireless links 460 of the wireless communications network 470, and/or via the big data network backbone 405, if the wireless devices are distributed and/or centralized big data devices.

Accordingly, the system of FIG. 6 includes several examples of big data devices of nodes BD which primarily serve to provide network routing functionality and administration to various networks of the process control system and in which or through which data pipelines may be implemented. For example, the wireless gateway 435, the access point 455a, and the router 458 each include functionality to route wireless packets in the wireless communications network 470 and theses nodes or devices may implement such communications as part of implementing one or more data pipelines. The wireless gateway 435 performs traffic management and administrative functions for the wireless network 470, as well as routes traffic to and from wired networks that are in communicative connection with the wireless network 470. The wireless network 470 may utilize a wireless process control protocol that specifically supports process control messages and functions, such as WirelessHART and which may also be used for data pipeline communications. As illustrated in FIG. 6, the devices 435, 455a, 452a, 442a, 442b and 458 of the wireless network 470 support big data in the process control plant 40, however, any number of any types of nodes of the wireless network 470 may support distributed big data in the process plant 40.

Other devices that communicate using other wireless protocols may be big data nodes or devices BD of the process control big data network 400. In FIG. 6, one or more wireless access points 472 are big data devices BD that may implement data pipelines or portions of data pipelines utilizing other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 472 allow handheld or other portable computing devices (e.g., user interface devices) to communicate over a respective wireless network that is different from the wireless network 470 and that supports a different wireless protocol than the wireless network 470. In some scenarios, in addition to portable computing devices, one or more process control devices (e.g., controller 411, field devices 415-422, or wireless devices 435, 440-458) may also communicate using the wireless protocol supported by the access points 472.

Additionally in the system of FIG. 6, one or more gateways 475, 478 to systems that are external to the immediate process control system 40 are big data nodes or devices BD of the process control big data network 400 which may be used to implement data pipelines or analytic modules that use data pipelines. Typically, such systems are customers or suppliers of information generated or operated on by the process control system 40. For example, a plant gateway node 475 may communicatively connect the immediate process plant 40 (having its own respective process control big data network backbone 405) with another process plant having its own respective process control big data network backbone. In another example, a single process control big data network backbone 405 may service multiple process plants or process control environments. In still another example, the plant gateway node 475 communicatively connects the immediate process plant 40 with a cloud big data node 110 and/or a cloud big data appliance 121.

A plant gateway node 475 illustrated in FIG. 6 communicatively connects the immediate process plant 40 to a legacy or prior art process plant that does not include a process control big data network 400 or backbone 405. In this example, the plant gateway node 475 may convert or translate messages between a protocol utilized by the process control big data backbone 405 of the plant 40 and a different protocol utilized by the legacy system (e.g., Ethernet, Profibus, Fieldbus, DeviceNet, etc.) as part of a data pipeline. The one or more external system gateway nodes 478 communicatively connect the process control big data network 400 with the network of an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

Although FIG. 6 only illustrates a single controller 411 with a finite number of field devices 415-422 and possibly 440-446, this example is only an illustrative and non-limiting embodiment. Any number of controllers 411 may support big data, and any of the controllers 411 may communicate with any number of wired or wireless field devices 415-422, 440-446 to control a process in the plant 40. Furthermore, the process plant 40 may also include any number of wireless gateways 435, routers 458, access points 455, wireless process control communications networks 470, access points 472, and/or gateways 475, 478. Still further, the system of FIG. 6 may include any number of centralized big data appliances 408, which may receive and store collected data and/or generated learned data or knowledge from any or all of the devices in the process plant 40. In some embodiments, the process control big data network 400 may include any number of regional big data appliances and nodes (not shown in FIG. 6).

Further, the combination of aspects, devices, and components included in the example process plant 40 as illustrated by FIG. 6 is exemplary only. The data pipeline techniques, systems, methods, and apparatuses disclosed herein may be utilized in process plants with zero or more any of the aspects illustrated in FIG. 6. For example, the data pipeline techniques, systems, methods, and apparatuses disclosed herein may be utilized in a process plant without a centralized big data appliance 408, or in a process plant with one or more regional big data appliances and/or nodes. In another example, the techniques, systems, methods, and apparatuses disclosed herein may be utilized in a process plant with only legacy devices.

Referring now simultaneously to FIGS. 1-6, any number of any the nodes 102, 106, 108, 110 of the process control big data network, the big data appliances 112, 116, 118, 121, the big data nodes 411, 415, 416, 418, 419, 420, 421, 426, 428,435, 442*a*, 442*b*, 444, 452*a*, 455*a*, 458, 472, 475, 478, and/or the legacy devices 417, 422, 440, 446, 448, 450, 452*b*, 455*b* may include an instance of or a part of a data pipeline. That is, an instance of an analytic module implemented as a data pipeline may be integral with any node or nodes or device or devices included in or associated with a process plant or process control system that generates a signal whose value varies over time, such as a process control device, a big data node, an analyzer, etc. At least a portion of the signal processing module implemented as a data pipeline is implemented as software or computer-executable instructions stored on a memory of any one or more of the nodes or devices illustrated in FIGS. 1-6, and that are executable by a processor that is co-resident thereon.

In some cases, at least a portion of the signal processing module implemented as a data pipeline is implemented as a chip, an integrated circuit, a semiconductor circuit, or other suitable hardware that is included in any one of the nodes or devices illustrated in FIGS. 1 and 4-6. For example, at least a portion of a signal processing module may be implemented on one or more integrated digital signal processing (DSP) chips such as, e.g., the Texas Instruments KeyStone multi-core DSP and ARM™ processors, or other suitable DSP chips. The one or more integrated DSP chips may be embedded into or integral with any node or device included in or associated with a process plant or process control system that generates a signal whose value varies over time, such as a process control device, a big data node, an analyzer, etc. For example, one or more of the integrated DSP chips may be included in a valve, vibration measurement device, transmitter, etc. The number of chips may be increased as desired to speed up, enhance, and/or add signal processing functions/capabilities.

In some cases, the signal processing modules implemented as a data pipeline are not integral with a node or device (of the process plant or process control system) that is generating the signal whose value varies over time, but nonetheless the signal processing modules are communicatively coupled to the node or device. For example, the signal processing module implemented in the form of a data pipeline may be physically attached to the node or device generating the signal whose value varies over time so that the output of the signal source traverses the various blocks or components of the signal processing module prior to being transmitted over a process control network, or the signal processing module may monitor the network link over which the output of the node or device is transmitted.

Creating or configuring a data pipeline may be performed through a data studio configuration application that generally provides a configuration environment that a user can use to easily define the blocks and the interconnections between blocks in the data pipeline, as well as the location at which each block will be downloaded and run or executed within the plant network. The data studio may generally include a configuration regions that stores templates of data processing blocks that may be used to create a data pipeline and a configuration region that enables a user to specify which processing blocks to use in data pipeline and the communication interconnections between these blocks. Once created in the configuration region, a data pipeline may be tested using historical data within a big data machine. After testing is complete, the created data pipeline may be downloaded to the various devices in the plant network and may run automatically on data as the data is collected within a plant to continuously provided new learning within the plant.

Generally speaking, the set of blocks in a data pipeline may be used to read data, filter, shape, perform analytics, visualize results and perform other functions on data. The blocks are used to build a 'data pipeline' combining and shaping data sources into a form that may be processed and tested by the analytics blocks described with respect to FIGS. 1-6.

In a general sense, the data studio may be viewed at two levels. First, the data studio provides users with a structured environment to create processing and calculation entities that perform data processing to, in effect, generate predictions, perform fault detections, and generate predictions. The data studio is used to shape data, generate models, test models, compare models, and perform the functions normally executed by a data scientist. Once models have been developed, the same set of models may be downloaded into the calculation engines within the plant, for example, the embedded analytics engines or big data appliances of FIGS. 1-6. These models are also referred to herein as analytics modules.

Figure 7:
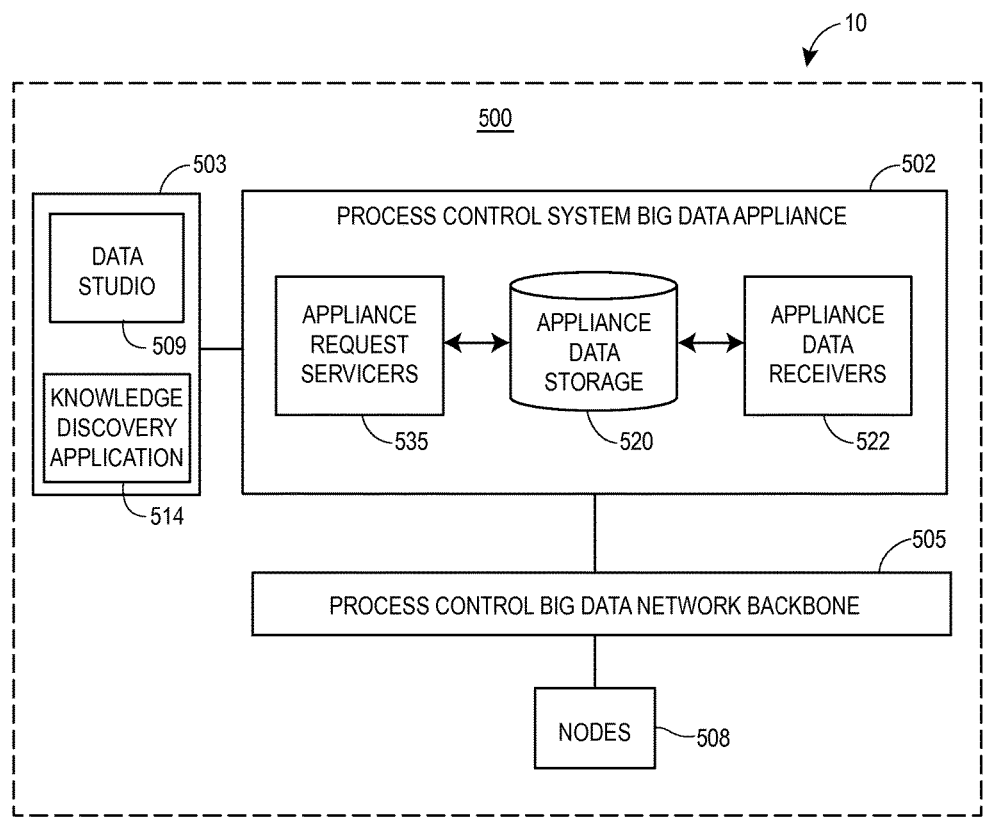
FIG. 7 illustrates a block diagram of an example of a process plant or process control system that includes a big data machine that collects and stores data from a plant, and a data studio that may be used to create and execute data pipelines that implement one or more data models that use or analyze the data collected from the plant.

FIG. 7 is a block diagram of an example process control or monitoring system of a process plant (such as that of FIG. 1, 4 or 6) that includes a big data network 500 which, in turn, collects data within a process plant. The process control system of FIG. 7 additionally includes a user interface station 503 provided within, for example, the process plant environment, that executes a data studio 509 to enable a user to create and run various data models on the data collected by the big data network. The user interface station 503 also executes a data knowledge application 514 (which may be associated with or implemented as function within the block 94 of FIG. 3), that executes models performing systematic or comprehensive diagnosis, prognosis, analysis, identifying relationships, etc., to discover and evaluate data retrieved from a process plant. Although FIG. 7 depicts that only a single user interface station 503 hosts the data studio 509 and data knowledge application 514, in some embodiments, the data studio 509 and data knowledge application 514 may be hosted on different user interface stations 503, on multiple user interface stations 503 or may be distributed among one or more devices in the process plant 509. More specifically, the data studio 509 as implemented within the plant or process control system provides a user or a model developer with a tool to assist in systematically and efficiently defining or creating data pipelines that run within the plant environment on historical data previously collected from the plant, real-time data currently collected within the plant, or both. The data studio 509 and the data knowledge application 514 are able to take advantage of the fact that the big data network 500 collects, stores and provides efficient access to all or most of the data generated within or collected within the plant or process control system. Moreover, the data modeling studio 509 uses this data to provide the model developer with a more efficient manner of designing, testing and implementing models within the plant or process control system. The data knowledge application 514 provides an additional environment for implanting models with the plant or process control system, as well as viewing and exploring relationships between the data as well as the results of the executed model. As illustrated in FIG. 7, the data studio 509 may be a set of instructions executed by one or more processors of one or more devices, such as on the user interface station 503. Of course, the data studio 509 may be executed on any of a variety of computing devices, such tablets, mobile phones, laptop computers, desktop computers, servers, etc. and execute within one device or may be distributed among any number of such devices. Similarly, the data knowledge application 514 may be a set of instructions executed by one or more processors of one or more devices and executed on any of a variety of computing devices.

In a general sense, the example process control system big data network 500 includes a process control system big data apparatus or appliance 502, a process control system big data network backbone 505, and a plurality of nodes 508 that are communicatively connected to the backbone 505. The nodes 508 are additionally connected to process plant equipment like controllers, field devices, plant equipment, monitoring equipment, etc. Process-related data, plant-related data, communication related data and other types of data may be collected and cached at the plurality of nodes 508, and that data may be delivered, via the network backbone 505, to the process control system big data apparatus or appliance 502 for long-term storage (e.g., "historization") and processing. At least some of the data may be delivered between nodes 508 of the network 500, e.g., to control a process in real-time.

Any type of data related to the process plant system may be collected and stored at the process control system big data appliance 502. For example, real-time process data such as continuous, batch, measurement and event data that is generated while a process is being controlled in the process or plant network (and, in some cases, that is indicative of an effect of a real-time execution of the process) may be collected and stored. Moreover, process definition, arrangement or set-up data, such as process plant configuration data and/or batch recipe data may be collected and stored. Additionally, data corresponding to the configuration, execution and results of process diagnostics may be collected and stored. Of course, other types of process data, such as alarms or alerts, may also be collected and stored. In a similar manner, data highway traffic and network management data of the backbone 505 and of various other communication networks of the process plant 10 may be collected and stored. Likewise, user-related data such as data related to user traffic, login attempts, queries and instructions may be collected and stored. Still further, text data (e.g., logs, operating procedures, manuals, etc.), spatial data (e.g., location-based data) and multi-media data (e.g., closed circuit TV, video clips, etc.) may be collected and stored.

The process plant big data network backbone 505 may include a plurality of networked computing devices, such as the user interface device 503 (hosting the data studio 509 and the knowledge discovery application 514), or switches that are configured to route packets to/from various nodes 508 of the process control system big data network 500 and to/from the process control big data appliance 502 (which is itself a node of the process control system big data network 500). The plurality of networked computing devices of the backbone 505 may be interconnected by any number of wireless and/or wired links. Moreover, the plant network big data network backbone 505 may include one or more firewall devices.

By way of example, the big data network backbone 505 may support one or more suitable routing protocols, e.g., protocols included in the Internet Protocol (IP) suite (e.g., UPD (User Datagram Protocol), TCP (Transmission Control Protocol), Ethernet, etc.), or other suitable routing protocols. If desired, at least some of the nodes 508 may utilize a streaming protocol such as the Stream Control Transmission Protocol (SCTP) to stream cached data from the nodes 508 to the process control big data appliance 502 via the network backbone 505. Typically, each node 508 included in the process data big data network 500 may support at least an application layer (and, for some nodes, additional layers) of the routing protocol(s) supported by the backbone 505. Each node 508 may be uniquely identified within the process control system big data network 500, e.g., by a unique network address. Additionally, at least a portion of the process control system big data network 500 may be an ad-hoc network. As such, at least some of the nodes 508 may connect to the network backbone 505 (or to another node of the network 500) in an ad-hoc manner.

Moreover, data that is related to devices within the process plant network (e.g., to physical equipment included in the process plant such as machines and devices) but that may not be generated by applications that directly configure, control, or diagnose a process may also be collected and stored in the big data machine 502. For example, vibration data and steam trap data, plant safety data and data indicative of a value of a parameter corresponding to plant safety (e.g., corrosion data, gas detection data, etc.) may be stored. Likewise, data indicative of an event corresponding to plant safety may be collected and stored in the big data machine 502. Likewise, data corresponding to the health of machines, plant equipment and/or devices, equipment data (e.g., pump health data determined based on vibration data and other data), data corresponding to the configuration, execution and results of equipment, machine, and/or device diagnostics may be collected and stored.

In some cases, data generated by or transmitted to entities external to the process or plant may be collected and stored in the big data machine 502, such as data related to costs of raw materials, expected arrival times of parts or equipment, weather data, and other external data. Of course, all data that is generated, received, or observed by any of the nodes 508 that are communicatively connected to the network backbone 505 may be collected and caused to be stored at the process control system big data appliance 502. Of course, any or all of these types of data could be collected by one or more data collection modules of one or more data pipelines or may be used by any of the processing modules of any data pipeline.

As illustrated in FIG. 7, the data studio 509 may be configured to provide a primary interface into the process control system big data network 500 for configuration and data exploration, e.g., on a user interface or other interface device for use by a user or other applications. The data studio 509 may be connected to the big data appliance 502 via the process control system big data network backbone 505, or may be directly connected to the process control system big data appliance 502 or may be coupled to the big data appliance 502 in any other manner.

In the network of FIG. 7, the process control big data apparatus or appliance 502 is centralized within the network 500, and is configured to receive data (e.g., via streaming and/or via some other protocol) from the nodes 508 of the network 500 and to store the received data. As such, the process control big data apparatus or appliance 502 may include a data storage area 520 for historizing or storing the data that is received from the nodes 508, a plurality of appliance data receivers 522 that may collect data for storage in the big data machine 502, and a plurality of appliance request servicers 535 that request and access data from the big data storage 520. In any event, it is useful if all or most of the data collected in the process control network and stored in the data storage area 520 is available to a user of the data modeling studio 509 and the knowledge discovery application 514.

The process control system big data storage area 520 may include multiple physical data drives or storage entities, such as RAID (Redundant Array of Independent Disks) storage, cloud storage, or any other suitable data storage technology that is suitable for data bank or data center storage. However, to the nodes 508 of the network 500, the data storage area 520 has the appearance of a single or unitary logical data storage area or entity. As such, the data storage 520 may be viewed as a centralized big data storage area 520 for the process control big data network 500 or for the process plant. If desired, a single logical centralized data storage area 520 may service multiple process plants (e.g., the process plant and another process plant). For example, a centralized data storage area 520 may service several refineries of an energy company. In addition, the centralized data storage area 520 may be directly connected to the backbone 505 via, for example, at least one high-bandwidth communication link. Moreover, the centralized data storage area 520 may include an integral firewall.

The structure of the unitary, logical data storage area 520 may support the storage of all or most process control system related data. For example, each entry, data point, or observation of the data storage entity may include an indication of the identity of the data (e.g., source, device, tag, location, etc.), a content of the data (e.g., measurement, value, etc.), and a time stamp indicating a time at which the data was collected, generated, received or observed. As such, these entries, data points, or observations are referred to herein as "time-series data." The data may be stored in the data storage area 520 using a common format including a schema that supports scalable storage, streamed data, and low-latency queries, for example.

In one case, the schema may include storing multiple observations in each row, and using a row-key with a custom hash to filter the data in the row. The hash may be based on the time stamp and a tag. For example, the hash may be a rounded value of the time stamp, and the tag may correspond to an event or an entity of or related to the process control system. Metadata corresponding to each row or to a group of rows may also be stored in the data storage area 520, either integrally with the time-series data or separately from the time-series data. For example, the metadata may be stored in a schema-less manner separately from the time-series data.

If desired, the schema used for storing data at the appliance data storage 520 may also be utilized for storing data in the cache of at least one of the nodes 508. Accordingly, in this case, the schema is maintained when data is transmitted from the local storage areas of the nodes 508 across the backbone 505 to the process control system big data appliance data storage 520.

In addition to the data storage 520, the process control system big data appliance 502 may further include one or more appliance data receivers 522, each of which is configured to receive data packets from the backbone 505, process the data packets to retrieve the substantive data and timestamp carried therein, and store the substantive data and timestamp in the data storage area 520. The appliance data receivers 522 may reside on a plurality of computing devices or switches, for example. Multiple appliance data receivers 522 (and/or multiple instances of at least one data receiver 522) may operate in parallel on multiple data packets.

In cases in which the received data packets include the schema utilized by the process control big data appliance data storage area 520, the appliance data receivers 522 merely populate additional entries or observations of the data storage area 520 with the schematic information (and, may optionally store corresponding metadata, if desired). In cases in which the received data packets do not include the schema utilized by the process control big data appliance data storage area 520, the appliance data receivers 522 may decode the packets and populate time-series data observations or data points of the process control big data appliance data storage area 520 (and, optionally corresponding metadata) accordingly.

Additionally, the process control system big data appliance 502 may include one or more appliance request servicers 535, each of which is configured to access time-series data and/or metadata stored in the process control system big data appliance storage 520, e.g., per the request of a requesting entity or application. The appliance request servicers 535 may reside on a plurality of computing devices or switches, for example. At least some of the appliance request servicers 535 and the appliance data receivers 522 may reside on the same computing device or devices (e.g., on an integral device), or may be included in an integral application.

In some cases, multiple appliance request servicers 535 (and/or multiple instances of at least one appliance request servicer 535) may operate in parallel on multiple requests from multiple requesting entities or applications. Of course, a single appliance request servicer 535 may service multiple requests, such as multiple requests from a single entity or application, or multiple requests from different instances of an application. In any event, the data modeling studio 509 and the knowledge discovery application 514 of FIG. 7 may access the data stored in the data storage area 520 via one or more request servicers 535.

Figure 8:
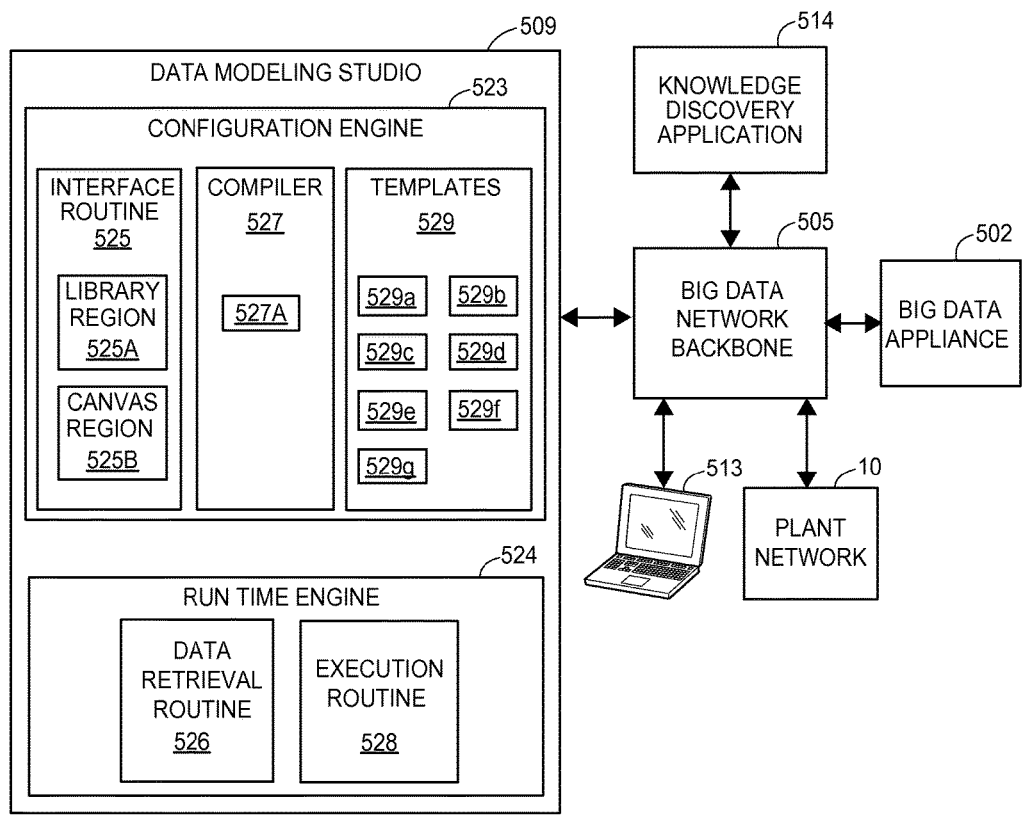
FIG. 8 is a block diagram of an example embodiment of the data modeling studio of FIG. 6 as connected within a generic plant environment.

FIG. 8 is a block diagram of an example embodiment of the data studio 509 as coupled to the big data appliance 502 and the process plant network via the process control big data backbone 505 of FIG. 7. As further illustrated in FIG. 8, one more additional user interface devices 513 may access the data studio 509 via the process control big data backbone 505. Additionally, the knowledge discovery application 514 is coupled to the process control big data backbone 505. Generally speaking, the data studio 509 provides a structured environment for graphically creating and programming data pipelines configured to perform operations on data collected from the big data machine or other data sources. In this context, a data pipeline is a series of interconnected mathematical or analytical routines performed on data to produce an output that gives some knowledge concerning the operation of a process plant (such as the process plant). The data pipeline is constructed of one or more data inputs, one or more functions that are performed on the data inputs and one or more outputs that are a result of the functions.

As illustrated in FIG. 8, the data studio 509 includes a configuration engine 523 for generating a structured environment to facilitate graphical data pipeline creation and a run-time engine 524 for downloading or executing created pipelines. More specifically, the configuration engine 523 includes an interface routine 525 to generate elements of a graphic user interface for the structured environment, a plurality of templates 529 that serve as the building blocks of the data pipelines and a compiler 527 that converts the model into a data format executable by the run-time engine 524. The run time engine 524 includes a data retrieval routine 526 for retrieving data used in executing the data pipelines, and an execution routine 528 for running the executable data pipeline.

The interface routine 525 includes a set of instructions stored in memory that when, executed by a processor, generates a set of user interface elements of a drag and drop graphical user interface to facilitate creation of the data pipeline including a library region 525a that displays the templates 529 and a canvas region 525b that serves as the main presentation window for creating models. The templates 529 serve as the building blocks of the data pipelines and can be selected and moved to the canvas region 525b to create a data pipeline. The templates 529 included in the configuration engine 523 of the data studio 509 include data source or read templates 529a (that specify sources of data used in the pipeline), data write templates 529b that specify where to write data or output data or otherwise send data from the pipeline, filter templates 529c that specify filtering routines to be run on data streams in a data pipeline, merge templates 529d that specify data merging operations to be performed on one or more streams of data, state templates 529e that specify state detection and related processing activities, data analytic templates 529f that specify analytics to be performed on data, and visualization templates 529g that specify various graphing or other visualization functions to be performed on data to display the data to a user, for example. Of course, the templates illustrated in FIG. 8 are exemplary only and other types of templates can be created and stored as well.

In some cases, the data source or read templates 529a indicate data sources that collect various data types (structured and/or unstructured), contexts and/or boundary conditions of data that is communicated, generated, received and/or observed within the process plant. The data source or read templates 529a may pertain to database data, streamed data, transactional data, and/or any other type of data that is communicated via the process control system big data network and is stored or historized in process control system big data storage 520. The data source or read templates 529a may also include data sources stored in the big data appliance 502 that collects and stores all (or almost all) process data and plant data collected as part of the big data architecture of the process plant. The data sources 529a may define comprehensive, high fidelity data stored in the big data appliance 502, defining any or all of the various parameters of the process plant implementing a big data architecture.

Example data source templates 529a include pressure readings, valve readings, temperature readings, vibration readings. The user may set parameters for the historical or real time data so that only a subset for the data is selected. For example, the data source templates 529a may indicate a data source that collects temperature data in degrees Celsius that are typically expected to be in the range of Temperature A to Temperature B. The data source templates 529a may also represent data sources external from the process plant, such as an external plant site or an external database, such as a weather or environment database. In a similar manner, data write templates 529b may specify any database, machine or other data pipeline or analytic module at which to write data or make data from the pipeline available.

The other templates 529c-529g can implement or define any basic or unitary functionality to be performed on data. For example, the analytic templates 529f may include mathematical functions such as neural network routine, a correlation routine, a threshold routine or a statistical processes such as an averaging routine, a maximum routine, a minimum routine, a filter routine, etc. The templates 529e may include classification techniques such as random forest algorithms or partial least square regressions. Still further, the templates 529c-f may include data processing techniques for preparing data for analysis, such as a filtering routine that removes data higher than a certain threshold level or a clipping routine to remove outlier data. The user may also be able to alter one or more parameters of the templates 529. For example, the user may select a filter routine and define the characteristics of a low point filters (a particular slope), a clipping filter (a threshold level), etc.

The visualization templates 529g define how to interpret and/or present the result of the functionality performed on the data by the data pipeline. For example, if the output of a pipeline is to be graphically presented to a user, a template 529g may represent a graph, a chart or a display interface. The output template 529g may further define one or more data massaging techniques to prepare the data for the graphical presentation specified by the output template. For example, a bar graph may require a numerical value rounded to two significant figures and the output template may also include a rounding routine to prepare the data. Output or visualization templates 529g may also indicate a particular location where the output of a data pipeline should be sent. For example, a template 529g may indicate that a set of values produced by the data pipeline are to be sent to one or more controllers in a process plant (such as the process plant). Example values include a set point value, a control routine, etc. However, an output can be any value such as a binding representing a relationship, a specific value, a binary value indicating whether or not a data output meets a threshold, a percentage corresponding to a potency, etc.

However, the user is not limited to using pre-defined templates included in the data studio 509. The user may edit existing templates, add new templates, and/or save the edited/new template to the data studio 509 for future use. For example, if a pre-existing averaging routine accepts two data source inputs, a user may edit the averaging routine template to accept three inputs. The user may also create new templates from scratch to add additional functionality to the data studio 509. The user may also save data pipelines or portions of data pipelines created with the data studio 509 as templates for future use.

The compiler 527 may include a compiler routine 527a stored in memory that executes on a processor to transform the graphical data pipeline created using the user interface into a compiled data pipeline in an executable data format supported by the run time engine 524.

The run time engine 524, which executes the compiled data pipeline to produce a desired output (as defined by the data pipeline), includes a data retrieval routine 526 for retrieving data from the memory 520 and/or from the plant devices, and an execution routine 528 for running and/or executing the executable models. More specifically, a processor may execute the retrieval routine 526 to retrieve data from data sources and functions, corresponding to the graphical templates 529 used in the data pipeline, from memory. In some embodiments, the retrieval routine 526 may retrieve data from a big data appliance 520 via the big data network backbone 505 and/or from the plant itself. The execution routine 528 may include a set of instructions stored in memory that execute a compiled data pipeline on a processor to produce one or more outputs.

The execution routine 528 may run a data pipeline in an off-line environment that is isolated from the operation of the plant where the data pipeline may be run on historical data stored in memory or may run a data pipeline in an online environment, where the retrieval routine 526 may retrieve real time or near real time data streams from one or more devices in the plant or big data appliance and produce an output, that may be provided to a user and/or that may be used to affect the operation of the plant.

As a more specific example, a data source template 529a (defining the data to be input into a data pipeline) may be connected to a first filter template 529c defining filtering functionality (e.g., a low pass, a high pass, a smoothing filter, etc.) The filtering function template 529c can be connected to a second filter template 529c defining a clipping routine, which can be connected to an analytics template 529f defining a neural network technique which can then be connected to a filter template 529c defining another filtering technique which can be connected to a template 529f defining an averaging technique which can be connected to a visualize template 529g which defines a manner of displaying the output.

Figure 9:
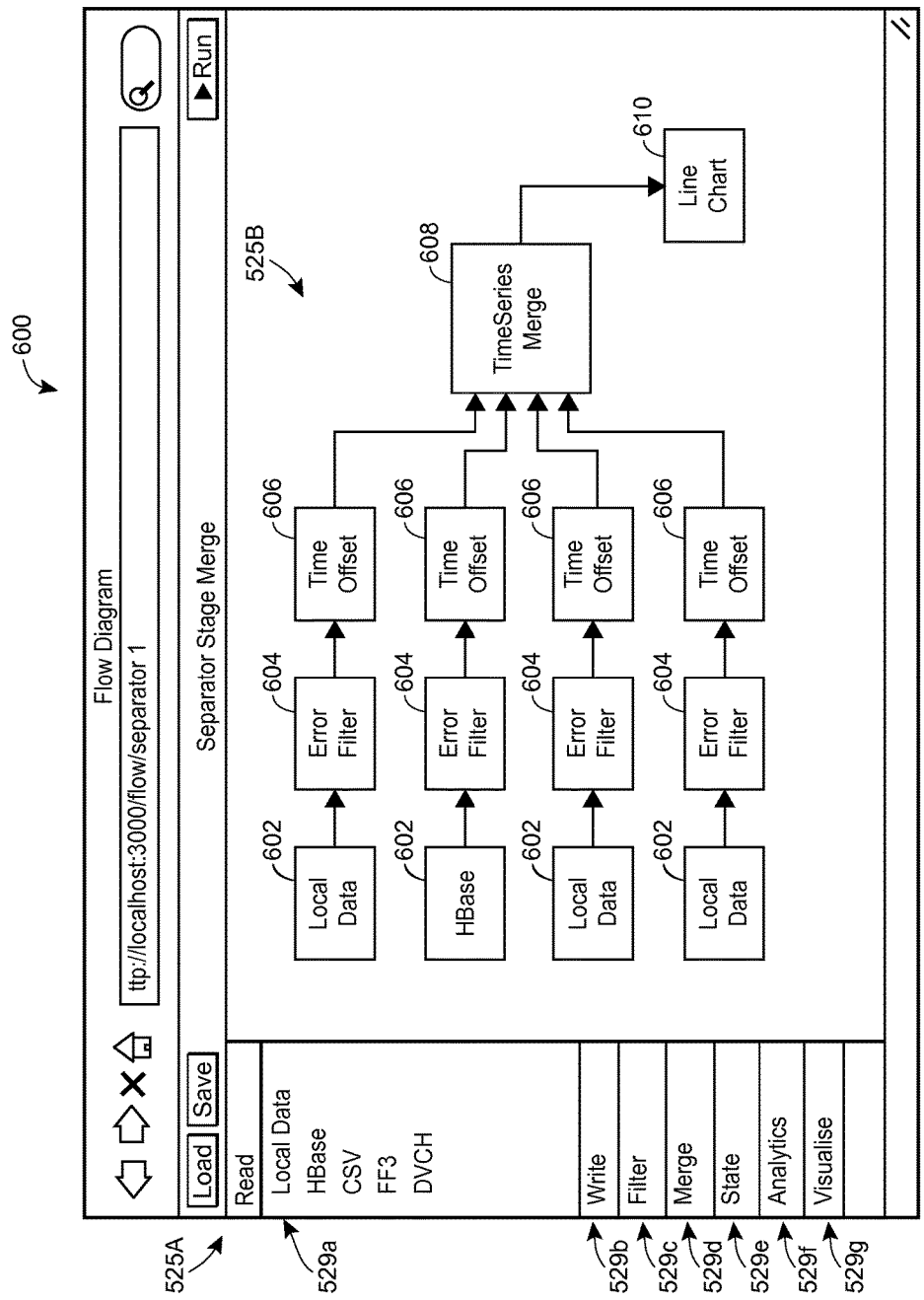
FIG. 9 is a screen presentation of a graphical user interface of the data modeling studio of FIGS. 7 and 8 that may be used to create one or more data pipelines for testing and implementation in a real-time plant network.

FIG. 9 illustrates an example graphical user interface 600 of the data studio 509 for facilitating graphical creation of a data pipeline. As discussed above, the interface routine 525 of the configuration engine 523 generates a drag and drop graphical user interface 500 including a library region 525a that displays the templates 529 and a canvas region 525b that serves as the main presentation window for creating data pipelines. As illustrated in FIG. 9, the library region 525a displays a plurality of templates 529 that serve as the graphical building blocks of the data pipeline. The templates 529 may include the various data templates 529 including read templates 529a, write templates 529b, filter templates 529c, merge templates 529d, state templates 529e, analytics templates 529f and visualization templates 529g.

A user may construct the data pipeline selecting different templates 529 from the library region 525a and dragging them to the canvas region 525b. The user may arrange the templates 529 in the canvas region 526b and use the communication interconnections to define flow between the templates in order to define the data flow within the data pipeline. Although FIG. 9 illustrates a drag and drop graphical user interface, other embodiments of the data studio 509 may include other graphical or non-graphical interfaces.

The configuration engine further 523 enables a user to modify the data pipeline templates 529 depicted in the canvas region 525*b* by defining specific parameters to be used in the templates 529 and the interconnections between data templates, to create interconnected blocks forming a data pipeline, to define communication connections, execution rates, etc. The data pipeline may include, for example, an input block defining a specific data source of data to be retrieved for the data pipeline, one or more functional blocks defining data processing procedures to be performed on the data within the pipeline and one or more output blocks defining an operation associated with the output of the one or more data outputs.

In the example of FIG. 9, a data pipeline is created that includes four read blocks 602 (defining different data sources from which to obtain data for the pipeline), a filter block 604 connected to filter each of the acquired data streams, and a time offset block 606 connected to each of the filter blocks 604 which may operate to offset or time align the data from each of the various sources to a common or aligned time. Likewise, the data produced by each of the blocks 606 is provided to a block 608 which merges the time series data and provides merged or a matrix of data to a visualization block 610 in the form of a line chart. The visualization block 610 may produce a line chart shown the merged time series data in a desirable format.

Of course, when creating the data pipeline of FIG. 9, the user may configure each block with various parameters (e.g., filter coefficients, sampling rates, time offsets, visualization parameters, etc.). Moreover, the user may specify the location or position of each of the blocks in the data pipeline and the execution rates and communication rates of the blocks within the data pipeline when the data pipeline is downloaded to and executed in the plant as a data pipeline. The user may, for example, specify the device, node, big data machine, etc. at which each block is to be downloaded and run during plant operation or run-time.

Still further, the user may test the created data pipeline on historical data as stored in a database, and when satisfied with the operation of the data pipeline, may download the data pipeline into the plant so that the various blocks of the data pipeline are downloaded to and executed in the specified nodes, machines or devices. Moreover, at this time, the configuration engine 523 or the compiler 527 thereof may configure the blocks of the data pipeline to communicate with one another over the communication networks installed between the various devices in which the blocks are stored and executed. In some cases, different blocks of the same data pipeline may communicate with one another using different communication networks and even different communication protocols.

Once downloaded, the data pipelines run or execute in the plant on a continuous or on-going basis during run-time of the plant to provide data processing on the data as specified by the data pipeline. This data is then available for viewing and use by any user, any machine or any analytic module within the plant. Moreover, analytical modules may use or may be made up of one or more data pipelines and a single data pipeline may be used in multiple other analytic modules.

As will be understood, the monitoring and analytics engines, algorithms, and data pipelines described herein can be run external to the distributed control systems (DCSs), asset management systems, and existing machine health systems of a typical process control plant or network. Each of these systems is considered to critical to their respective organizations (operations, maintenance, and reliability engineering) and so running the analytic modules and data pipelines on which these modules operate on different machines prevents stressing each of these systems, the operating companies trying to support them, and the various organizations and entities trying to support them.

Moreover, a difference between DCS systems and monitoring and analytics system described herein is that the monitoring and analytics system is not consuming the data in real-time. The applications are designed to receive data, perform analysis, and make predictions, perform fault detections, generate recommendations (using data pipelines) that are available to humans and other systems within the time constants of the systems. For example, in batch operation, the updated predictions can be in terms of minutes. The same is true for most continuous operations. This operation is very different from control operations where control actions have direct impacts on the operation of the process. Streaming data only needs to be available when applications actually need the data and so the data pipelines described herein (and the analytic modules which operate on top of the data pipelines) can operate at a different rate.

Moreover, as will be understood, the data pipeline structure described herein is able to be used to identify leading indicators and then use those leading indicators to identify parameters that have the most impact on the leading indicators. To get the best value out of this analysis, information about the relationship of each parameter to each other parameter (e.g. upstream, downstream) may be used as well as part of the data provided to or used by a data pipeline. Several control and device hierarchies are available in a typical plant that provide this information. For example, the equipment hierarchy available from systems such as DeltaV and AMS and the PI&Ds of the plant may be used to define the physical relationship of equipment (e.g., that a crude tank is upstream of desalter which is upstream of a heater which is upstream of an atmospheric tower).

Analytics modules may use any of this data along with the processing performed by data pipelines to perform on-going or on-demand analytics. The analytics modules described herein may thus provide the pipelines defined with the data studio with an executable context. The analytic modules may have a tag, a description, an execution rate, and may support data pipeline blocks and parameters. The analytic modules may be downloaded into any computer or execution engine in the system and may automatically resolve references to data that may be sent via the monitoring and analytics bus. Analytic modules may also be moved between computing elements and the configuration system may automatically rebind data links within this happens to assure the data pipelines remain intact.

Still further, once analytic modules have been debugged, they may be stored as templates that can be re-used for similar applications. In this manner, libraries of analytics templates may be created and reused many times. If needed these modules may also be licensed and resold.

Moreover, if desired, the analytic modules, and/or the data pipelines used within or to support analytic modules may be debugged using, for example, the data studio 509. If the analytics predictions or data processing are off, the user may use the data studio 509 to operate or run the module (or data pipeline) on-line and to view data values at each block in the data pipeline or module. The user can then use the data studio 509 to see data values and correct blocks, algorithms within the blocks, etc. leading to the error.

Any or all of the systems, methods, and techniques disclosed herein may be utilized in any process plant or process control system that is configured to control or monitor a process in real-time. Moreover, as used herein, a "piece of equipment," "equipment piece," or "equipment," generally refers to a physical element or component which may or may not be directly utilized during control of the process or portion thereof, but nonetheless may be ordered with other equipment pieces and/or process elements with respect to the control or flow of the process.

When implemented in software, any of the applications, blocks, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The invention claimed is:

1. A plant communication system for use within a process plant environment that implements a process, comprising:
   a process control network including a multiplicity of process control devices disposed within the process plant to control the process and a process control communication network communicatively coupled to the multiplicity of process control devices, wherein one or more of the multiplicity of process control devices collects or generates process control data;
   a further plant communication network including a plurality of processing devices communicatively coupled together by a further plant communication network link, wherein at least one of the plurality of processing devices on the further plant communication network is communicatively connected to the process control communication network; and
   a distributed data pipeline that is defined, in a configuration environment, to perform, on process control data, a particular processing operation by using a series of data processing modules communicatively connected together in a particular communicative order across a plurality of different devices of the process plant environment, and different portions of the distributed data pipeline are downloaded from the configuration environment into the plurality of different devices of the process plant environment for runtime execution of the particular processing operation, the distributed data pipeline including one or more upstream data processing modules coupled to a set of downstream data processing modules, wherein:
   each data processing module included in the set of downstream data processing modules within the distributed data pipeline processes data received from a respective one or more upstream data processing module within the distributed data pipeline,
   at least one of the one or more upstream data processing modules of the distributed data pipeline is disposed in one of the multiplicity of process control devices connected to the process control communication network, and
   at least one of the downstream data processing modules of the distributed data pipeline is disposed in one of the plurality of processing devices on the further plant communication network.

2. The plant communication system of claim 1, further including a database communicatively coupled to one of the downstream data processing modules of the distributed data pipeline for storing the data generated by the one of the downstream data processing modules of the distributed data pipeline and making the stored data available to other applications via the further plant communication network, the other applications including at least one analytics module or application.

3. The plant communication system of claim 1, wherein one of the upstream data processing modules is disposed in the process control network and collects raw process control data for processing by the distributed data pipeline, and further including a database communicatively coupled to the process control communication network for independently storing the collected raw process control data.

4. The plant communication system of claim 3, wherein the database is disposed in one of the processing devices coupled to the further plant communication network.

5. The plant communication system of claim 1, wherein the further plant communication network is a big data communication network.

6. The plant communication system of claim 1, wherein the further plant communication network comprises a plurality of different communication networks coupled together.

7. The plant communication system of claim 6, wherein the plurality of different communication networks includes a first plant based communication network and a second cloud based communication network.

8. The plant communication system of claim 6, wherein the distributed data pipeline includes at least one different data processing module stored in a respective processing device within each of the plurality of different communication networks.

9. The plant communication system of claim 6, wherein at least one of the plurality of different communication networks is a wireless communication network.

10. The plant communication system of claim 1, wherein the process control communication network comprises a plurality of different control communication networks communicatively coupled together.

11. The plant communication system of claim 1, wherein one of the data processing modules is a data collection module that obtains data from a data source within the process control network.

12. The plant communication system of claim 11, wherein one of the data processing modules is a data cleaning module that cleans data obtained from the data source within the process control network.

13. The plant communication system of claim 11, wherein one of the data processing modules is a data alignment module that time aligns data from multiple data sources within the process control network.

14. The plant communication system of claim 11, wherein one of the data processing modules is a sensitivity data analysis module that determines the sensitivity of data to a particular event within the plant.

15. The plant communication system of claim 11, wherein one of the data processing modules is a causality analysis module that determines a causal relationship between data from a data source and an event within the plant.

16. The plant communication system of claim 11, wherein one of the data processing modules is a learning module that performs supervised learning on the data.

17. The plant communication system of claim 11, wherein one of the data processing modules is a learning module that performs unsupervised learning on the data.

18. The plant communication system of claim 11, wherein one of the data processing modules is a data presentation module that presents data generated within the distributed data pipeline to a user.

19. The plant communication system of claim 1, wherein the distributed data pipeline includes one or more data collection modules that collect process data from the process control network, one or more intermediate data processing modules that process the data collected by one or more of the data collection modules or another intermediate data processing module, and one or more end-use data processing modules that store output data generated by the one or more intermediate data processing modules or the one or more end-use data processing modules in a manner that can be accessed by one or more other applications.

20. The plant communication system of claim 19, wherein one or more of the data processing modules of the distributed data pipeline is intermittently connected within the distributed data pipeline.

21. The plant communication system of claim 20, wherein one of the one or more intermittently connected data processing modules is a data display module that displays data produced within the distributed data pipeline to a user.

22. The plant communication system of claim 20, wherein one of the one or more intermittently connected data processing modules is disposed in a handheld device that is intermittently connected to the further plant communication network.

23. The plant communication system of claim 19, wherein the output data is simultaneously accessible by two or more other applications.

24. The plant communications system of claim 1, wherein one of the multiplicity of process control devices is a process controller that executes one or more control routines at a controller execution rate, and wherein the process control data collected by the one or more upstream data processing modules of the distributed data pipeline disposed in one of the multiplicity of process control devices collects process control data at a rate greater than the controller execution rate.

25. The plant communications systems of claim 24, wherein two or more of the data processing modules within the distributed data pipeline process collected data at a rate greater than the controller execution rate.

26. A plant control and communication system for controlling a process within a plant, comprising:
a multiplicity of process control devices disposed within the plant to control the process including a process controller that executes to control the process at an execution rate;
a plurality of data processing devices disposed within the plant;
one or more communication networks that communicatively couple the multiplicity of process control devices and the plurality of data processing devices;
one or more data sources disposed within the plant distributed among the multiplicity of process control devices that collect raw data from the process control devices within the plant at a collection data rate greater than the execution rate of the process controller;
a database communicatively coupled to the one or more communication networks for storing the collected raw data from the one or more data sources at the collection data rate; and
a data pipeline having different portions thereof downloaded, from a configuration environment in which the data pipeline was defined, across a plurality of different devices within the plant, the data pipeline defined in the configuration environment to include a series of data processing modules that are communicatively connected together across the plurality of different devices in a particular communication order to thereby perform, during runtime, a data processing operation on process control data, wherein at least one of the data processing modules of the data pipeline performs a first portion of the data processing operation on raw data from one of the one or more data sources, and wherein at least another one of the data processing modules performs a second portion of the data processing operation on data received from one of the data processing modules within the data pipeline, and wherein at least two of the data processing modules operate at a rate faster than the execution rate of the process controller.

27. The plant control and communication system of claim 26, wherein the at least two of the data processing modules operate at a rate faster than the execution rate of the process controller by communicating data between the two data processing modules at a rate faster than the execution rate of the process controller.

28. The plant control and communication system of claim 26, wherein the at least two of the data processing modules operate at a rate faster than the execution rate of the process controller by performing processing on data at a rate faster than the execution rate of the process controller.

29. The plant control and communication system of claim 26, wherein the series of data processing modules communicatively connected together across the plurality of different devices in a particular communication order within the data pipeline includes an end-use data processing module downstream in the particular communication order from an upstream data processing module within the data pipeline, and wherein the database stores the data produced by the end-use data processing module.

30. The plant control and communication system of claim 26, wherein the plant includes two or more communication networks that communicatively couple the multiplicity of process control devices and the plurality of data processing devices, and wherein the data pipeline includes data processing modules in devices that are distributed across each of the two or more communication networks.

31. The plant control and communication system of claim 30, wherein the two or more communication networks includes at least one process control communication network and one other plant communication network.

32. The plant control and communication system of claim 31, wherein the other plant communication network is a big data communication network.

33. The plant control and communication system of claim 26, wherein the one or more communication networks is a process control network and wherein one of the data processing modules is a data selection module that obtains data from a data source within a process control network.

34. The plant control and communication system of claim 26, wherein the data pipeline includes one or more data collection modules that collect process data, one or more intermediate data processing modules that process the data collected by one or more of the data collection modules or another intermediate data processing module, and one or more end-use data processing modules that store output data generated by the one or more intermediate data processing modules in a manner that can be accessed by one or more other applications.

35. The plant control and communication system of claim 34, wherein one or more of the data processing modules of the data pipeline are configured to be intermittently connected within the data pipeline.

36. The plant control and communication system of claim 35, wherein one of the one or more intermittently connected data processing modules is disposed in a handheld device that is intermittently connected to the further plant communication network.

37. A process plant communication system for use within a process plant environment that implements a process, comprising:
a process control network including a multiplicity of process control devices disposed within the plant to control the process and a process control communication network communicatively coupled between the multiplicity of process control devices, wherein one or more of the multiplicity of process control devices collects or generates process control data;
a further plant communication network including a plurality of processing devices communicatively coupled together by a further plant communication network link, wherein at least one of the plurality of processing devices on the further plant communication network is communicatively connected to the process control communication network;
a plurality of distributed data pipelines, each distributed data pipeline respectively defined, in a configuration environment, to perform, on process control data, a respective processing operation by using a respective series of different data processing modules that are communicatively connected together in a respective particular sequence across a respective plurality of different devices included in the process plant environment to thereby perform the respective processing operation on process control data during runtime, the different data processing modules downloaded from the configuration environment into the respective plurality of different devices, wherein each distributed data pipeline includes one or more data collection modules that collect process data from the process control network, one or more intermediate data processing modules that process the data collected by one or more of the data collection modules or another intermediate data processing module, and one or more ending data processing modules that produce data pipeline output data using data generated by the one or more intermediate data processing modules, and wherein at least two data processing modules of each distributed data pipeline are respectively located in different devices within the process control communication network and the further plant communication network; and
a set of higher level analytic applications that are communicatively connected within the further plant communication network, wherein each of the set of higher level analytic applications subscribes to data generated by the ending data processing module of one or more of the distributed data pipelines.

38. The process plant communication system of claim 37, wherein one of the set of higher level analytic applications intermittently connects to one or more of the distributed data pipelines.

39. The process plant communication system of claim 37, wherein the data processing modules of one of the distributed data pipelines processes data and communicates data within the one of the distributed data pipelines during on-line operation of the process.

40. The process plant communication system of claim 37, wherein one of the higher level analytic applications subscribes to data from two or more of the distributed data pipelines.

41. The process plant communication system of claim 37, further including a database communicatively coupled to one of the distributed data pipelines.

42. The process plant communication system of claim 41, wherein the database is a big data machine database.

43. The process plant communication system of claim 37, wherein the process control network includes two or more communication networks that communicatively couple the multiplicity of process control devices together, and wherein one of the distributed data pipelines includes data processing modules in respective devices that are distributed across each of the two or more communication networks.

44. The process plant communication system of claim 37, wherein the further plant communication network includes two or more communication networks that communicatively couple the multiplicity of data processing devices together, and wherein one of the distributed data pipelines includes data processing modules in respective devices that are distributed across each of the two or more communication networks.

45. The process plant communication system of claim 37, wherein one of the data processing modules of one of the distributed data pipelines is a data cleaning module that cleans data obtained from a data source within the process control network.

46. The process plant communication system of claim 45, wherein another one of the data processing modules in the one of the distributed data pipelines is a data alignment module that time aligns data from multiple data sources within the process control network.

47. The process plant communication system of claim 45, wherein another one of the data processing modules in the one of the distributed data pipelines is a sensitivity data analysis module that determines the sensitivity of data to a particular event within the plant.

48. The process plant communication system of claim 45, wherein another one of the data processing modules in the one of the distributed data pipelines is a causality analysis module that determines a causal relationship between data from a data source and an event within the plant.

49. The process plant communication system of claim 45, wherein another one of the data processing modules in the one of the distributed data pipelines is a data presentation module that presents data generated within the one of the distributed data pipelines to a user.

50. A method of processing data in a plant having a process control network including a multiplicity of process control devices disposed within the plant to control a process and a process control communication network communicatively coupled between the multiplicity of process control devices, wherein one or more of the multiplicity of process control devices collects or generates process control data, and including a further plant network including a plurality of processing devices communicatively coupled together by a further plant communication network link, the method comprising:

storing a distributed data pipeline within the process control network and in the further plant network, the distributed data pipeline defined, in a configuration environment, as a series of different data processing modules that are configured to be communicatively connected together in a particular order across a plurality of different devices of the process plant environment, and different portions of the distributed data pipeline are downloaded from the configuration environment into the plurality of different devices to thereby perform, during run-time, a processing operation on process control data, the plurality of different devices including various different ones of the process control devices and processing devices;

collecting data at one or more of the data processing modules of the distributed data pipeline during on-line operation of the process control network;

processing the collected process data in the data processing modules of the distributed data pipeline during on-line operation of the process control network;

storing the processed data developed by the data processing modules of the distributed data pipeline in a computer memory device; and using the data developed by the data processing modules of the distributed data pipeline in a further application executed on a further processing device.

51. The method of processing data of claim 50, wherein storing the processed data developed by the data processing modules of the distributed data pipeline in a computer memory device includes storing the processed data in a big data machine.

52. The method of processing data of claim 50, wherein storing the distributed data pipeline within the process control network and in the further plant network includes storing at least one of the data processing modules within one of the multiplicity of process control devices and includes storing another one of the data processing modules in one of the processing devices of the further plant network.

53. The method of processing data of claim 50, wherein storing the distributed data pipeline within the process control network and in the further plant network includes storing at least one of the data processing modules in a device within a first plant sub-network of the further plant network and storing another one of the data process modules in a second plant sub-network of the further plant network.

54. The method of processing data of claim 50, wherein collecting data at one or more of the data processing modules of the distributed data pipeline during on-line operation of the process control network includes collecting data at a rate faster than an execution rate of a controller used within the process control network to perform on-line process control.

55. The method of processing data of claim 50, wherein the distributed data pipeline includes one or more data collection modules that collect process data from the process control network, one or more intermediate data processing modules that process the data collected by one or more of the data collection modules or another intermediate data processing module, and one or more end-use data processing modules that store output data generated by the one or more intermediate data processing modules or the end-use data processing modules in a manner that can be accessed by one or more other applications.

56. The method of processing data of claim 55, wherein one of the data processing modules of the distributed data pipeline is intermittently connected within the distributed data pipeline.

57. The method of processing data of claim 56, wherein the intermittently connected data processing module is disposed in a handheld device that is intermittently connected to the further plant communication network.

58. A method of configuring a data processing pipeline within a process plant having a process control network with a multiplicity of process control devices that operate to control the process and having a process communication network having a multiplicity of processing devices communicatively coupled together, comprising:

storing, based on a configuration of the data processing pipeline defined in a configuration environment, a set of data processing modules within different ones of the multiplicity of process control devices and the processing devices, the configuration of the data processing pipeline defining a particular data processing operation to be executed by the data processing pipeline during run-time, and the storing of the set of data processing modules within the different ones of the multiplicity of process control devices and the processing devices including downloading different data processing modules included in the set of data processing modules to the different ones of the multiplicity of process control devices and the processing devices;

communicatively interconnecting, based on the data processing pipeline configuration, the data processing modules in a fixed manner to create a set of three or more data processing modules communicatively connected in series; and configuring, based on the data processing pipeline configuration, the set of three or more data processing modules connected in series to perform specific types of data processing on data collected in the plant, the specific types of data processing included in the particular data processing operation, and the configuring of the series of three or more data processing modules including;

configuring a first one or more of the series of three or more data processing modules within process control devices within the process control network as data collection modules to collect raw process data;

configuring a second one or more of the series of three or more data processing modules as intermediate process modules to communicate with one or more data collection modules and to process the raw process data collected by the data collection modules to create intermediate process data; and configuring a third one or more of the series of three or more data processing modules as end-use process modules to communicate with one or more of the intermediate data processing modules to process the intermediate process data to generate end-use process data, including configuring one or more of the end-use data processing modules to provide the end-use process data to one or more subscribing applications communicatively connected to the process communication network.

59. The method of configuring a data processing pipeline within a process plant of claim 58, wherein configuring the first one or more of the series of three or more data processing modules stored within process control devices within the process control network as data collection modules includes configuring the data collection modules to collect the raw process data at a rate faster than a controller execution rate of a process controller that performs process control within the process control network.

60. The method of configuring a data processing pipeline within a process plant of claim 59, wherein configuring the second one or more of the series of three or more data processing modules as intermediate data process modules includes configuring the intermediate data process modules to process the raw process data collected by the data collection modules at a rate faster than the execution rate of the process controller.

61. The method of configuring a data processing pipeline within a process plant of claim 59, wherein configuring the third one or more of the series of three or more data processing modules as end-use process modules includes configuring the end-use process modules to process the intermediate process data at a rate faster than the execution rate of the process controller.

62. The method of configuring a data processing pipeline within a process plant of claim 58, wherein storing a set of data processing modules within different ones of the multiplicity of process control devices and the processing devices includes storing some of the data processing modules in the process control network devices and others of the data processing modules in the process communication network devices.

63. The method of configuring a data processing pipeline within a process plant of claim 58, wherein storing a set of data processing modules within different ones of the multiplicity of process control devices and the processing devices includes storing different data processing modules to perform processing on process data in a particular sequence to thereby cause the particular data processing operation to be executed by the data processing pipeline during run-time, wherein the stored set of data processing modules includes one or more upstream data collection modules that collect process data from the process control network, one or more intermediate process modules communicatively connected downstream from the one or more data collection modules or one or more other intermediate process modules that process the data collected by one or more of the data collection modules or another intermediate process module, and one or more end-use process modules communicatively coupled downstream from the one or more intermediate process modules that produce the end-use data using the intermediate data from the one or more intermediate process modules.

64. The method of configuring a data processing pipeline within a process plant of claim 63, wherein configuring one or more of the series of data processing modules to process the process data to generate intermediate process data includes configuring the one or more intermediate process modules to receive data from two or more upstream data processing modules and to combine the data from the two or more upstream data processing modules to create the intermediate process data.

65. The method of configuring a data processing pipeline within a process plant of claim 63, wherein configuring one or more of the series of data processing modules to generate intermediate process data includes configuring the one or more intermediate process modules to provide the intermediate process data to two or more downstream data processing modules.

66. The method of configuring a data processing pipeline within a process plant of claim 63, wherein configuring one or more of the end-use process modules to process the intermediate process data to generate end-use process data includes configuring the one or more end-use process modules to provide end-use data to an intermittently connected application.

67. The method of configuring a data processing pipeline within a process plant of claim 63, wherein configuring the set of three or more data processing modules connected in series to perform specific types of data processing on data collected in the plant includes configuring two of the data processing modules to be intermittently communicatively connected together.

68. The method of configuring a data processing pipeline within a process plant of claim 58, wherein storing the set of data processing modules within different ones of the multiplicity of process control devices and the processing devices includes storing one of the data processing modules of the data processing pipeline in a process control field device, storing one of the data processing modules in a process controller, and storing one of the data processing modules in a regional big data analytics machine.

\* \* \* \* \*